US012226908B2

(12) United States Patent
Narita et al.

(10) Patent No.: US 12,226,908 B2
(45) Date of Patent: Feb. 18, 2025

(54) CONTROL DEVICE, CONTROL METHOD, AND PROGRAM

(71) Applicant: SONY GROUP CORPORATION, Tokyo (JP)

(72) Inventors: Tetsuya Narita, Tokyo (JP); Satoko Nagakari, Chiba (JP)

(73) Assignee: SONY GROUP CORPORATION, Tokyo (JP)

( * ) Notice: Subject to any disclaimer, the term of this patent is extended or adjusted under 35 U.S.C. 154(b) by 69 days.

(21) Appl. No.: 17/614,446

(22) PCT Filed: May 22, 2020

(86) PCT No.: PCT/JP2020/020245
§ 371 (c)(1),
(2) Date: Nov. 26, 2021

(87) PCT Pub. No.: WO2020/246263
PCT Pub. Date: Dec. 10, 2020

(65) Prior Publication Data
US 2022/0234200 A1    Jul. 28, 2022

(30) Foreign Application Priority Data

Jun. 5, 2019  (JP) ................................ 2019-104966

(51) Int. Cl.
*B25J 9/16*   (2006.01)
*B25J 13/08*  (2006.01)

(52) U.S. Cl.
CPC .......... *B25J 9/1633* (2013.01); *B25J 9/1612* (2013.01); *B25J 13/083* (2013.01); *B25J 13/085* (2013.01)

(58) Field of Classification Search
CPC ...... B25J 9/1633; B25J 9/1612; B25J 13/083; B25J 13/085; B25J 19/02; G05B 2219/39507
See application file for complete search history.

(56) References Cited

U.S. PATENT DOCUMENTS

| 2006/0012198 A1* | 1/2006 | Hager | B25J 9/1612 |
| | | | 294/106 |
| 2009/0076657 A1* | 3/2009 | Tsuboi | G05B 13/021 |
| | | | 700/275 |

(Continued)

FOREIGN PATENT DOCUMENTS

| CN | 101738643 A | 6/2010 |
| CN | 102539025 A | 7/2012 |

(Continued)

*Primary Examiner* — Jonathan L Sample
*Assistant Examiner* — Mohammed Yousef Abuelhawa
(74) *Attorney, Agent, or Firm* — Paratus Law Group, PLLC

(57) ABSTRACT

The present disclosure relates to a control device, a control method, and a program capable of supporting an object with a more appropriate supporting force. The control device includes a supporting force control unit that controls a supporting force for supporting an object on the basis of information regarding a shape of a contact portion in contact with the object and information regarding a shear force of the contact portion. The information regarding the shear force includes, for example, information regarding a shear displacement of the contact portion. The present disclosure can be applied to, for example, a control device, a control method, an electronic device, a robot, a support system, a gripping system, a program, and the like.

22 Claims, 59 Drawing Sheets

(56) References Cited

U.S. PATENT DOCUMENTS

| | | | |
|---|---|---|---|
| 2011/0121591 A1* | 5/2011 | Nishiwaki | B66C 13/16 901/46 |
| 2013/0119689 A1* | 5/2013 | Nishiwaki | B66C 13/16 294/213 |
| 2014/0035306 A1* | 2/2014 | Garcia | B25J 15/08 294/213 |
| 2014/0214209 A1* | 7/2014 | Sugiura | B25J 9/1612 310/322 |
| 2016/0073584 A1* | 3/2016 | Davidson | A01D 46/30 294/198 |
| 2016/0167228 A1* | 6/2016 | Wellman | B25J 9/1602 901/3 |
| 2019/0047157 A1* | 2/2019 | Shintake | H02N 13/00 |

FOREIGN PATENT DOCUMENTS

| | | |
|---|---|---|
| CN | 102706489 A | 10/2012 |
| CN | 102713546 A | 10/2012 |
| JP | 2000254884 A | 9/2000 |
| JP | 2005-257343 A | 9/2005 |
| JP | 2008281403 A | 11/2008 |
| JP | 2009-034742 A | 2/2009 |
| JP | 2009-066683 A | 4/2009 |
| JP | 2009-066714 A | 4/2009 |
| JP | 2019-018253 A | 2/2019 |
| WO | WO-2019012736 A1 | 1/2019 |

\* cited by examiner

FIG. 14
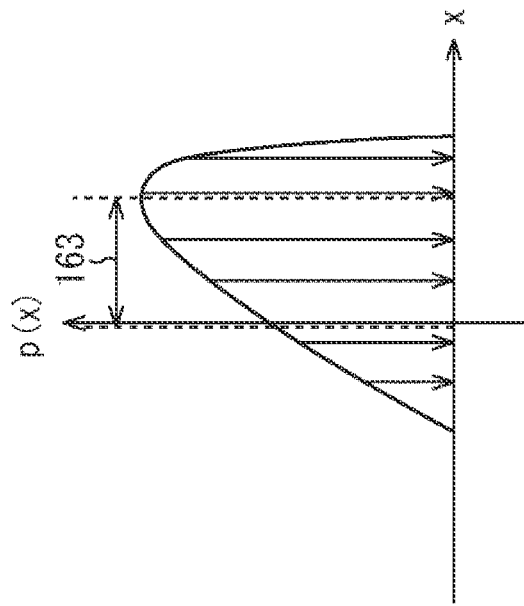
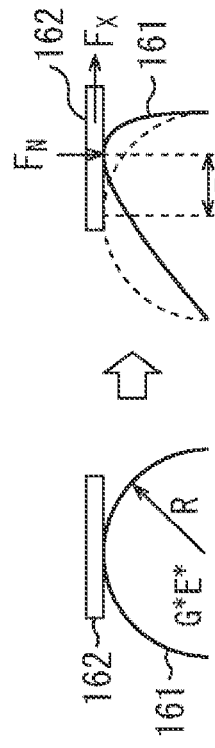
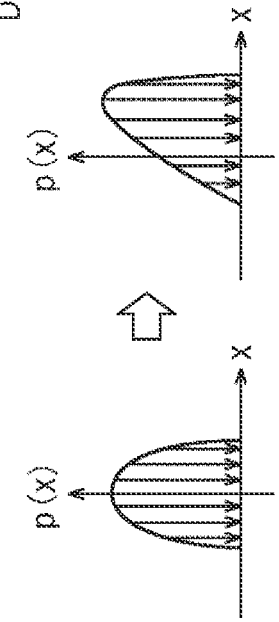

CONTROL DEVICE, CONTROL METHOD, AND PROGRAM

CROSS REFERENCE TO PRIOR APPLICATION

This application is a National Stage Patent Application of PCT International Patent Application No. PCT/JP2020/020245 (filed on May 22, 2020) under 35 U.S.C. § 371, which claims priority to Japanese Patent Application No. 2019-104966 (filed on Jun. 5, 2019), which are all hereby incorporated by reference in their entirety.

TECHNICAL FIELD

The present disclosure relates to a control device, a control method, and a program, and more particularly, relates to a control device, a control method, and a program capable of supporting an object with a more appropriate supporting force.

BACKGROUND ART

Conventionally, in controlling support of an object, such as object gripping by a robot or the like or walking of a robot or the like, for example, it is necessary to control a contact force generated by contact with a surrounding environment or the object. However, in a case where a physical quantity of the environment or the object is unknown, it may be difficult to control the contact force. For example, in the gripping control, it is necessary to control a gripping force (supporting force) so as not to slip or break the object, but in a case of gripping an unknown object whose physical quantity (mass, center of gravity position, friction coefficient, and the like) is unknown, it is difficult to decide an appropriate gripping force.

Regarding such control of the supporting force, for example, a method of increasing or decreasing the gripping force according to a deviation amount of a pressure center position has been considered (see, for example, Patent Document 1).

CITATION LIST

Patent Document

Patent Document 1: Japanese Patent Application Laid-Open No. 2009-66714

SUMMARY OF THE INVENTION

Problems to be Solved by the Invention

However, in the case of the method described in Patent Document 1, since the relationship between the deviation amount of the pressure center position and a slip is not clear, there is no guarantee that an object can be held with the minimum force.

The present disclosure has been made in view of such a situation, and enables an object to be supported with a more appropriate supporting force.

Solutions to Problems

A control device according to one aspect of the present technology is a control device including a supporting force control unit that controls a supporting force for supporting an object on the basis of information regarding a shape of a contact portion in contact with the object and information regarding a shear force of the contact portion.

A control method according to one aspect of the present technology is a control method including controlling a supporting force for supporting an object on the basis of information regarding a shape of a contact portion in contact with the object and information regarding a shear force of the contact portion.

A program according to one aspect of the present technology is a program that causes a computer to function as a supporting force control unit that controls a supporting force for supporting an object on the basis of information regarding a shape of a contact portion in contact with the object and information regarding a shear force of the contact portion.

In the control device, the control method, and the program according to one aspect of the present technology, the supporting force for supporting the object is controlled on the basis of the information regarding the shape of the contact portion in contact with the object and the information regarding the shear force of the contact portion.

BRIEF DESCRIPTION OF DRAWINGS

FIG. 14 is a diagram for describing maximum pressure point measurement.

MODE FOR CARRYING OUT THE INVENTION

Hereinafter, modes for carrying out the present disclosure (hereinafter, referred to as embodiments) will be described. Note that the description will be made in the following order.

1. First Embodiment (Gripping System and Gripping Force Control)
2. Second Embodiment (Configurations of Gripping Device and Flexible Deformation Layer)
3. Third Embodiment (Control Device and Control Process)
4. Appendix 1. First Embodiment <Gripping System>

Figure 1:
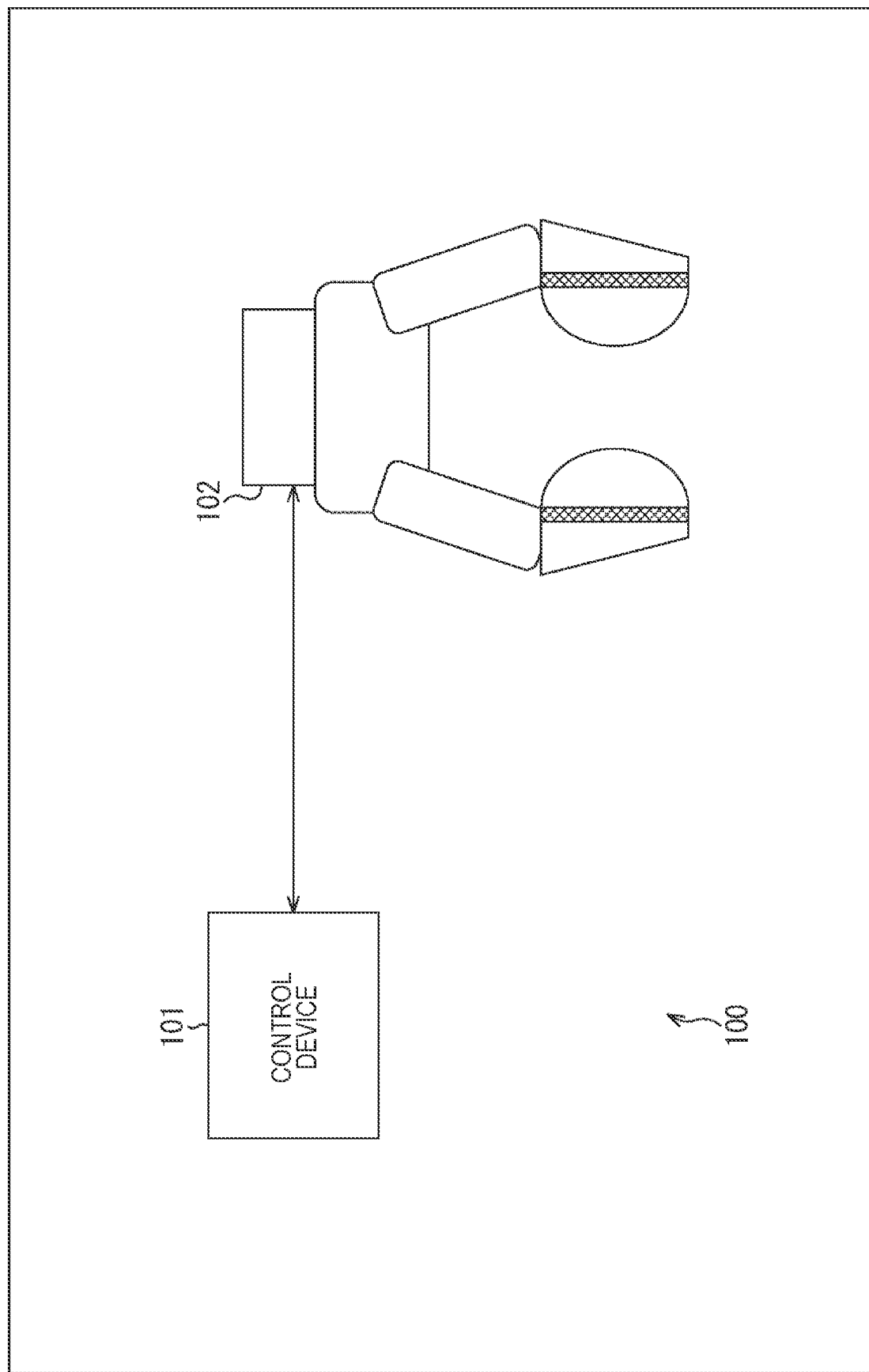
FIG. 1 is a perspective view illustrating a configuration example of an embodiment of a gripping system.

FIG. 1 is a perspective view illustrating a configuration example of an embodiment of a gripping system to which the present technology is applied.

A gripping system 100 is a system for gripping an object, and includes a control device 101 and a gripping device 102 as illustrated in FIG. 1. The control device 101 is communicably connected to the gripping device 102 and can control driving of the gripping device 102. For example, the control device 101 can drive the gripping device 102 to grip the object, or can control a gripping force with which the gripping device 102 grips the object. The control device 101 can also acquire information obtained by the gripping device 102. For example, the control device 101 can control driving of the gripping device 102 using the information acquired from the gripping device 102.

The gripping device 102 performs a process related to gripping of the object. For example, the gripping device 102 is driven under the control of the control device 101, and can grip the object with the gripping force designated by the control device 101.

<Initial Slip>

In tasks of a robot, such as object gripping and walking, gripping, walking, and the like require control of a contact force generated by contact with a surrounding environment or the object. However, in a case where a physical quantity of the environment or the object is unknown, it is difficult to control the contact force. For example, in the gripping control, it is necessary to control the gripping force so as not to slip or break the object, but in a case of an unknown object whose physical quantity (mass, center of gravity position, friction coefficient, and the like) is unknown, it is difficult to decide an appropriate gripping force, which is a problem of robot control.

Figure 2:
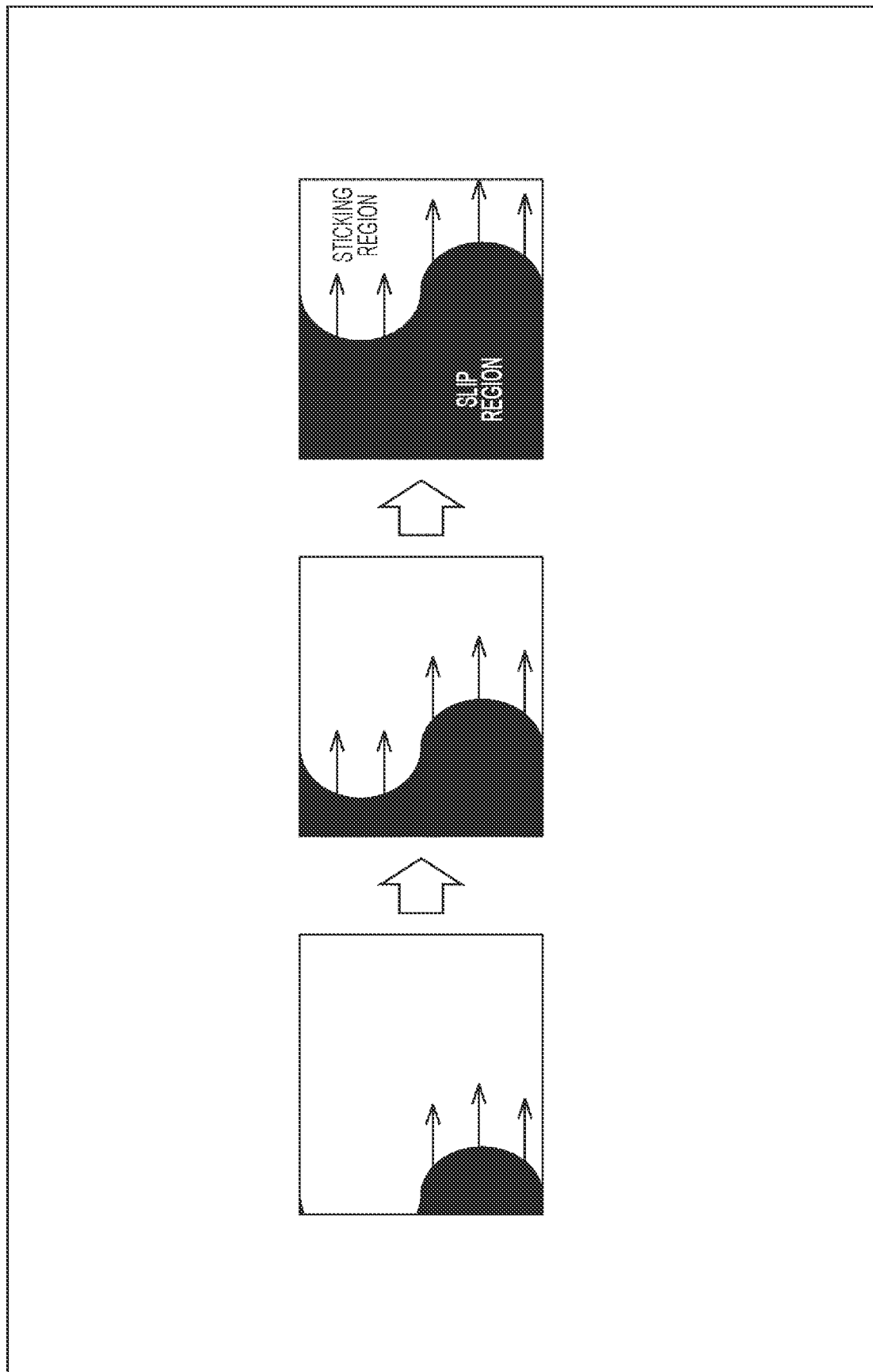
FIG. 2 is a diagram for describing an initial slip.

Regarding the problem, a phenomenon called "initial slip" is attracting attention. The initial slip is a phenomenon in which only a part of a contact surface slips, and is also called a precursory phenomenon of an overall slip. As illustrated in FIG. 2, when an initial slip region gradually expands and spreads to the entire contact region, the initial slip transitions to a generally called "slip" (also referred to as an overall slip), and a relative motion occurs between a device and the object or environment with which the device is in contact.

Here, "sticking" refers to a state where static friction is generated in the entire contact surface between a fingertip and the gripped object (the object gripped by the gripping device 102) and there is no relative motion between the fingertip and the gripped object. In addition, the "slip (overall slip)" refers to a state where dynamic friction is generated and there is a relative motion between two objects in contact with each other. Here, the "slip (overall slip)" refers to a slip in which the dynamic friction is generated in the entire contact surface between the fingertip and the gripped object and that involves the relative motion between the fingertip and the gripped object.

The "initial slip" is a phenomenon in which the dynamic friction is generated at a part of the contact surface between the fingertip and the gripped object, which is also referred to as a precursory phenomenon before the above-described slip (overall slip) is generated. It is said that the initial slip state exists during the transition from the "sticking" state to the "slip" state. In the case of the initial slip state, there is no relative motion between the fingertip and the gripped object.

Figure 3:
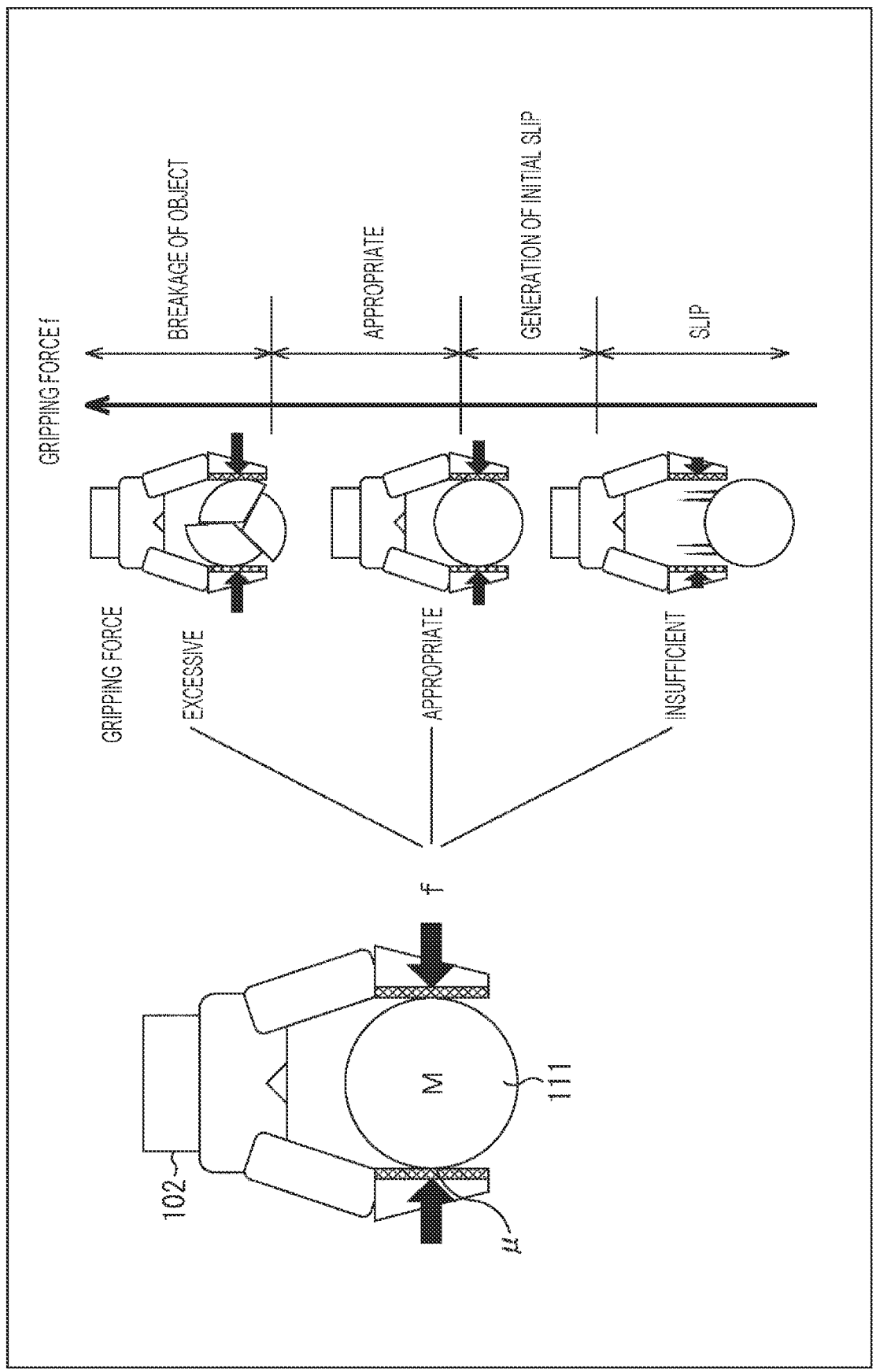
FIG. 3 is a diagram for describing gripping force control.

For example, as illustrated in FIG. 3, if a gripping force f, which is a force acting in a normal direction perpendicular to the contact surface, is excessively large, the object is broken. In addition, if the gripping force f falls below an appropriate level, the "initial slip" is generated, and furthermore, if the gripping force f is insufficient, the "initial slip" develops to the "slip", and the object cannot be gripped (is dropped).

That is, if the initial slip can be detected, it is possible to calculate the minimum gripping force that can hold the object without slipping, for example, in the gripping control. If the object can be gripped with the minimum gripping force, the possibility of breaking the object by gripping can be further suppressed.

However, the initial slip is a very minute change in the contact surface, and it is necessary to stably generate and detect the initial slip in order to detect the initial slip. In addition, it is necessary to quantify the degree of progress of the initial slip in order to control the degree of progress of the initial slip. Conventionally, a method for quantifying and stably detecting the initial slip and a configuration therefor have not been proposed. In addition, a control method using a detection result has not been proposed either.

Therefore, in order to stably detect and quantify the initial slip, there are proposed the shape and structure of a flexible deformation layer and a signal processing method of a tactile sensor. Furthermore, there is proposed a method of using the quantified initial slip for control. The gripping control will be described as an example for ease of description, but the present technology is not limited to this, and can be applied to general support control that handles contact with the environment, such as walking control.

<Sticking Ratio>

In order to control the initial slip, it is necessary to quantify the degree of the initial slip. Here, the contact region is divided into a "sticking region" where no initial slip is being generated (that is, a partial region where the static friction is being generated, which is included in the contact surface between the fingertip and the gripped object) and a "slip region" where the initial slip is being generated (that is, a partial region where the dynamic friction is being generated, which is included in the contact surface between the fingertip and the gripped object). The degree of slip can be indicated by a ratio between these two regions. Here, the ratio of the sticking region to the contact region is defined as "sticking ratio". In a case where the sticking ratio is 1 (=100%), the contact region has no slip region and is completely stuck. On the other hand, in a case where the sticking ratio is 0, the entire contact region is the slip region, and the contact region is in a state where the slip (overall slip) is being generated.

Figure 4:
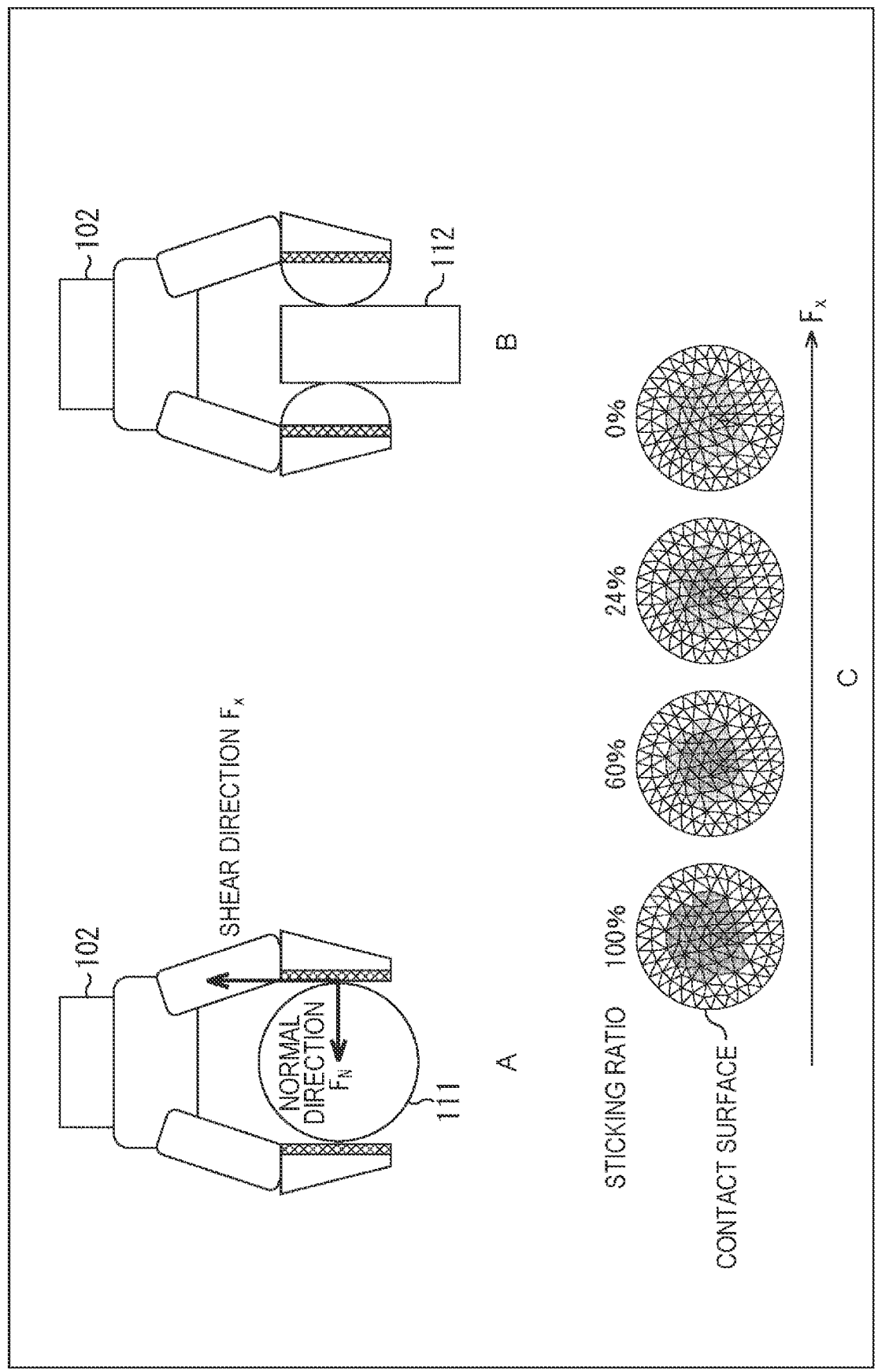
FIG. 4 is a diagram for describing a sticking ratio.

C of FIG. 4 illustrates an example of a result of performing finite element method (FEM) analysis, for example, under conditions corresponding to a case where a spherical object is gripped by a flat fingertip as illustrated in A of FIG. 4 or a case where a flat object is gripped by a curved fingertip as illustrated in B of FIG. 4. C of FIG. 4 illustrates how the sticking ratio (slip region/sticking region) in the contact surface changes. Regions illustrated in dark gray indicate the sticking region, and regions illustrated in light gray indicate the slip region. As a shear force $F_X$ (unit: 5 Newton (N)), which is a force acting in a shear direction, increases, the slip region spreads from a periphery of the contact surface, and when the sticking ratio reaches 0%, the entire region transitions to the slip region. Therefore, it can be said that, in order to grip the object without slipping, the gripping force is only required to be adjusted to such an extent that the sticking ratio does not reach 0%.

Here, the "shear direction" is a direction orthogonal to the normal direction and indicates a direction parallel to the contact surface. The shear direction is the same as a direction in which the slip is generated.

<Contact Curvature and Sticking Ratio>

Figure 5:
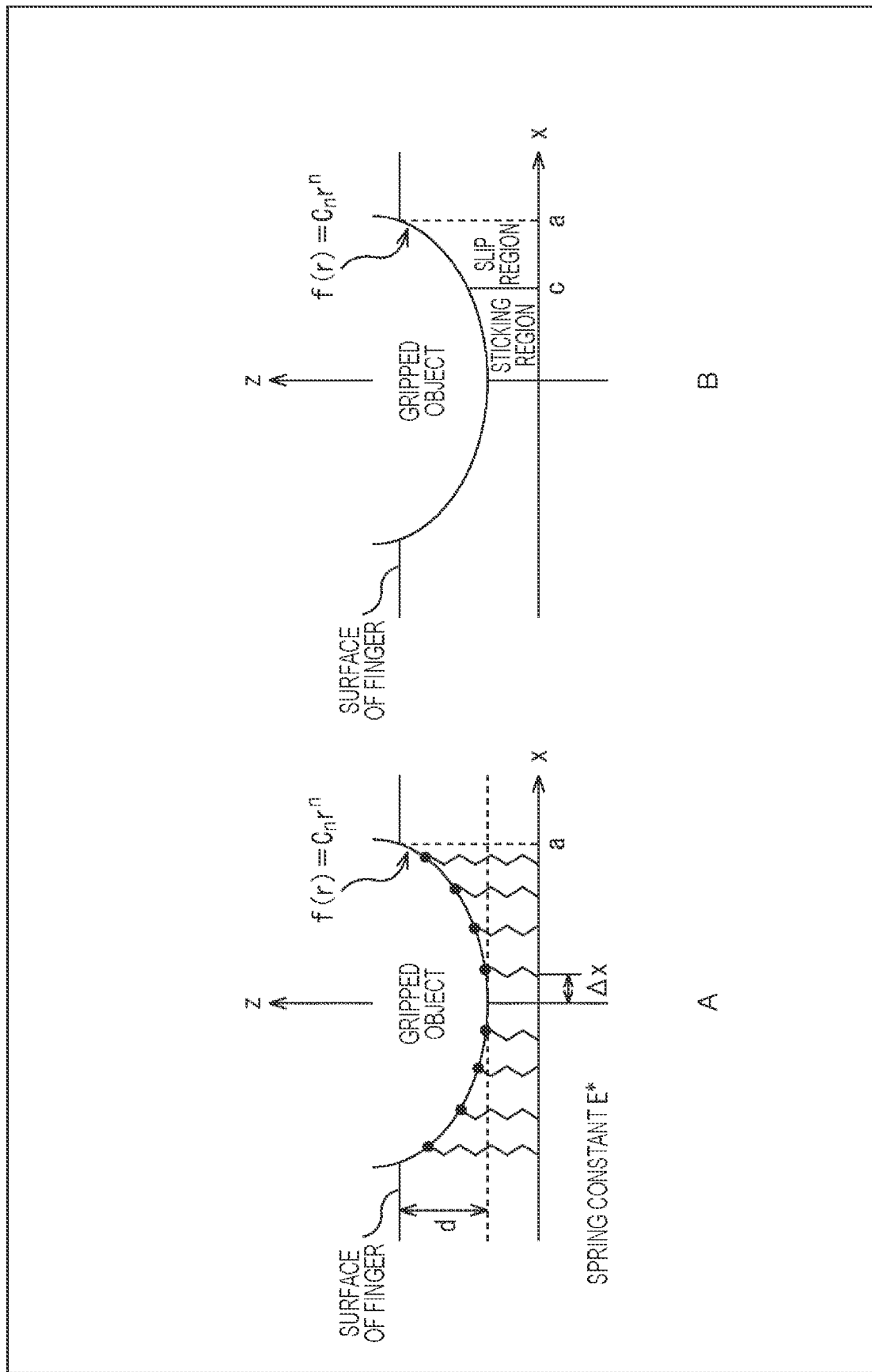
FIG. 5 is a diagram for describing a contact curvature and the sticking ratio.

In order to investigate the relationship between the change in the sticking ratio and the contact condition, an analysis was performed on the basis of a simple elastic contact model illustrated in A of FIG. 5 and B of FIG. 5. As a result, it was found that the change in the sticking ratio varies depending on the "shape of a contact curved surface" and a "friction coefficient".

<Contact Curved Surface Shape and Sticking Ratio>

Figure 6:
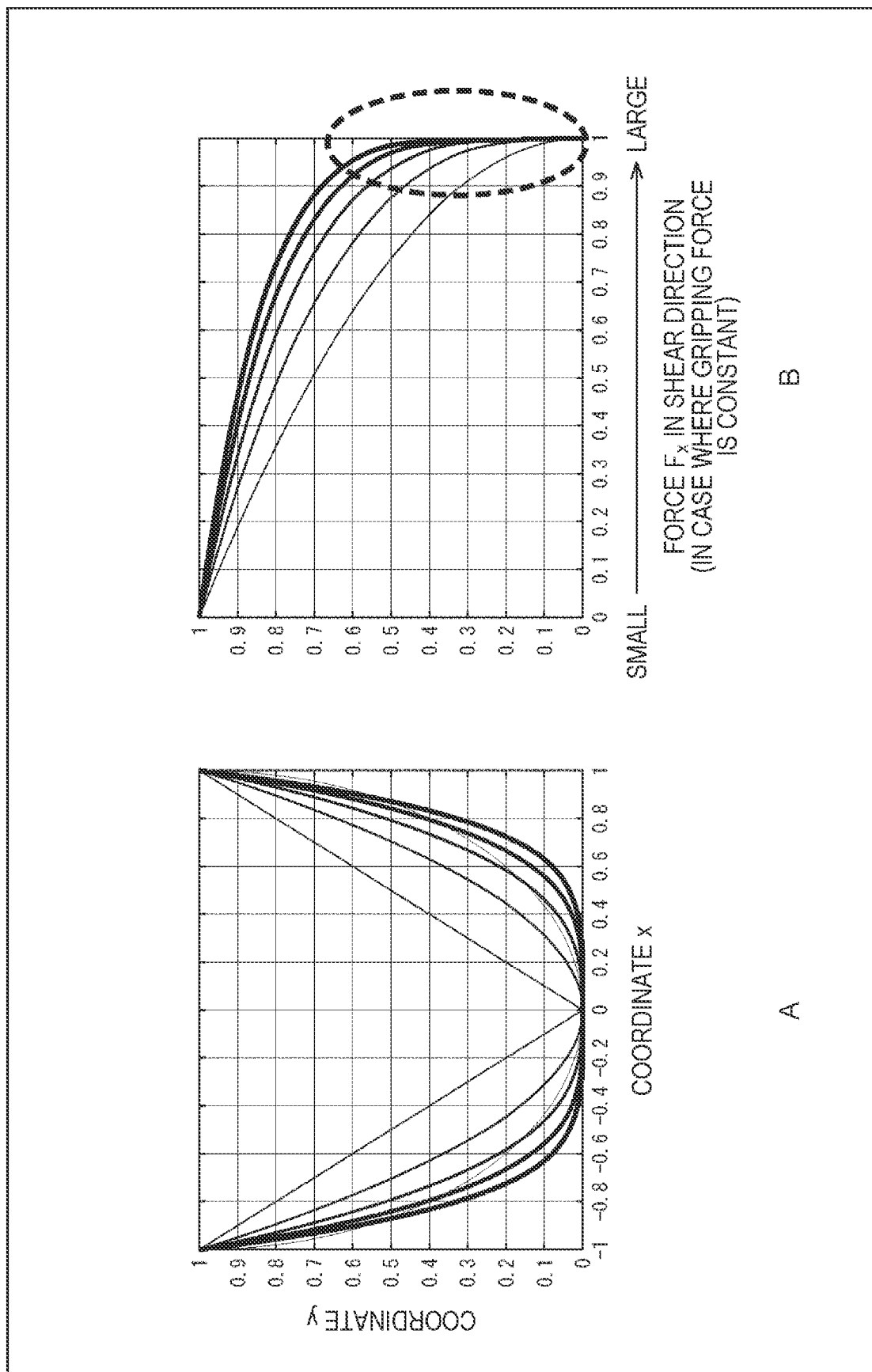
FIG. 6 is a diagram for describing a contact curved surface shape and the sticking ratio.

A curvature of the contact curved surface was changed as in a graph illustrated in A of FIG. 6, and the state of the change in the sticking ratio relative to the shear force $F_X$ was plotted as in a graph illustrated in B of FIG. 6 for each curvature.

Here, the curvature is an amount representing the degree of curve of a line or a surface. The curvature increases as the degree of curve is sharper. More specifically, the curvature is a reciprocal of a radius of curvature. One of methods for representing a curved surface is a higher-order function of $y=x^n$. A curve of the higher-order function is represented by the curved surface, so that the curve can be mathematically analyzed. In this case, when an order n of the function is increased, the curved surface becomes gentler (gradient is small) in a range of $0<x<1$. Thus, the curvature decreases as the order of the contact surface is higher. If the curved surface is represented mathematically such as by the higher-order function, the curvature can be replaced with the order of the function.

The contact curved surface is assumed to be a linear function (a cone in three dimensions) or a higher-order curve. In the graph in A of FIG. 6, a thicker line indicates a curved surface having a higher order. As illustrated in this graph, the curved surface is gentler as the order increases. Also in the graph of B of FIG. 6, a thicker line indicates a curved surface having a higher order. As illustrated in this graph, as the curved surface is gentler, the sticking ratio tends to decrease rapidly when the shear force is increased to some extent. This is because, when the contact is made with the curved surface, a contact pressure has a distribution varying from place to place, and the initial slip is gradually generated from a portion where the pressure is weak. That is, the contact pressure is more uniform as the curved surface is gentler, and the progress of the initial slip is faster.

In addition, the rate of the change in the sticking ratio increases as the curved surface is steeper while the rate decreases as the curved surface is gentler and the sticking ratio rapidly decreases to 0 at a certain point. In general, a detection accuracy is higher as the rate of the change is higher. Therefore, it can be said that the detection accuracy of the sticking ratio increases as the curved surface is steeper.

Here, the contact curved surface represents a contact surface between a robot fingertip and an object in robot gripping. This contact surface is a relative surface shape, and, for example, the same result is obtained in a case where a spherical fingertip and a flat object are in contact with each other and in a case where a flat fingertip and a spherical object are in contact with each other.

For example, a contact shape in which a flat surface and a curved surface are mixed is considered. In the case of such a contact curved surface in which the flat surface and the curved surface are mixed, the sticking ratio changes as illustrated in a graph of FIG. 7 according to the magnitude of the shear force. In this graph, the sticking ratio rapidly decreases as the shear force increases to some extent, for example, as in a portion surrounded by an ellipse.

Figure 7:
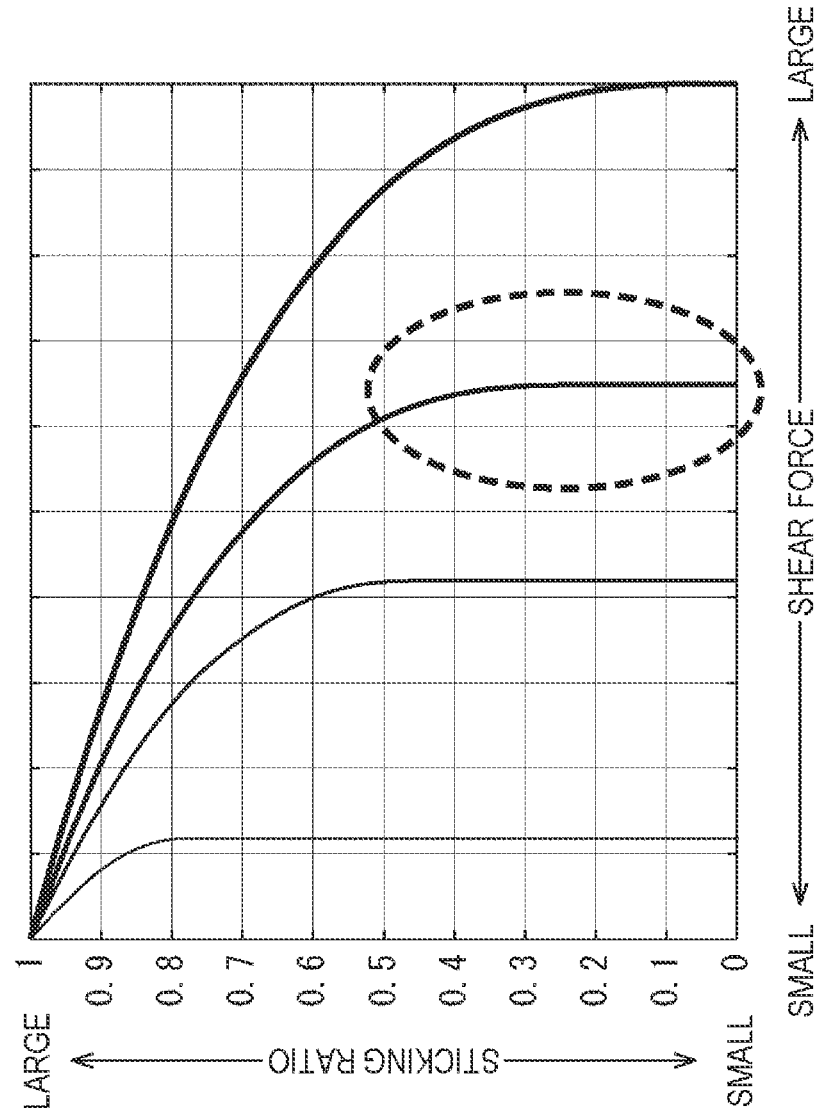
FIG. 7 is a diagram for describing the contact curved surface shape and the sticking ratio.

The magnitude of the shear force when the sticking ratio rapidly decreases depends on a flat surface mixture rate of the contact surface. In FIG. 7, a thicker line indicates the change in the sticking ratio in the contact surface having a higher rate of the curved surface (having a lower flat surface mixture rate). That is, as the flat surface mixture rate of the contact surface increases, the sticking ratio rapidly decreases at a smaller shear force.

This shows that the initial slip spreads from the periphery of the contact surface, and the overall slip is generated at the moment when the initial slip reaches the flat surface portion. This result also shows that the contact with the curved surface enables stable control of the sticking ratio. Conversely, as long as the progress of the initial slip can be controlled so as not to reach the flat surface portion, there is no problem even if the flat surface portion exists. If the flat surface portion is increased, a contact area can be increased, and an orientation stability of the object being gripped is improved.

<Friction Coefficient and Sticking Ratio>

Figure 8:
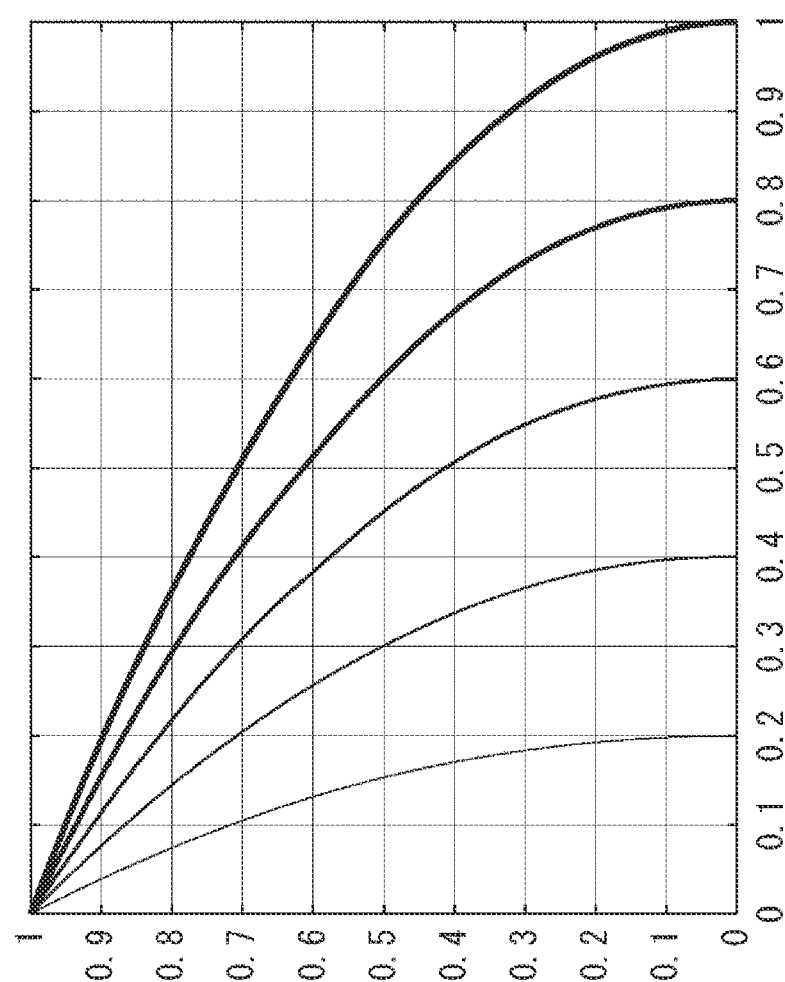
FIG. 8 is a diagram for describing a friction coefficient and the sticking ratio.

The change in the sticking ratio depends not only on the shape of the contact curved surface but also on the friction coefficient. A graph illustrated in FIG. 8 is a graph obtained by plotting the change in the sticking ratio in a case where the contact is made at different friction coefficients. As illustrated in this graph, as the friction coefficient is lower, a decrease speed of the sticking ratio is faster. In a case where the friction coefficient is known in advance, or in a case where the friction coefficient can be measured, the shear force can be controlled more easily according to the change in the sticking ratio corresponding to the friction coefficient. In addition, in a case where the friction coefficient is unknown, the sticking ratio is not uniquely determined. Therefore, if a decrease in the sticking ratio can be detected and control can be performed so that the sticking ratio is maintained at 100%, the object can be gripped with the minimum force without being slipped off.

<Relationship Between Contact Curved Surface Shape/Friction Coefficient and Sticking Ratio>

As described above, the change in the sticking ratio greatly varies depending on the shape of the contact surface (curvature and curved surface/flat surface). In particular, a flat surface or a gently curved surface having a small curvature easily causes a rapid decrease in the sticking ratio. Therefore, if the curved surface is formed with a certain degree of curvature, more stable control can be achieved.

However, the magnitude of the curvature and the contact area are in a trade-off relationship. For example, when the curvature is increased to suppress the rapid decrease in the sticking ratio, the contact area with the object is reduced, which can improve a slip detection accuracy, but conversely, tends to cause an unstable state.

In other words, if the fingertip is formed in a curved surface and the shape thereof is adjusted, the change in the sticking ratio can be freely designed. Therefore, the control is only required to be performed on the basis of the change in the sticking ratio associated with the fingertip shape. The trade-off between the curvature and the contact area can be handled if a plurality of curved surfaces is used or the curved surface is changed according to application.

The change in the sticking ratio also depends on the friction coefficient. In the case where the friction coefficient is known in advance, the change in the sticking ratio can be known in advance from information regarding the contact curved surface, and thus the control can be performed by use of the relationship between the friction coefficient and the sticking ratio. Even if the friction coefficient is not known in advance, the control can be performed if a sticking ratio change model is estimated or a premise is made.

<Method of Measuring Sticking Ratio>

As described above, the change in the sticking ratio depends on the "shape of the contact curved surface" and the "friction coefficient". The shape of the contact curved surface can be roughly estimated if the curved surface shape of the fingertip is grasped in advance. However, the friction coefficient is often unknown, and although the friction coefficient can be estimated in advance, it is difficult to obtain an accurate value due to problems of accuracy and the like. In a case of a conventional method, it is difficult to measure the sticking ratio. Therefore, a shear displacement and a shear force distribution are focused on so that the sticking ratio is derived.

<Method 1: Method Using Shear Displacement>

A sticking ratio $R_{stic}$ is a value depending on a friction coefficient $\mu$, the shear force $F_X$ acting on the object, a gripping force $F_N$, and the shape of the contact curved surface (the curvature or the order of the curved surface) n, and is derived by the following equation (1).

[Math. 1]

$$R_{stic} = 1 - f(\mu, F_X, F_N, n) \tag{1}$$

Here, the shear force $F_X$ acting on the object is derived by the following equation (2) by use of a shear displacement $u_X$ of the fingertip and a contact area S under a condition where no dynamic friction is being generated.

[Math. 2]

$$F_X = g(S, u_X) \tag{2}$$

If the contact surface is a curved surface and the information n regarding the curved surface (curvature and curved surface/flat surface) is known, a relationship derived from a contact model h is derived between the contact area S, the gripping force $F_N$, and the curved surface information n, as in the following equation (3). As the contact model, a generally proposed elastic contact model (Hertz) may be used.

[Math. 3]

$$S = h(F_N, n) \quad (3)$$

When the above relationship is used, the sticking ratio $R_{stic}$ can be derived as the following equation (4).

[Math. 4]

$$R_{stic} = 1 - \psi(\mu, F_N, n) \cdot \Theta(u_X) \quad (4)$$

This relational expression means that the sticking ratio can be expressed in a form using a function $\Theta(u_X)$, which does not depend on the unknown friction coefficient $\mu$. Therefore, the sticking ratio can be controlled if the shear displacement $u_X$ is measured and controlled. For example, even if the friction coefficient is unknown, the sticking ratio can be maintained at 100% if $u_X$ is set to, for example, 0. In addition, assuming that the friction coefficient is also in a certain range makes it possible to control the sticking ratio in a certain range width similarly, by use of $u_X$.

<Method 2: Method Using Shear Displacement Distribution and Shear Force Distribution>

Figure 9:
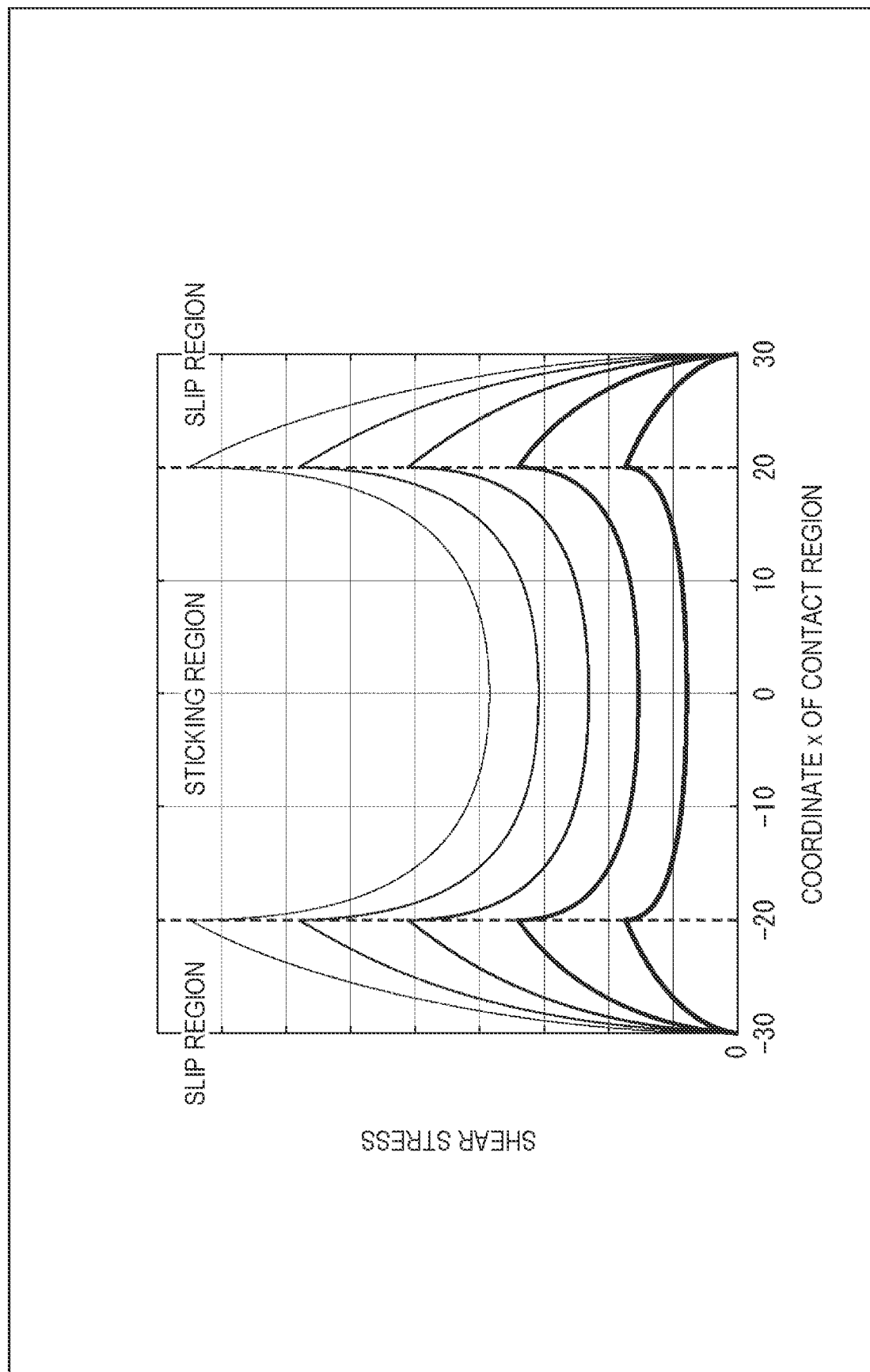
FIG. 9 is a diagram for describing a shear force distribution when the initial slip is generated.

In a case where a distribution of the shear displacement and a distribution of the shear force are obtained, the sticking ratio can be obtained as an absolute value even if the friction coefficient is unknown. For example, the shear force distribution in the contact surface in a situation where the initial slip is being generated is as illustrated in a graph of FIG. 9. As illustrated in FIG. 9, the shear force is discontinuous at a boundary between the slip region and the sticking region. If this discontinuous point is detected, the ratio of the sticking region can be calculated and the sticking ratio can be obtained. This discontinuous point exists for any friction coefficient.

Examples of a method of detecting the discontinuous point include the following methods.

Using a general image processing filter (detecting an edge by use of a differential filter or the like)

Obtaining a gradient of the shear force, and considering a portion where a sign of the gradient is switched as the discontinuous point Note that the same applies to the shear displacement. The "shear displacement" is a deformation amount in the shear direction. As a unit of the shear displacement, a unit of length (for example, meters, millimeters, or the like) is used. That is, the "shear displacement" refers to the deformation amount of the object in the shear direction caused by the shear force acting on the object. Even if the same shear force is applied, the shear displacement varies depending on the rigidity of the object (the harder the object, the smaller the shear displacement).

Figure 10:
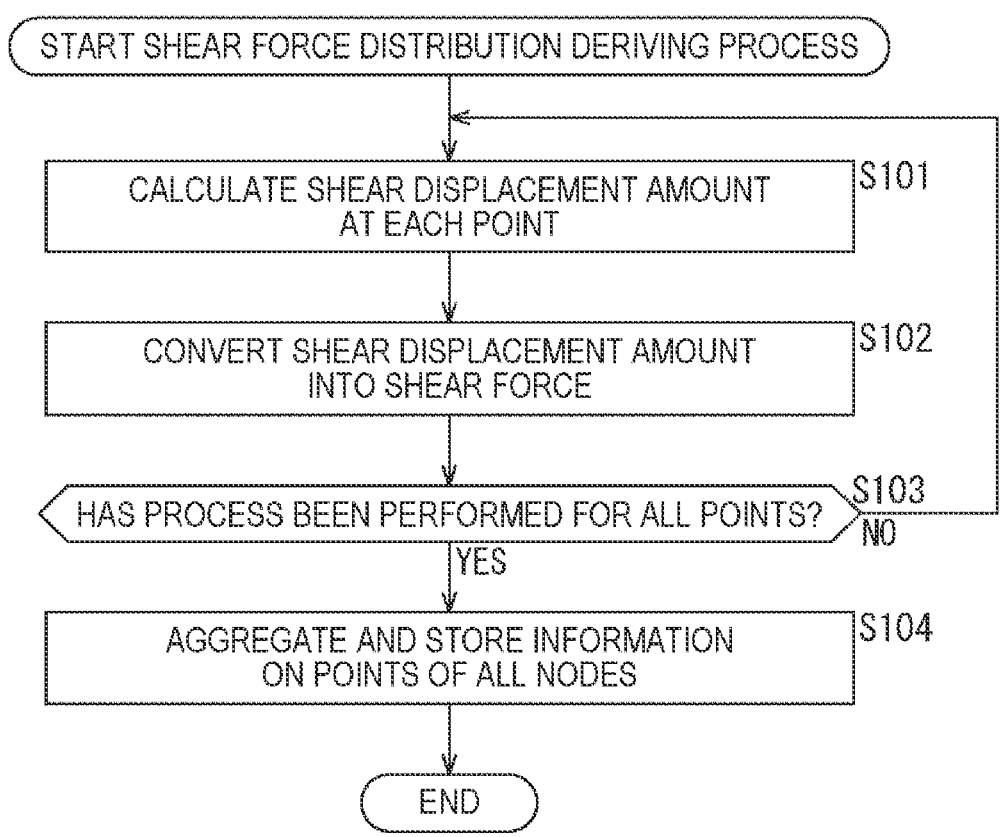
FIG. 10 is a flowchart for describing an example of a procedure of a shear force distribution deriving process.

For obtaining the shear force distribution, a sensor capable of measuring the distribution of the shear force may be used, or a sensor capable of measuring the distribution of the shear displacement may be used to convert the shear displacement into the shear force. An example of a procedure of a shear force distribution deriving process executed to derive the shear force distribution in this case will be described with reference to a flowchart of FIG. 10.

When the shear force distribution deriving process is started, in step S101, the control device 101 controls the gripping device 102, causes the gripping device 102 to detect the shear displacement, and calculates a shear displacement amount at each point.

In step S102, the control device 101 converts the shear displacement amount into the shear force.

In step S103, the control device 101 determines whether or not the process has been performed for all points. In a case where it is determined that there is an unprocessed point, the process returns to step S101, and the subsequent processes are repeated. That is, respective processes of steps S101 to S103 are executed for all points. Then, in a case where it is determined in step S103 that the process has been performed for all points, the process proceeds to step S104.

In step S104, the control device 101 aggregates and stores the information on the points of all nodes. When the process of step S104 ends, the shear force distribution deriving process ends.

Figure 11:
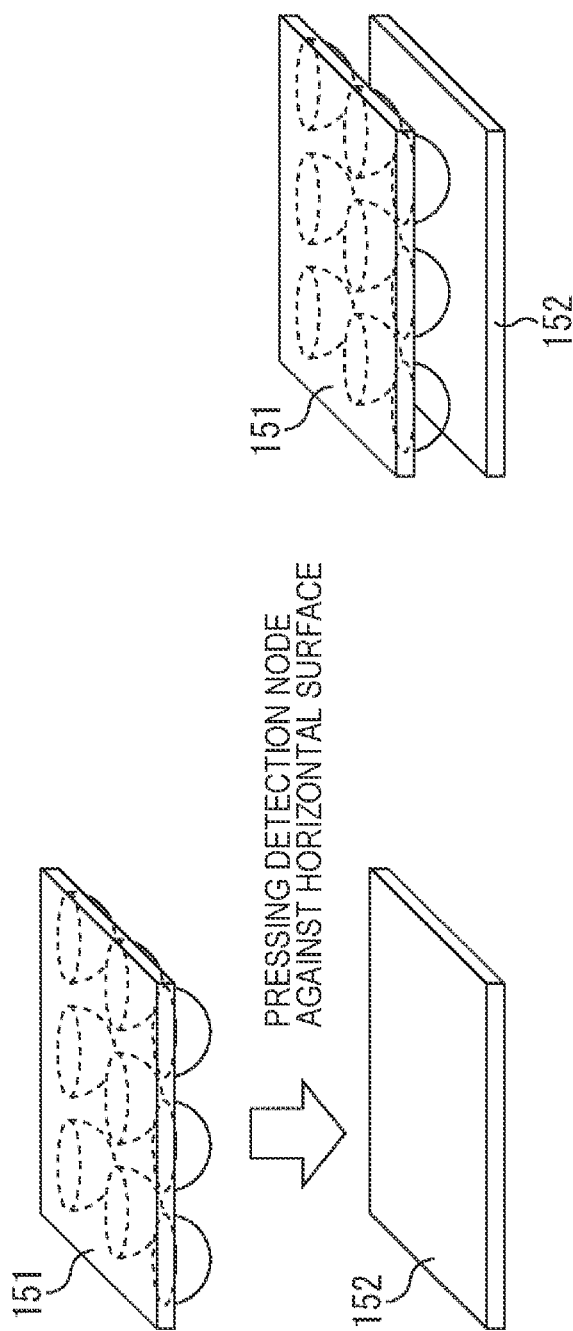
FIG. 11 is a diagram for describing calibration of the relationship between a shear displacement and a shear force.
Figure 12:
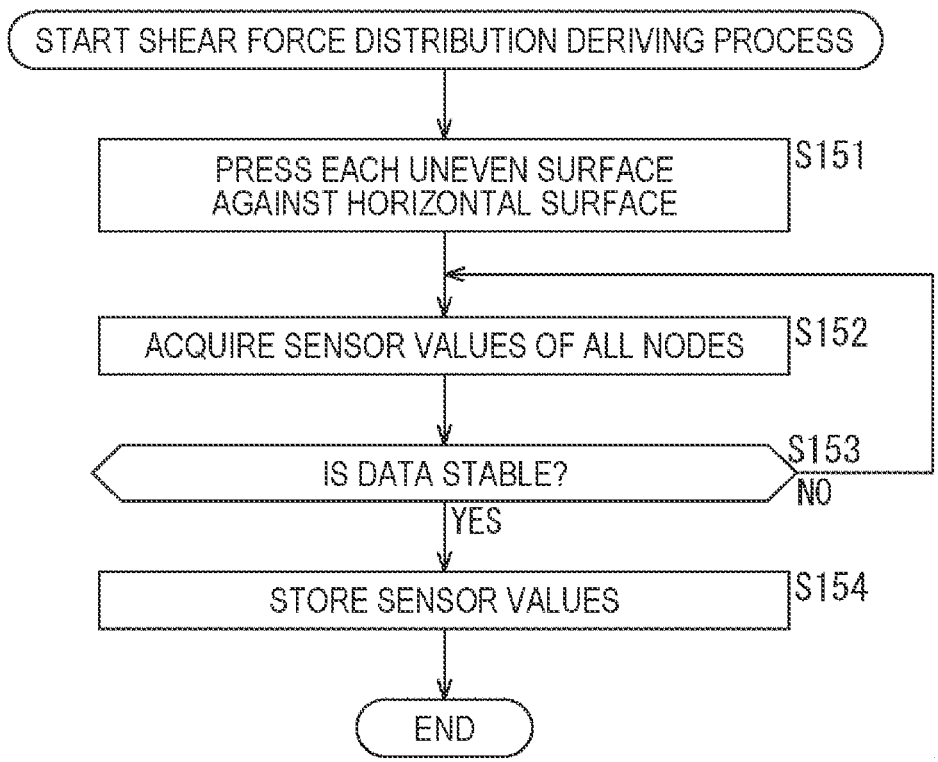
FIG. 12 is a flowchart illustrating an example of a procedure of a shear force distribution adjusting process.

When the shear displacement is converted into the shear force in this way, the relationship between the shear displacement and the shear force may be calibrated in advance. As a calibration method, for example, as illustrated in FIG. 11, a method of pressing a detection node 151 against a horizontal surface 152 or the like to acquire a sensor value can be considered. An example of a procedure of the shear force distribution deriving process executed to perform such calibration will be described with reference to a flowchart of FIG. 12.

When the shear force distribution deriving process is started, in step S151, the control device 101 controls the gripping device 102 to press each uneven surface of the detection node 151 against the horizontal surface 152.

In step S152, the control device 101 controls the gripping device 102 to acquire sensor values of all the nodes.

In step S153, the control device 101 determines whether or not data of the sensor values is stable. In a case where it is determined that the data is not stable, the process returns to step S152. The processes of steps S152 and S153 are repeated until the data is stable. Then, in a case where it is determined in step S153 that the data is stable, the process proceeds to step S154.

In step S154, the control device 101 stores the sensor values. When the process of step S154 ends, the shear force distribution deriving process ends.

<Method 3: Method Using Temporal Change in Shear Displacement Distribution and Shear Force Distribution>

"Method 2" described above is a method of obtaining the sticking ratio from distribution information of the shear displacement and the shear force at a certain time. In addition, the sticking ratio can be obtained from a temporal change in the distribution information.

Figure 13:
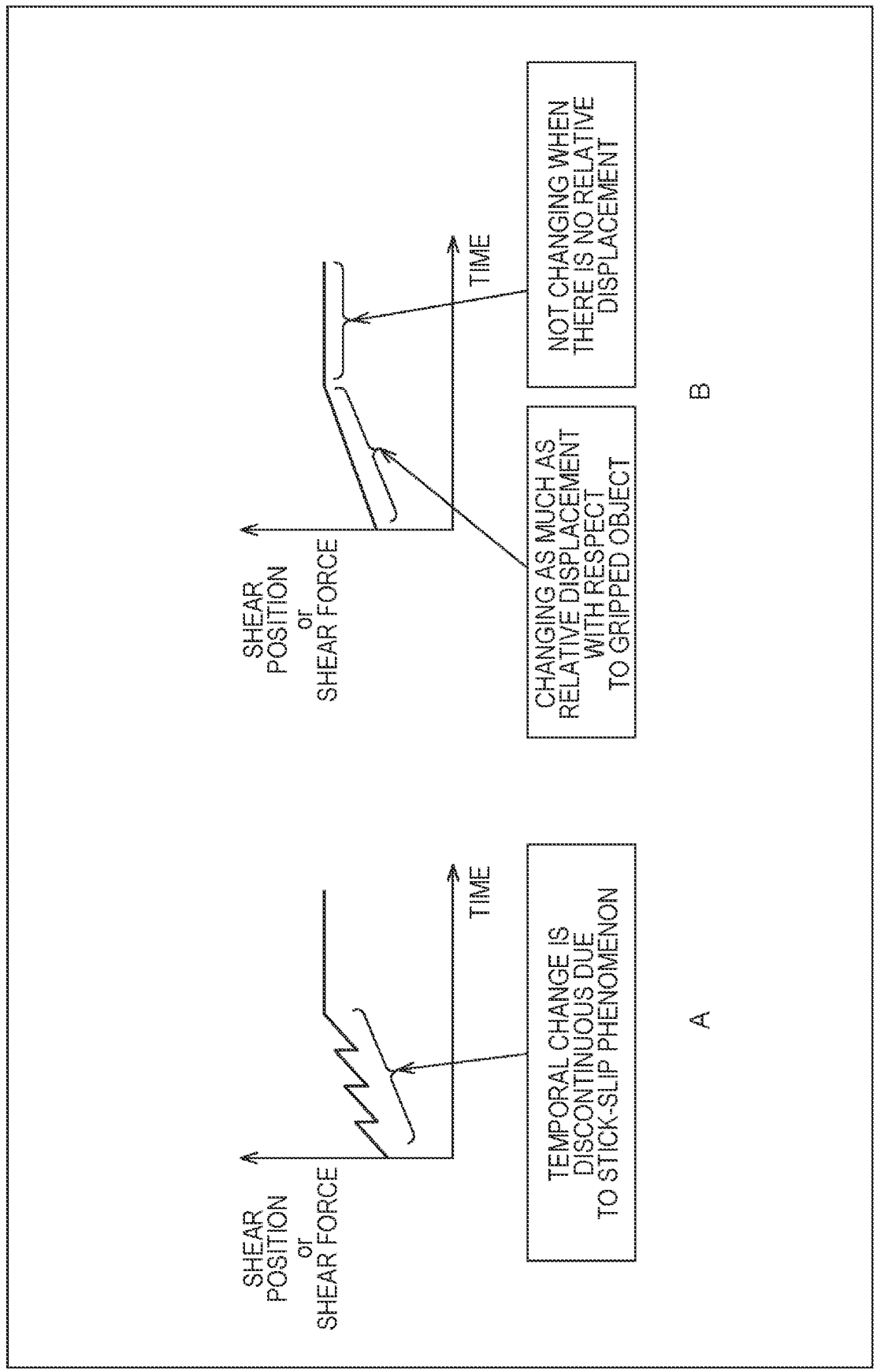
FIG. 13 is a diagram for describing a time-series change in the shear force.

For example, in the slip region, a phenomenon called a stick-slip phenomenon in which the "slip" and the "sticking" are repeated may be generated. When the phenomenon is generated, a change as illustrated in a graph in A of FIG. 13 is observed as the temporal change in the shear displacement and the shear force in the slip region. If the discontinuous change on the time axis is measured, it is possible to determine whether an observation point is the slip region or the sticking region.

In addition, since the dynamic friction is generated in the slip region, the shear force and the shear displacement may have constant values according to Coulomb's law. When the phenomenon is generated, a change as illustrated in B of FIG. 13 is observed, in which the change becomes constant when the sticking state transitions to the slip state. If the change on the time axis is measured, it is possible to determine whether the observation point is the slip region or the sticking region.

If the above process is repeatedly performed at all observation points in the contact region, the ratio of the sticking region can be calculated, and the sticking ratio can be measured.

<Fusion Between Method 1 and Method 2 (or Method 3)>

In the case of Method 1, the change in the sticking ratio is predicted from the information regarding the curvature or shape of the contact surface or the like, and the gripping force is controlled. In the case of Method 2, the sticking ratio is obtained from the actual measurement results. That is, it can be said that Method 1 is a feedforward method that predicts the change in the sticking ratio in advance, and Method 2 is a feedback method using the actual measurement results. Therefore, if both of these methods are combined for performing control, it is possible to perform control robust against a modeling error between model information of the contact surface and the actual contact surface, and to improve responsiveness by the prediction of the sticking ratio. Since Method 3 can also be said to be a feedback method like Method 2, Method 1 and Method 3 can also be combined in a similar manner.

Specific Example of Method of Measuring Shear Displacement Amount

<Method Based on Pressure Distribution Sensor>

When a flexible deformation layer (a contact portion in contact with the gripped object) of the fingertip is deformed in the shear direction, a pressure distribution changes similarly. Therefore, the change in the pressure distribution is detected so that the shear displacement can be measured. Examples of a method of detecting the change in the pressure distribution include the following methods.

Measurement of CoP Movement Amount (Method of Obtaining Center of Pressure)

The center of pressure is a center point of the pressure distribution, and is defined by the following equation (5).

[Math. 5]

$$x_{cop} = \frac{\sum^{N} \{p(x_i) \cdot x_i\}}{\sum^{N} p(x_i)} \quad (5)$$

A CoP movement amount ($\Delta x_{cop}$) before and after occurrence of shearing is calculated, and the calculated value is used as the shear displacement amount ($u_x$). The CoP is a pressure center value, and is a point of action of a force in a case where pressures distributed with a spatial extent are collectively expressed as one force. A unit of the CoP movement amount is a unit of length (for example, m or the like). In many cases, the Cop is obtained as coordinates. The Cop is a concept similar to the center of gravity. In addition, in the equation (5), in a case where $u_x$ and $\Delta x_{cop}$ do not match, correction may be performed by use of a correction coefficient or correction function or the like.

Maximum Pressure Point

The displacement in the shear direction is calculated from coordinates of the maximum pressure value. For example, as illustrated in A of FIG. 14, when a flexible deformation layer 161 is deformed by coming into contact with an object 162, the position of the maximum pressure point in the pressure distribution generated by the contact of the object 162 changes. Therefore, as illustrated in B of FIG. 14, a displacement 163 of the maximum pressure point is obtained as the displacement in the shear direction. Note that the maximum pressure is susceptible to noise, a filter generally used in image processing, such as an averaging filter, may be used, for example.

<Method Based on Image Sensor>

Figure 15:
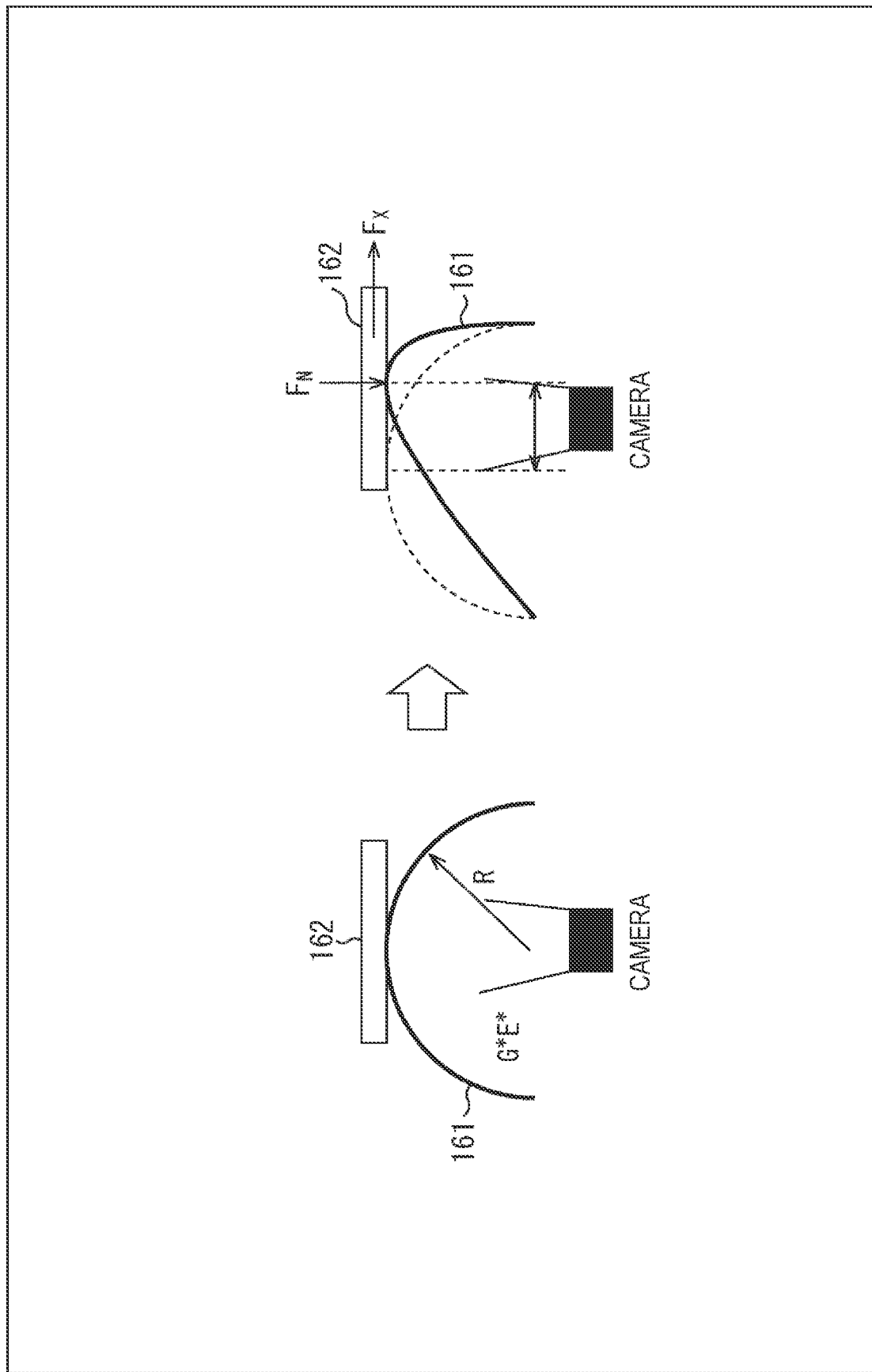
FIG. 15 is a diagram for describing the maximum pressure point measurement based on an image sensor.

As illustrated in FIG. 15, in a case of a sensor of a type in which the contact surface is imaged by a camera or the like, the shear displacement can be detected by the following methods.

Method of Calculating Movement Amount of Entire Contact Region

Figure 16:
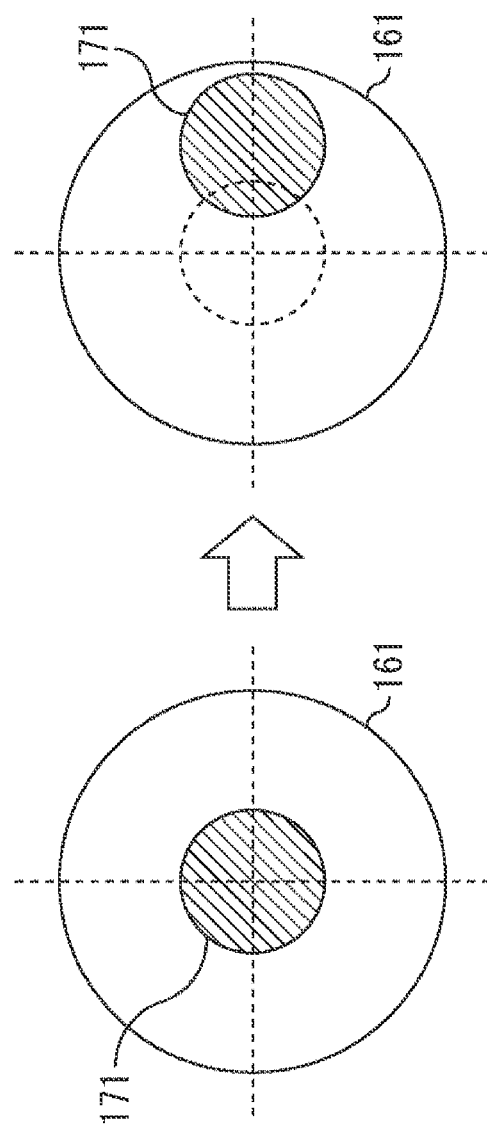
FIG. 16 is a diagram for describing measurement of a contact region change.

The contact region can be distinguished from a non-contact region by use of a change in color or texture or the like. Therefore, as in an example illustrated in FIG. 16, a movement amount of an entire contact region 171 is obtained, so that the shear displacement amount can be calculated.

Feature Point Tracking Method

Figure 17:
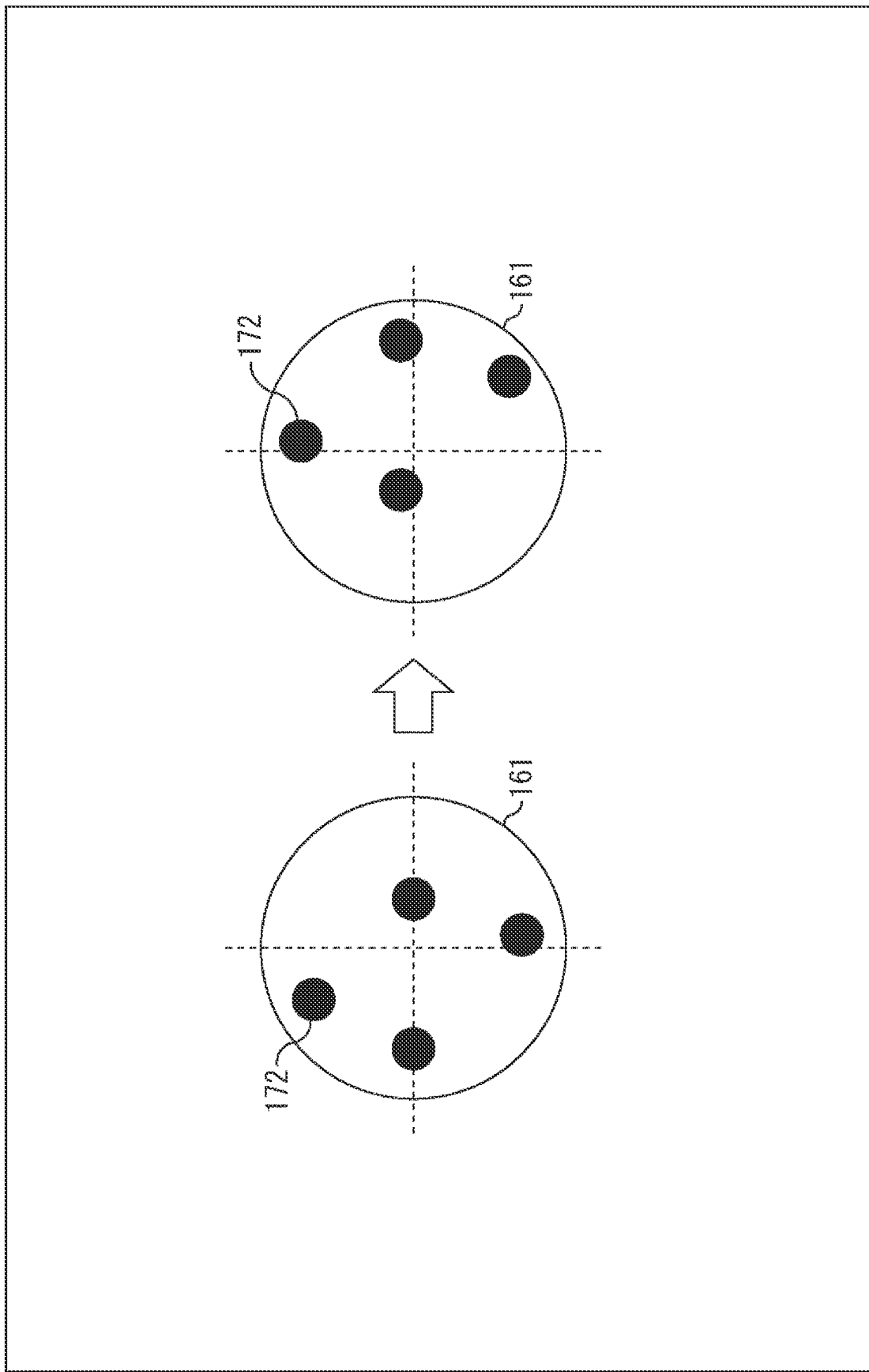
FIG. 17 is a diagram describing measurement of the contact region change by tracking of a feature point.

As illustrated in FIG. 17, tracking a feature point of a surface of the gripped object on the contact surface or tracking a marker 172, a scale, or the like provided in advance in the flexible deformation layer makes it possible to detect the shear displacement.

Figure 18:
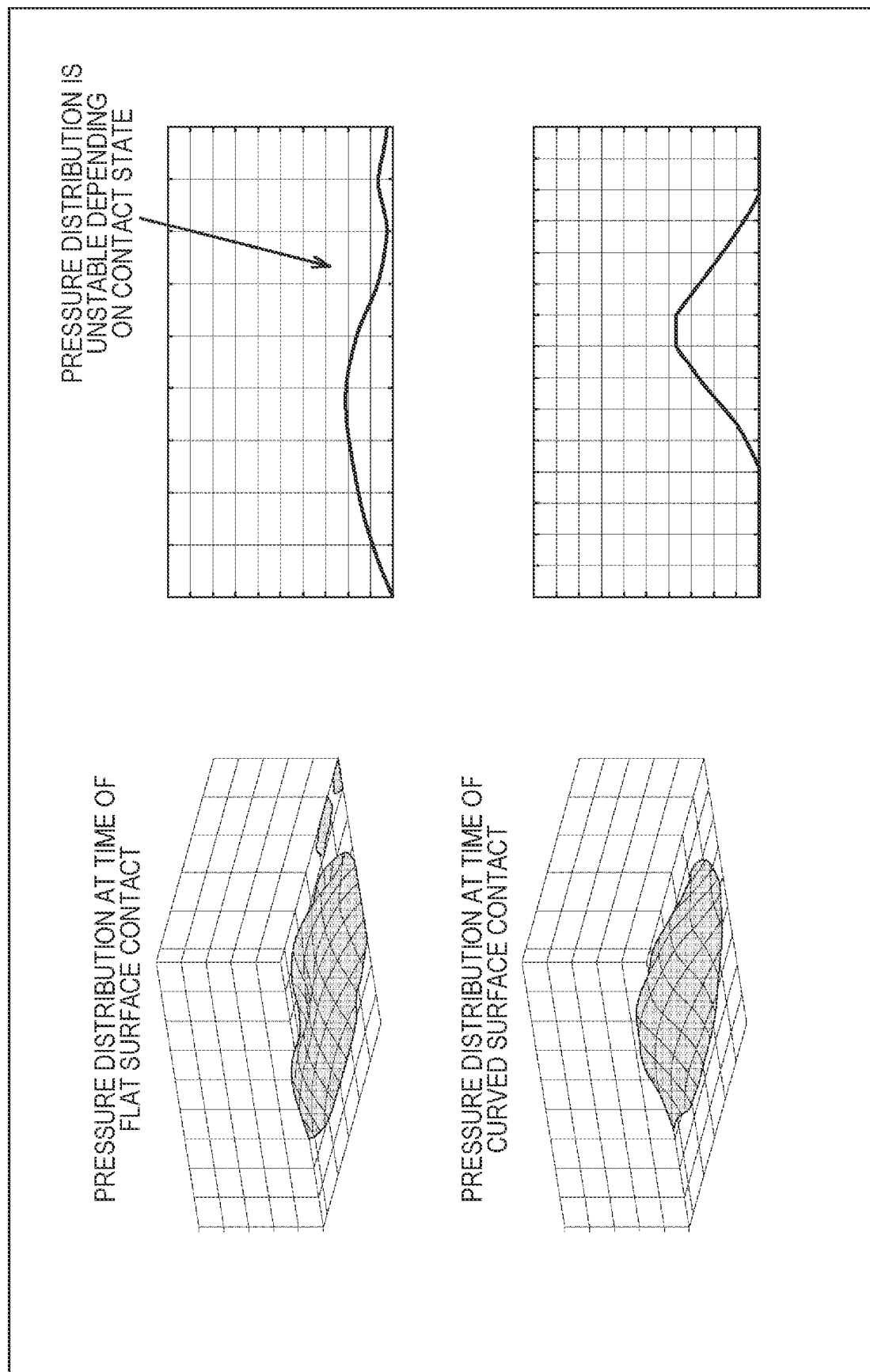
FIG. 18 is a diagram for describing an example of a pressure distribution.

In a case where the shear displacement is obtained by the above methods, the accuracy can be further improved if the contact surface is formed in a curved surface. For example, as illustrated in FIG. 18, comparing the pressure distribution at the time of flat surface contact with the pressure distribution at the time of curved surface contact, the pressure distribution in the case of the flat surface contact is more unstable depending on a contact state than in the case of the curved surface contact, and there is a possibility that the shear displacement cannot be stably measured.

2. Second Embodiment

<Gripping Device>

Figure 19:
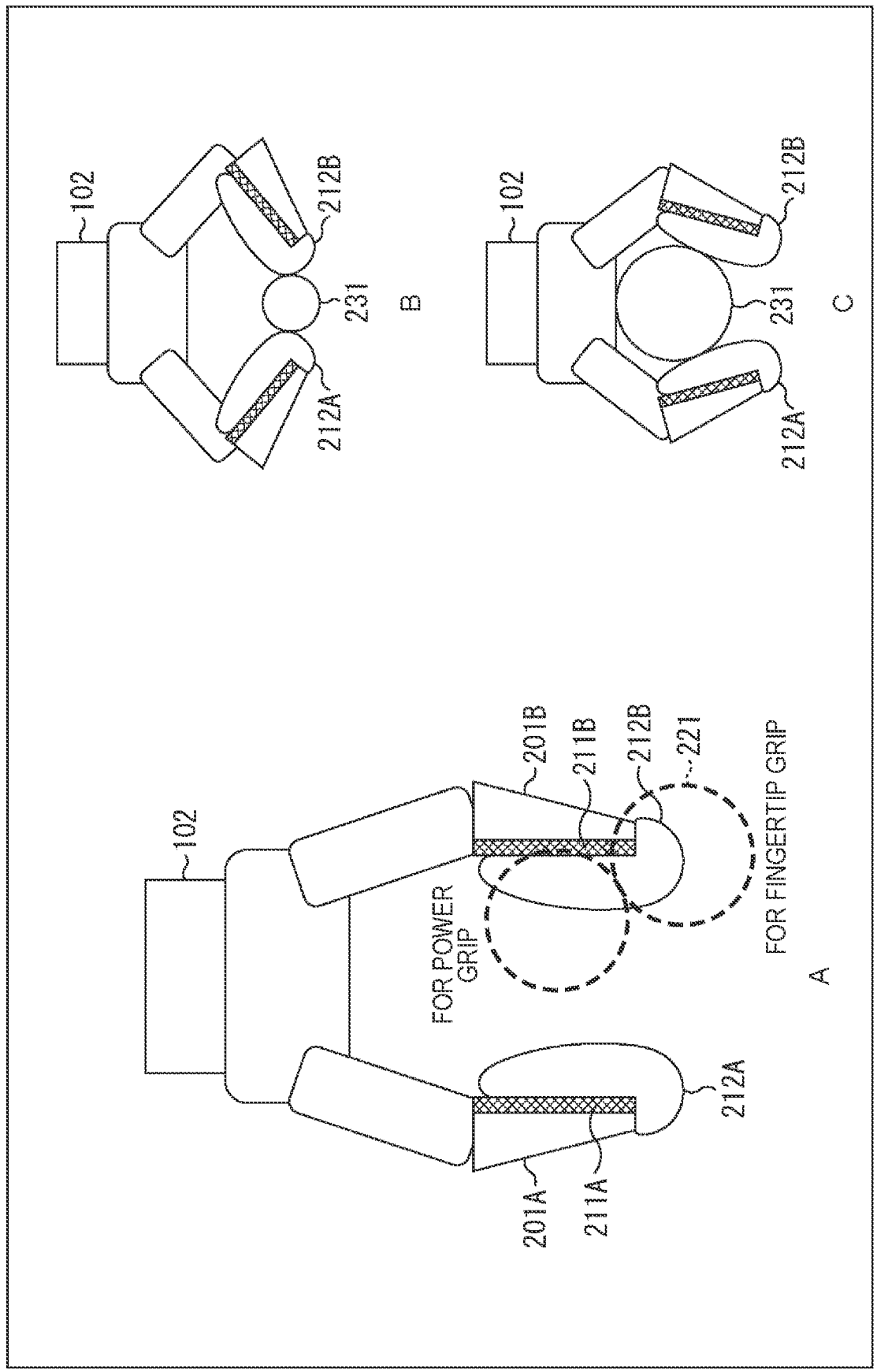
FIG. 19 is a diagram illustrating a main configuration example of a gripping device.

A of FIG. 19 illustrates a main configuration example of the gripping device 102, which is an embodiment of a support device to which the present technology is applied. As illustrated in A of FIG. 19, the gripping device 102 includes finger portions 201A and 201B, and can grip an object using these portions. Hereinafter, the finger portions 201A and 201B will be referred to as a finger portion 201 in a case where it is not necessary to distinguish the finger portions 201A and 201B from each other for description. Here, the description will be made assuming that the gripping device 102 includes two finger portions 201, but the gripping device 102 may include any number (for example, three or more) of finger portions 201.

The finger portion 201A is provided with a sensor 211A and a flexible deformation layer 212A. Similarly, the finger portion 201B is provided with a sensor 211B and a flexible deformation layer 212B. The sensors 211A and 211B are referred to as a sensor 211 in a case where it is not necessary to distinguish the sensors 211A and 211B from each other for description. In addition, the flexible deformation layers 212A and 212B will be referred to as a flexible deformation layer 212 in a case where it is not necessary to distinguish the flexible deformation layers 212A and 212B from each other for description. That is, the sensor 211 and the flexible deformation layer 212 are formed on each of the plurality of finger portions that grips the object.

The sensor 211 can include any sensing device such as a pressure sensor or an image sensor, for example, and can detect any information corresponding to the sensing device. For example, the sensor 211 detects information regarding a shear force of a portion of a surface of the flexible deformation layer 212 in contact with the object.

For example, the sensor 211A detects predetermined information (information detectable by the sensing device) regarding a contact surface between the flexible deformation layer 212A and the object by using the sensing device. Furthermore, for example, the sensor 211B detects predetermined information (information detectable by the sensing device) regarding a contact surface between the flexible deformation layer 212B and the object by using the sensing device.

Each of the sensors 211 is communicably connected to the control device 101 by a circuit (not illustrated) or the like, and supplies the detected information to the control device 101.

The flexible deformation layer 212 is an elastic body that comes into contact with the supported object on at least a part of the surface of the flexible deformation layer 212. As described in the first embodiment, the rate of change in the sticking ratio varies depending on the curvature or shape of the curved surface. Using an elastic body having a plurality of curvatures and shapes by making use of this property makes it possible to design a sticking ratio measurement accuracy required for operation or application.

When the object gripping is classified by rough gripping forms, the object gripping is classified into two types: a power grip for performing gripping so as to clasp an object 231 as illustrated in C of FIG. 19, and a precision grip (fingertip grip) for performing gripping so as to pinch the object 231 as illustrated in B of FIG. 19. The power grip is used in a case where the gripped object has a high mass or in a case where it is necessary to support a moment acting on the object as in a handle portion of a frying pan, for example. Therefore, the portion of the surface of the flexible deformation layer 212 that comes into contact with the object at the time of power grip is configured by a curved surface having a small curvature so that the contact area tends to be large.

On the other hand, the precision grip can measure and grip the object with higher accuracy. For example, the precision grip is used in a case where a very soft and brittle object or the like is gripped. Therefore, the portion of the surface of the flexible deformation layer 212 that comes into contact with the object at the time of precision grip is configured by a curved surface having a large curvature so that the contact area tends to be small.

That is, the surface of the flexible deformation layer 212 has the plurality of curvatures different from each other (is configured by the plurality of curvatures). For example, a surface of the flexible deformation layer 212 around a fingertip of the finger portion 201 is formed with a curved surface having a large curvature for the precision grip, and a surface of the flexible deformation layer 212 at a pad portion of the finger portion 201 is formed with a curved surface having a small curvature. With such a configuration, the flexible deformation layer 212 can cope with gripping of both the power grip and the precision grip. Such a configuration makes it possible to suppress a decrease in the detection accuracy of the sticking ratio in the precision grip, and also makes it possible to suppress a reduction in the contact area in the power grip. Needless to say, the surface of the flexible deformation layer 212 may have three or more kinds of curvatures. That is, it is possible to cope with more various gripping methods. In addition, fingertips having different curvatures may be mounted on different fingers. It is conceivable to perform control such as changing the finger to be used depending on the gripped object.

Modified Example

Figure 20:
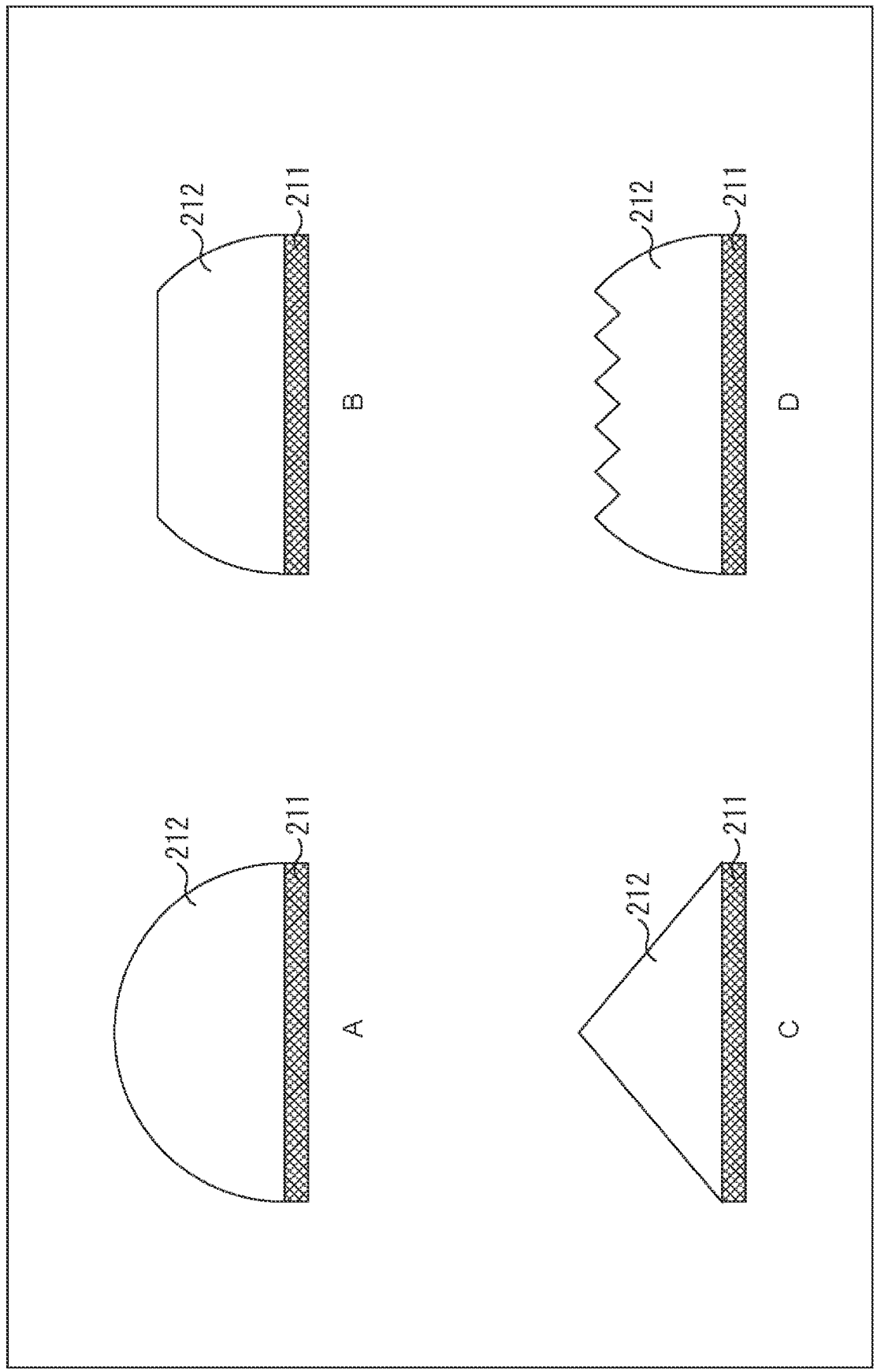
FIG. 20 is a diagram for describing a configuration example of a flexible deformation layer.

For example, as in an example illustrated in A of FIG. 20, the flexible deformation layer 212 may be laminated on the sensor 211. In this case, it is sufficient that the sensor 211 can obtain information regarding the contact portion between the flexible deformation layer 212 and the object (for example, information regarding the shear force) via the flexible deformation layer 212. For example, in a case where the sensor 211 detects the information regarding the contact portion using the image sensor, it is sufficient that a transparent material is used for the flexible deformation layer 212 so that the image sensor can image the state of the contact portion via the transparent flexible deformation layer 212. With such a configuration, the control device 101 can stably determine the slip region and the sticking region, and the gripping device 102 can grip the object with the minimum force without slipping. Needless to say, the flexible deformation layer 212 does not have to be laminated on the sensor 211, and the sensor 211 may detect the information regarding the contact portion without interposing the flexible deformation layer 212.

Furthermore, as in an example illustrated in B of FIG. 20, the surface of the flexible deformation layer 212 may be configured by a flat surface and a curved surface. Such a configuration makes it possible to determine the slip region and the sticking region without reducing the contact area (while keeping the contact area large). Note that, as in an example illustrated in C of FIG. 20, the surface of the flexible deformation layer 212 may be calibrated in a conical shape.

Furthermore, as in an example illustrated in D of FIG. 20, the surface of the flexible deformation layer 212 may be configured by a surface having an unevenness (jagged surface) and a curved surface. Such a configuration makes it possible to detect the change in the sticking ratio while a reduction in the friction coefficient is suppressed.

In addition, the surface of the flexible deformation layer 212 may have a curvature corresponding to a direction. For example, the surface of the flexible deformation layer 212 may have a predetermined curvature only in a predetermined direction as in an example illustrated in A of FIG. 21. In the case of A of FIG. 21, the surface of the flexible deformation layer 212 is configured in a semi-cylindrical shape and has a predetermined curvature in a direction perpendicular to a longitudinal direction of the semi-cylindrical shape (a slip direction indicated by an arrow in the drawing). In a case where the flexible deformation layer 212 having such a shape detects a slip in the predetermined direction (slip direction), the slip detection accuracy can be improved as compared with other directions.

Therefore, for example, it is possible to perform an operation of making contact without slipping the object in a specific direction or an operation of slipping the object in a specific direction. In addition, since the shape of the flexible deformation layer 212 is simpler, the flexible deformation layer 212 can be more easily manufactured. Furthermore, an increase in manufacturing cost can be further suppressed.

Figure 21:
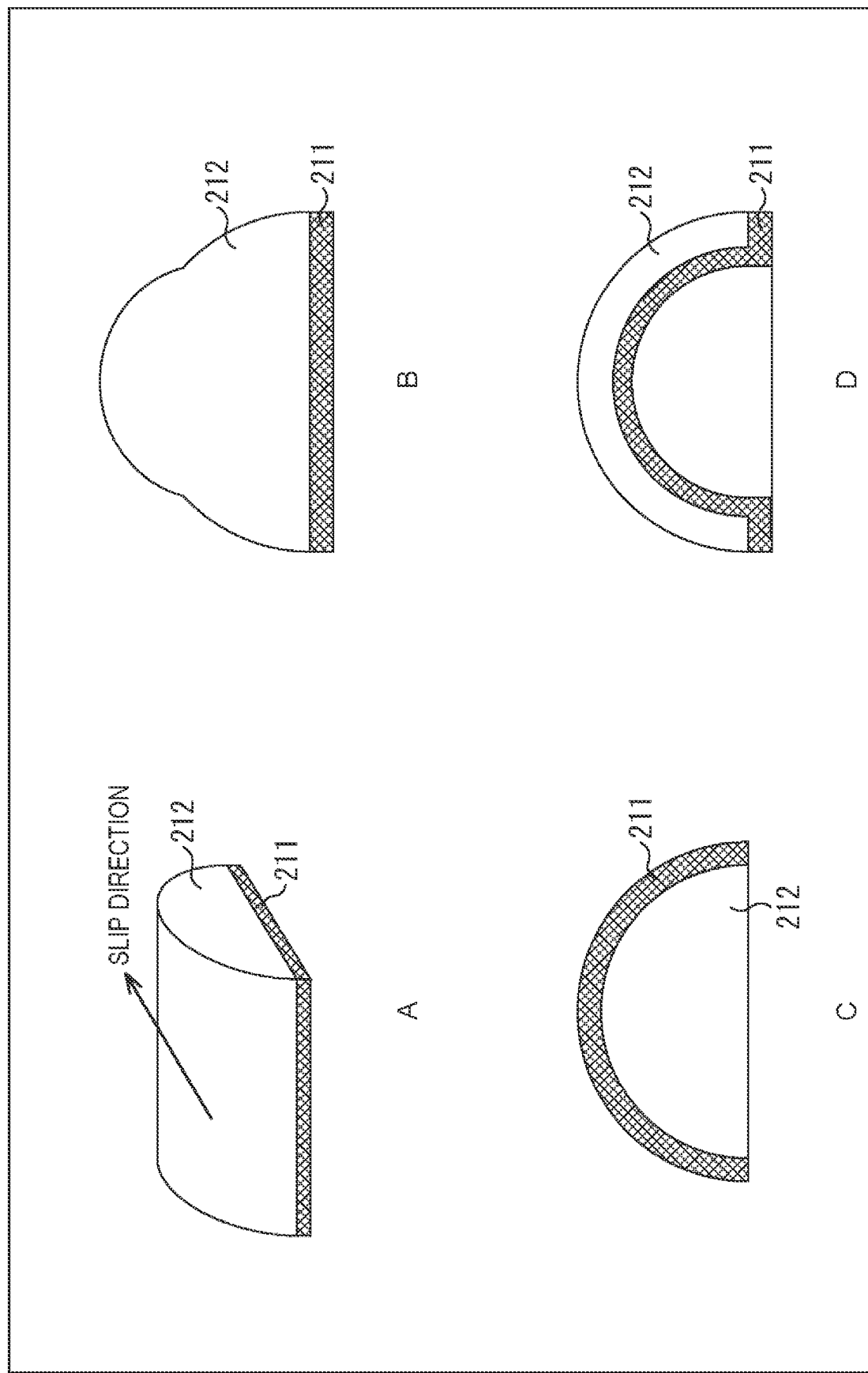
FIG. 21 is a diagram for describing a configuration example of the flexible deformation layer.

Furthermore, as in an example illustrated in B of FIG. 21, a portion of the surface of the flexible deformation layer 212 that may come into contact with the object may have a plurality of curvatures different from each other. With such a configuration, the slip detection accuracy and the extent of the contact area can be adjusted according to a dynamic range of the gripping force. For example, in the configuration as illustrated in B of FIG. 21, the slip detection accuracy can be improved in a portion where the gripping force is small, and conversely, the reduction in the contact area can be suppressed in a portion where the gripping force is large.

Furthermore, as in examples illustrated in C and D of FIG. 21, the sensor 211 may be arranged in a curved surface shape. In the case of the example in C of FIG. 21, the sensor 211 is laminated on the flexible deformation layer 212 having a curved surface. In addition, in the case of the example of D of FIG. 21, the sensor 211 is arranged in a curved surface shape, and the flexible deformation layer 212 is laminated thereon. With such a configuration, the contact object or the environment comes into direct contact with the sensor, and thus, the slip detection can be performed more accurately.

Furthermore, the hardness of the flexible deformation layer 212 may be non-uniform. That is, the hardness of the flexible deformation layer 212 may vary from place to place. For example, as illustrated in A of FIG. 22, the flexible deformation layer 212 may be divided into three in a vertical direction, and the hardness of flexible deformation layers 212-1 and 212-3 may be higher than the hardness of a flexible deformation layer 212-2 (the hardness of the flexible deformation layer 212-2 may be lower than the hardness of the flexible deformation layers 212-1 and 212-2).

Figure 22:
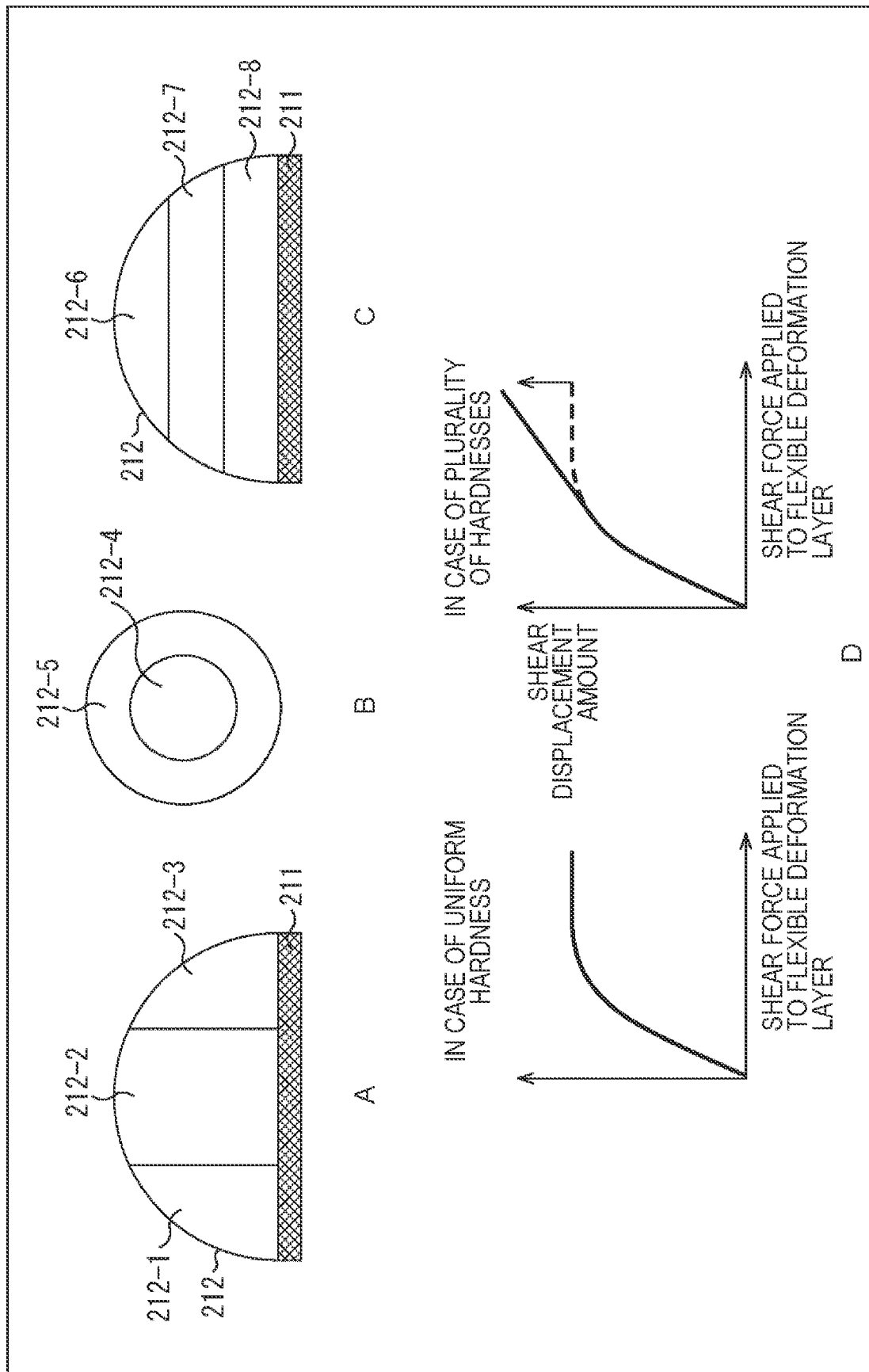
FIG. 22 is a diagram for describing a configuration example of the flexible deformation layer.

Furthermore, for example, as illustrated in B of FIG. 22, the hardness of a central portion of the flexible deformation layer 212 (flexible deformation layer 212-4) may be lower than the hardness of a peripheral portion of the flexible deformation layer 212 (flexible deformation layer 212-5). Furthermore, as illustrated in C of FIG. 22, the flexible deformation layer 212 may be divided into three in a horizontal direction, a flexible deformation layer 212-6 may have the lowest hardness, a flexible deformation layer 212-8 may have the highest hardness, and a flexible deformation layer 212-7 may have a hardness therebetween.

Such a configuration makes it possible to widen dynamic ranges of the gripping force and the shear force, in which a slip can be detected. In addition, the slip detection accuracy (sensitivity) can be adjusted according to the ranges of the gripping force and the shear force. As a result, a mass range of a grippable object can be finally widened.

As illustrated in D of FIG. 22, in a case where the flexible deformation layer with a uniform hardness is brought into contact with the object, there is a possibility that the shear displacement amount of the flexible deformation layer may be saturated at a certain shear force or more, and a slip cannot be detected with a force equal to or larger than the shear force. If the hardness is changed, the shear displacement amount of the flexible deformation layer can be adjusted according to the range of the force, and thus the dynamic range can be widened.

<Plurality of Curved Surfaces>

The above method can detect a slip in a translation direction, but it is difficult to detect a slip in a rotation direction. This is because it is difficult to detect the shear displacement amount in the rotation direction even if the slip in the rotation direction is generated. Therefore, as in an example illustrated in A of FIG. 23, the shape of the surface of the flexible deformation layer 212 may be a shape in which a plurality of curved surfaces is arranged. As illustrated in A of FIG. 23, in this case, the flexible deformation layer 212 is configured by a flat surface portion and a plurality of curved surface portions 212R protruding from the flat surface portion.

Figure 23:
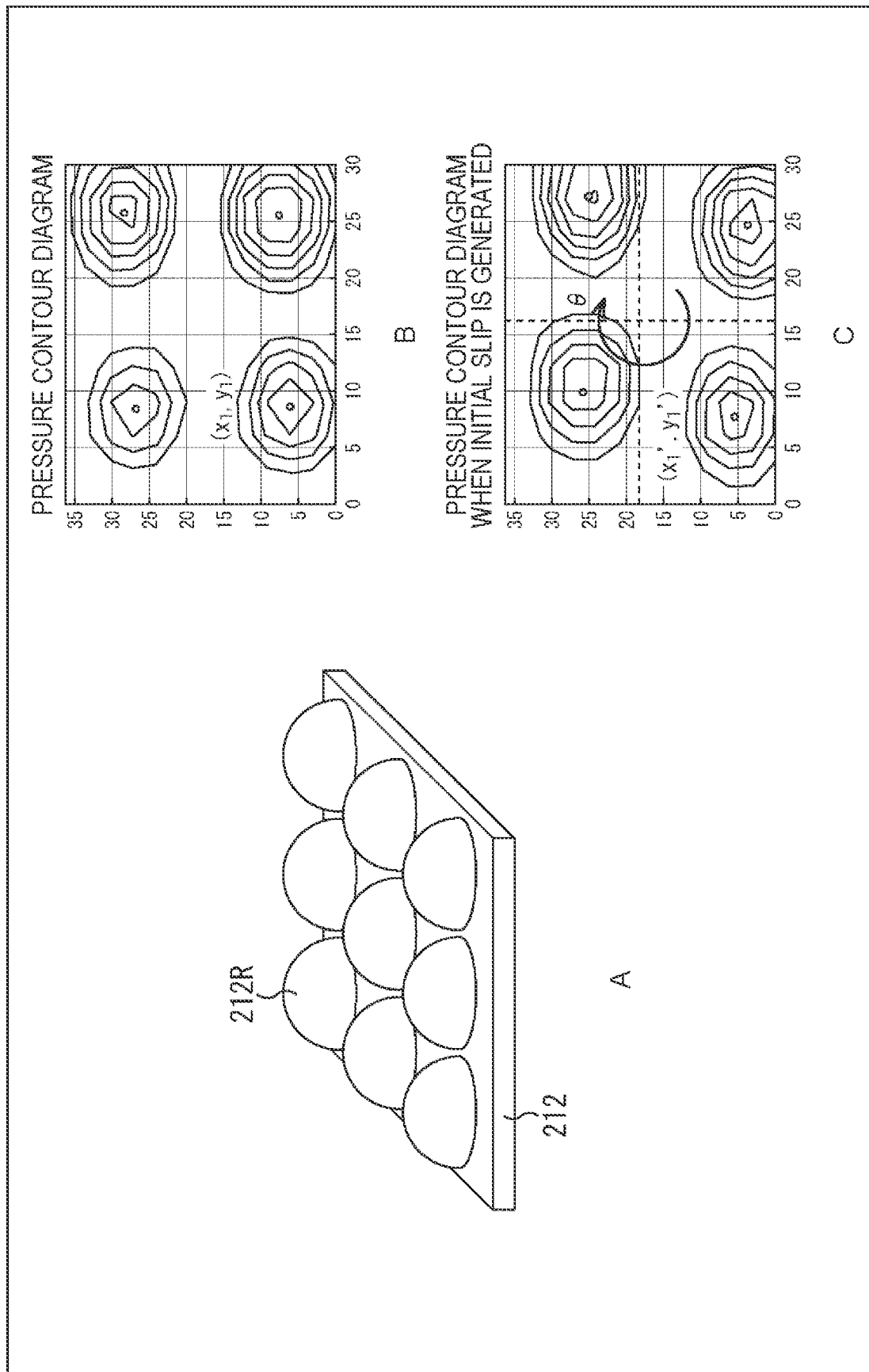
FIG. 23 is a diagram for describing an example of a method of measuring a rotational slip.

The pressure distribution when the flexible deformation layer 212 having such a shape comes into contact with the object is represented by a pressure contour diagram as illustrated in B of FIG. 23. This pressure contour diagram illustrates, as an example, a case where the number of the curved surface portions 212R is four (2×2). Coordinates of a center of pressure point in each of the curved surface portions 212R are represented by $(x_i, y_i)$.

Here, when a moment is applied to the object and the initial slip starts to be generated in the rotation direction, the center of pressure point in each of the curved surface portions 212R moves as in a pressure contour diagram in C of FIG. 23. Coordinates of each center of pressure point after the movement are expressed as $(x_1', y_1')$.

The relationship between the CoP positions before and after the rotation and the shear displacement can be expressed as the following expression (6), where the shear displacement amount in the rotation direction is θ and the shear displacement amount in the translation direction is $(t_x, t_y)$.

[Math. 6]

$$\begin{bmatrix} x_i' \\ y_i' \\ 1 \end{bmatrix} = \begin{bmatrix} \cos\theta & -\sin\theta & t_x \\ \sin\theta & \cos\theta & t_y \\ 0 & 0 & 1 \end{bmatrix} \begin{bmatrix} x_i \\ y_i \\ 1 \end{bmatrix} \qquad (6)$$

This relational expression is derived for the number of the curved surface portions 212R, and the unknowns θ, $t_x$, and $t_y$ can be obtained from results of the derivation. Specific examples of the method include a least squares method or the like. With this method, the shear displacement amount in the rotation direction can be obtained, and thus the sticking ratios in rotation and translation can be measured simultaneously.

Modified Example

Figure 24:
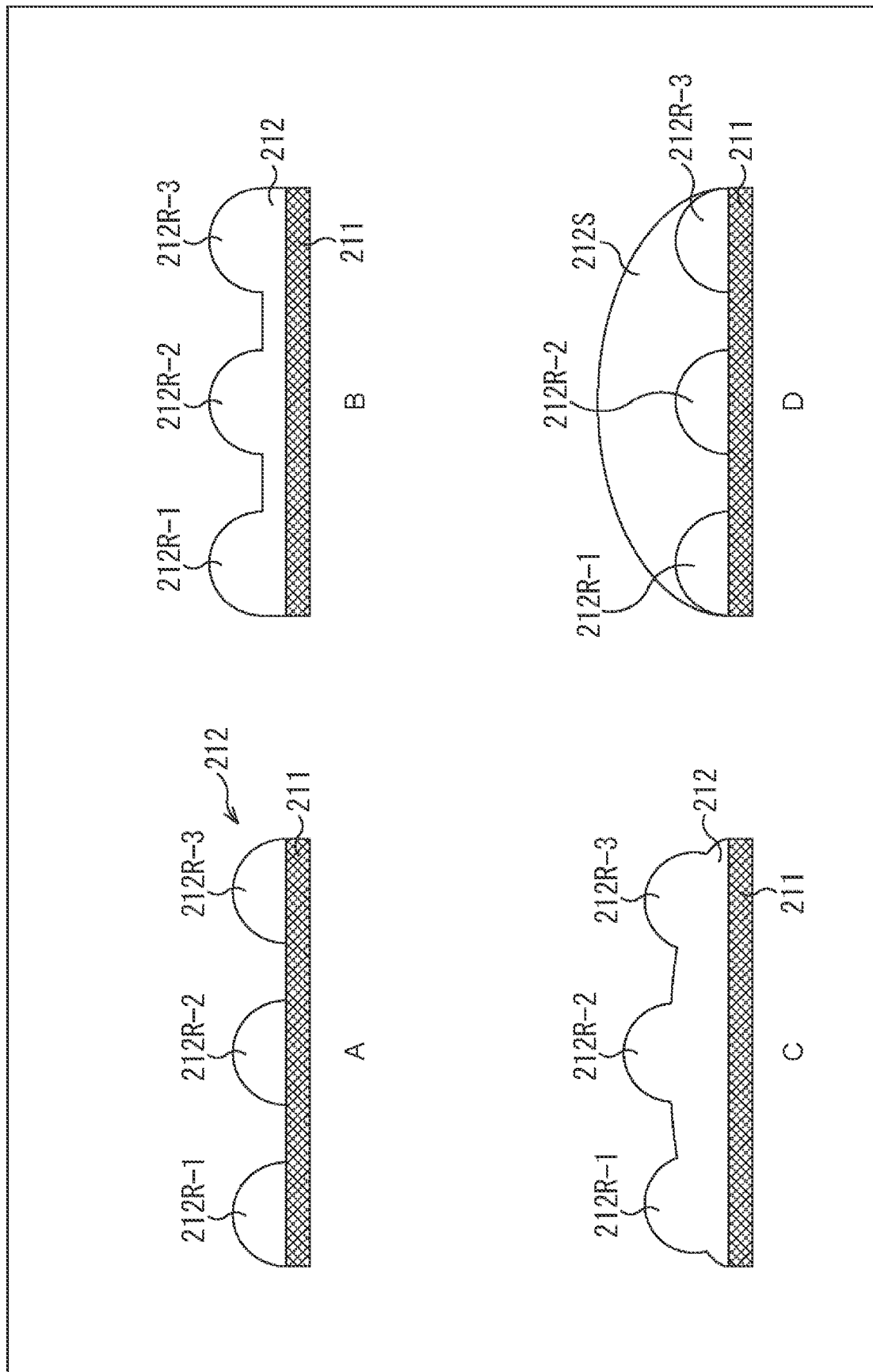
FIG. 24 is a diagram for describing a configuration example of the flexible deformation layer.

For example, as illustrated in A of FIG. 24, the plurality of portions 212R each having a curved surface, which is included in the flexible deformation layer 212, may be laminated on the sensor 211. Such a configuration makes it possible to detect the rotational slip as described above. In addition, since the gripping force control can be performed on the basis of information regarding the rotation direction, it is possible to achieve more accurate gripping force control.

Furthermore, for example, as illustrated in B of FIG. 24, the surface of the flexible deformation layer 212 may be configured by a flat surface portion and the plurality of curved surface portions 212R protruding from the flat surface portion. With such a configuration, since a space among the plurality of curved surface portions 212R is filled with the flat surface portion, the distance between the curved surface portions 212R is less likely to change. Therefore, the slip detection accuracy can be improved. In addition, since the plurality of curved surface portions 212R is coupled to one flexible layer, it is possible to more easily suppress an increase in positional deviation at the time of mounting. As a result, the slip detection accuracy can be improved.

Furthermore, for example, as illustrated in C of FIG. 24, the surface of the flexible deformation layer 212 may be configured by a first curved surface portion having a first curvature and a plurality of second curved surface portions each protruding from the first curved surface portion and each having a second curvature larger than the first curvature. With such a configuration, an envelope surface obtained by connecting vertices of the plurality of curved surface portions 212R is a curved surface. Therefore, a difference in the contact pressure is generated in the contact region, and the slip detection accuracy can be improved.

Furthermore, for example, as illustrated in D of FIG. 24, a flexible deformation layer 212S having another hardness may cover the plurality of curved surface portions 212R so as to include the plurality of curved surface portions 212R. In the case of the example of D of FIG. 24, curved surface portions 212R-1, 212R-2, and 212R-3 are covered with the flexible deformation layer 212S having a hardness different from the hardness of the curved surface portions so that the flexible deformation layer 212S includes the curved surface portions.

With such a configuration, the plurality of curved surface portions 212R does not come into direct contact with the object or the surrounding environment, and thus, wear of the curved surface portions 212R can be pushed. In addition, since the curved surface comes into contact with the object, a difference in the contact pressure is generated in the contact region, and the slip detection accuracy can be improved.

Figure 25:
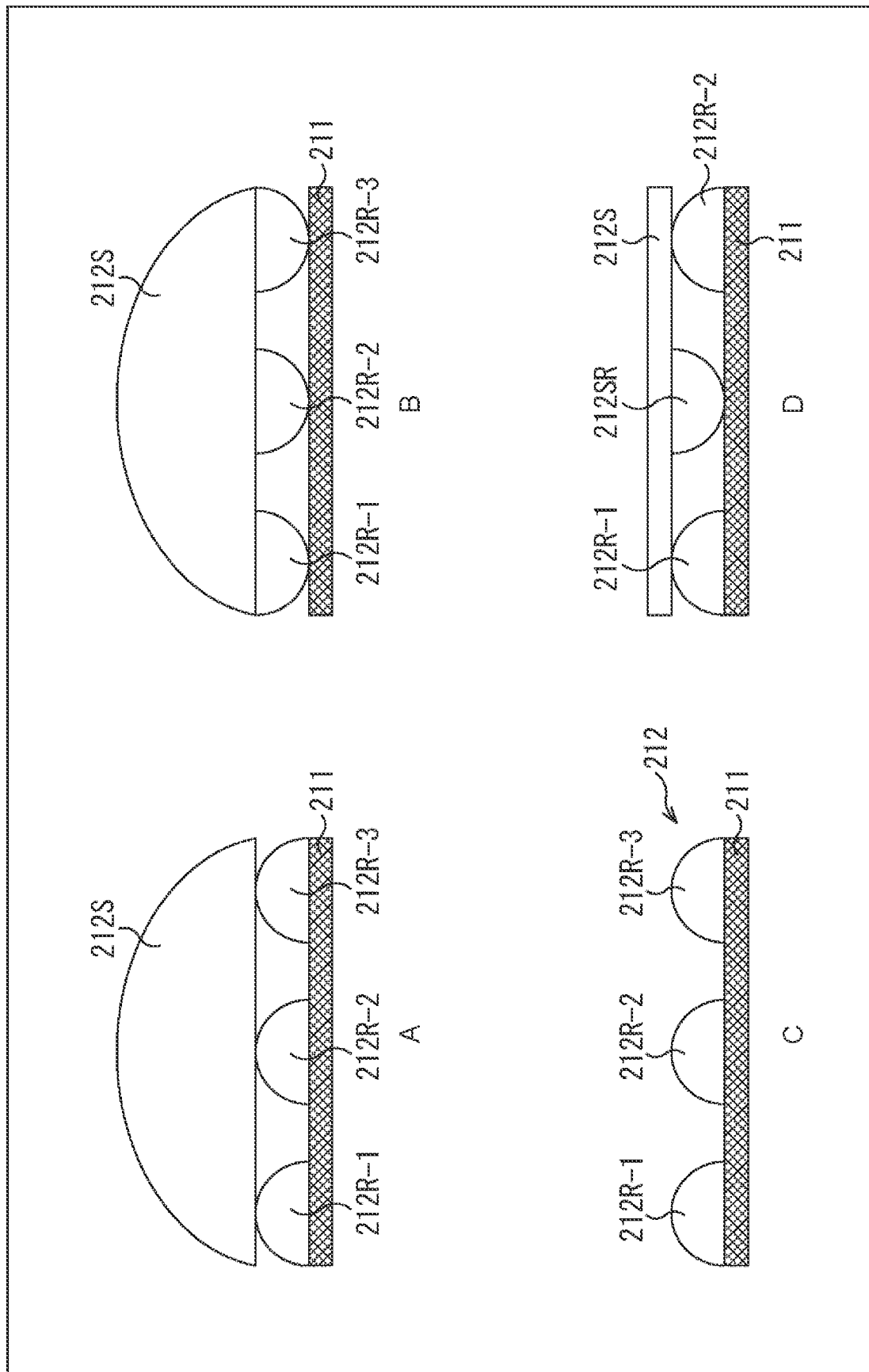
FIG. 25 is a diagram for describing a configuration example of the flexible deformation layer.

Furthermore, for example, as illustrated in A of FIG. 25 and B of FIG. 25, another flexible deformation layer 212S having a curved surface may be laminated on the plurality of curved surface portions 212R. With such a configuration, contact with the object or another environment is the curved surface contact while the rotational slip is detected, and thus, the slip detection can be performed more stably.

That is, the flexible deformation layer 212 may include a plurality of first elastic bodies each having a surface with a first curvature and a second elastic body superposed on the plurality of first elastic bodies and having a surface with a second curvature. Furthermore, the hardness of the first elastic bodies may be different from the hardness of the second elastic body.

In addition, as in an example illustrated in C of FIG. 25, the hardnesses of the plurality of curved surface portions 212R may be changed from place to place. In C of FIG. 25, respective hardnesses of the curved surface portions 212R-1 to 212R-3 are not unified (the curved surface portions 212R having hardnesses different from each other are included). That is, the plurality of elastic bodies having curved surfaces may have hardnesses different from each other.

Furthermore, as in an example illustrated in D of FIG. 25, a plurality of curved surface flexible deformation layers may be arranged so that the plurality of curved surface flexible deformation layers is sandwiched from above and below and curved surface portions do not overlap each other. In D of FIG. 25, on the flexible deformation layer 212 having the plurality of curved surface portions 212R, the flexible deformation layer 212S having a similar shape is laminated with the directions thereof turned upside down. That is, the second elastic body has a surface having the first curvature in a direction opposite to a direction of the surface of each first elastic body with the first curvature. With such a configuration, a curved surface portion 212SR of the flexible deformation layer 212S is positioned between the curved surface portions 212R-1 and 212R-2. As a result, since a spatial density of the flexible deformation layer can be increased, the number of detection points of the shear displacement increases, and the slip detection can be performed more accurately.

Figure 26:
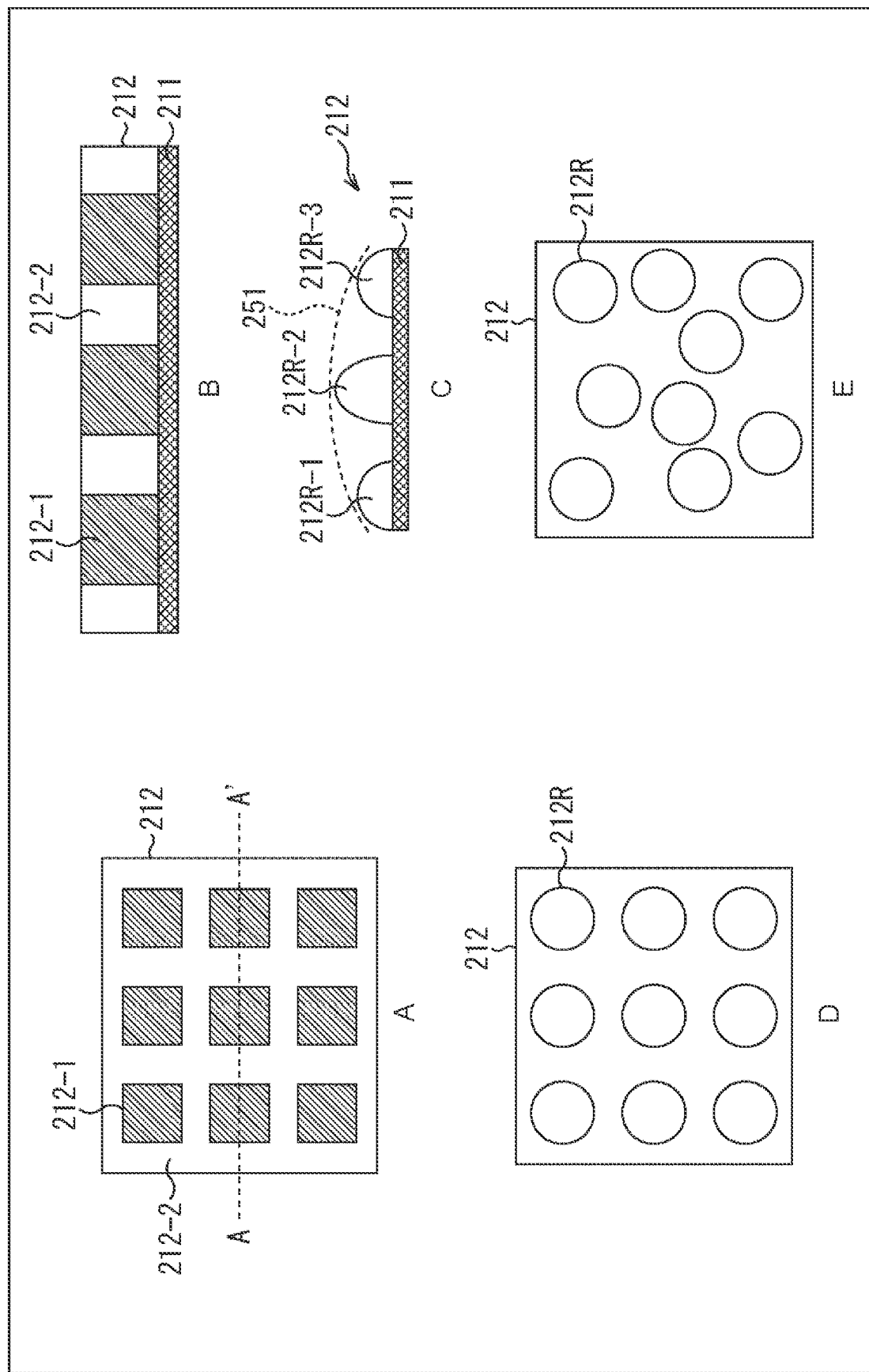
FIG. 26 is a diagram for describing a configuration example of the flexible deformation layer.

Furthermore, as in an example illustrated in A of FIG. 26, the hardness of the flexible deformation layer 212 may be locally changed. In FIG. 26, portions 212-1 indicated by diagonal line patterns, which are included in the flexible deformation layer 212, are set to have a higher hardness than a portion 212-2 indicated by a white background. A cross-sectional view taken along a dotted line A-A' in A of FIG. 26 is illustrated in B of FIG. 26. As illustrated in the cross-sectional view in B of FIG. 26, the portion 212-2 having a higher hardness than the portions 212-1 is formed from the surface to the side of the sensor 211. As described above, the flexible deformation layer 212 may have a plurality of local portions having a higher hardness than a hardness of a surrounding portion. Such a configuration makes it possible to detect the rotational slip without explicitly forming a plurality of curved surface flexible deformation layers. In addition, since an uneven shape is not formed, it is possible to reduce the possibility that each of the curved surface flexible deformation layers may be broken, for example, by being caught, which can improve the durability of the flexible deformation layer 212.

Furthermore, as in an example illustrated in C of FIG. 26, the height of an unevenness may be changed depending from place to place, and an envelope surface may be a curved surface. The envelope surface indicates a surface provided so as to be in contact with all of a plurality of curves arranged in a space. In this case, if there is a curved surface or a flat surface passing through all vertexes of the curved surface portions 212R in the flexible deformation layer 212 in which the plurality of curved surface portions 212R (uneven shape) is arranged, the curved surface or the flat surface is referred to as the envelope surface. In the case of the example in C of FIG. 26, the curved surface portion 212R-2 is higher than the curved surface portions 212R-2 and 212R-3, and an envelope surface 251 in contact with the curved surface portions (a surface indicated by a dotted line in FIG. 26) is formed in a curved surface shape. That is, the heights of the curved surface portions 212R are different from each other.

With such a configuration, when the contact with the object is made, the pressure detected on the unevenness has a value corresponding to the curved surface contact (in the case of the example of C of FIG. 26, the pressure is higher in the central portion and lower toward the periphery), and there is a difference in the contact pressure, which can improve the detection accuracy of the initial slip.

Furthermore, as in an example illustrated in D of FIG. 26, each of the curved surface portions 212R of the flexible deformation layer 212 may be formed at a position based on a predetermined regularity. In addition, as in the example illustrated in E of FIG. 26, each of the curved surface portions 212R of the flexible deformation layer 212 may be formed at any position.

The position of the curved surface flexible deformation layer is not limited in design, and is flexible with respect to an attachment position and the shape. In addition, if the density of the curved surface flexible deformation layer is changed from place to place, the slip detection accuracy can be flexibly changed according to the place, which enables a calculation load to be distributed.

Note that the above-described examples can be appropriately combined and used. For example, a modified example of a single curved surface and a modified example of a plurality of curved surfaces may be used in combination with each other.

3. Third Embodiment

<Case where Friction Coefficient is not Known in Advance>
<Control Device>

Next, the control device 101 will be described. In a case where the friction coefficient is not known in advance, the control device 101 is only required to calculate the shear displacement amount and control the gripping force so that the shear displacement is zero. In this manner, the object can be gripped without slipping.

Figure 27:
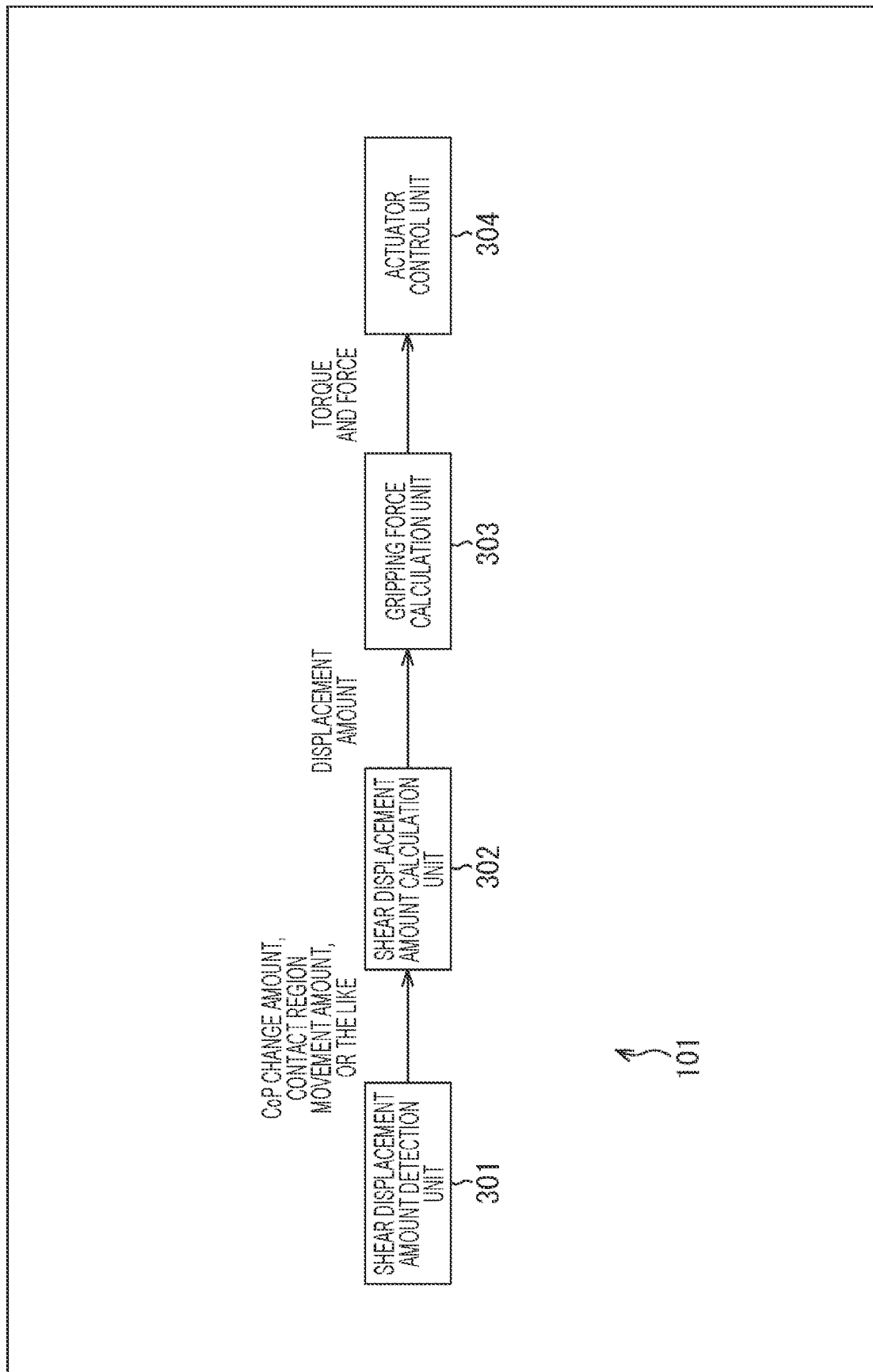
FIG. 27 is a block diagram illustrating a main configuration example of a control device.

FIG. 27 illustrates a main configuration example of the control device 101 in this case. In the case of the example of FIG. 27, the control device 101 includes a shear displacement amount detection unit 301, a shear displacement amount calculation unit 302, a gripping force calculation unit 303, and an actuator control unit 304.

When the gripping device 102 grips the object, the shear displacement amount detection unit 301 performs a process related to detection of information regarding a shear force generated between the surface of the flexible deformation layer 212 of the gripping device 102, which is the contact portion in contact with the object, and the object (also referred to as information regarding the shear force of the contact portion). For example, the shear displacement amount detection unit 301 performs a process related to detection of information regarding the shear displacement as the information regarding the shear force. In this case, the shear displacement amount detection unit 301 includes, for example, a sensor for detecting the shear displacement, such as a pressure distribution sensor or an image sensor, and a signal processing block that performs signal processing on an output signal of the sensor. As described in <Specific Example of Method of Measuring Shear Displacement Amount> in the first embodiment, the shear displacement amount detection unit 301 detects the shear displacement as a CoP change amount, a contact region movement amount, or the like. The shear displacement amount detection unit 301 supplies, to the shear displacement amount calculation unit 302, the detected information (the CoP change amount, the contact region movement amount, or the like) as the information regarding the shear force of the contact portion (or the information regarding the shear displacement).

The shear displacement amount calculation unit 302 calculates the shear displacement amount. The shear displacement amount calculation unit 302 converts the information regarding the shear force of the contact portion (or the information regarding the shear displacement, for example, the CoP change amount, the contact region movement amount, or the like) supplied from the shear displacement amount detection unit 301 into the shear displacement amount, and supplies the shear displacement amount to the gripping force calculation unit 303.

The gripping force calculation unit 303 calculates the gripping force (torque and force). The gripping force calculation unit 303 calculates a gripping force corresponding to the shear displacement amount supplied from the shear displacement amount calculation unit 302. For example, the gripping force calculation unit 303 calculates such a gripping force that the shear displacement amount supplied from the shear displacement amount calculation unit 302 is made zero. That is, the gripping force calculation unit 303 calculates the gripping force on the basis of the information regarding the shear force of the contact portion (or the information regarding the shear displacement). The gripping force calculation unit 303 supplies the calculated gripping force to the actuator control unit 304.

The actuator control unit 304 controls driving of the gripping device 102. The actuator control unit 304 controls the gripping device 102 to drive the gripping device 102 so as to generate the gripping force supplied from the gripping force calculation unit 303 (for example, the object is supported by the gripping force). That is, the actuator control unit 304, which is a drive control unit, controls driving of a support unit (for example, the gripping device 102) that supports the object, and causes the object to be supported with a supporting force controlled by a supporting force control unit (for example, the gripping force calculation unit 303).

Each processing unit (in the case of the example of FIG. 27, the shear displacement amount detection unit 301 to the actuator control unit 304) of the control device 101 can have any configuration. For example, each processing unit of the control device 101 may be configured by a logic circuit that implements the above-described processes. Furthermore, each processing unit of the control device 101 may include, for example, a central processing unit (CPU), a read only memory (ROM), a random access memory (RAM), and the like, and execute a program using the CPU, the ROM, the RAM, and the like, thereby implementing the above-described processes. Needless to say, each processing unit of the control device 101 may have both of these configurations, and a part of the above-described processes may be implemented by the logic circuit and the other processes may be implemented by the execution of the program. The same applies to other drawings described below.

<Procedure of Control Process>

An example of a procedure of a control process executed by the control device 101 in this case will be described with reference to a flowchart of FIG. 28. When the control process is started, in step S301, the shear displacement amount detection unit 301 detects the information regarding the shear force (for example, the CoP change amount, the contact region movement amount, or the like).

In step S302, the shear displacement amount calculation unit 302 calculates the shear displacement amount on the basis of the information regarding the shear force of the contact portion (or the information regarding the shear displacement) detected in step S301.

In step S303, the gripping force calculation unit 303 calculates the gripping force (supporting force) on the basis of the shear displacement amount calculated in step S302.

In step S304, the actuator control unit 304 controls driving of an actuator of the gripping device 102 so as to support the object with the gripping force (supporting force) calculated in step S303.

When the process of step S304 ends, the control process ends.

When each process is executed as described above, the control device 101 can control the gripping force (supporting force) of the gripping device 102 on the basis of the detected shear force (for example, the shear displacement) of the contact portion. Therefore, the control device 101 can cause the gripping device 102 to support the object with a more appropriate supporting force.

<Control Device>

Figure 29:
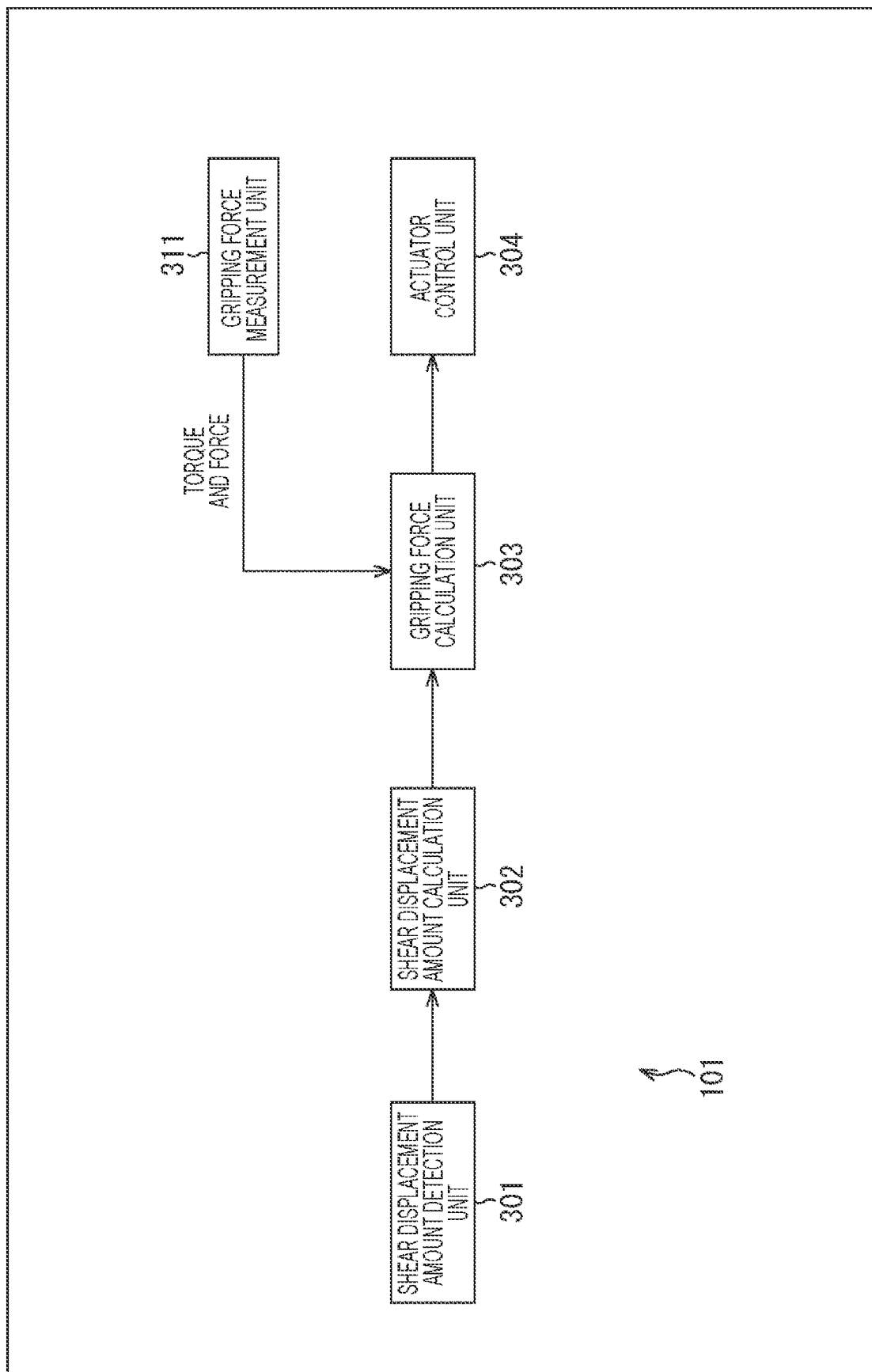
FIG. 29 is a block diagram illustrating a main configuration example of the control device.

In addition, a gripping force actually applied to the object may be measured, and the gripping force may be controlled on the basis of a measured value. FIG. 29 is a block diagram illustrating a main configuration example of the control device 101 in this case. As illustrated in FIG. 29, in this case, the control device 101 includes a gripping force measurement unit 311 in addition to the configuration of the example of FIG. 27.

The gripping force measurement unit 311 includes a torque sensor, a triaxial force sensor, or the like, and measures the gripping force actually applied to the object by the gripping device 102 (also referred to as an actual gripping force). The gripping force measurement unit 311 supplies the measured actual gripping force (torque and force) to the gripping force calculation unit 303.

The gripping force calculation unit 303 calculates the gripping force to be applied to the gripping device 102 on the basis of the shear displacement amount (that is, the information regarding the shear force of the contact portion (or the information regarding the shear displacement)) supplied from the shear displacement amount calculation unit 302 and the actual gripping force supplied from the gripping force measurement unit 311. That is, the gripping force calculation unit 303 corrects, by use of the actual gripping force, the gripping force calculated from the shear displacement amount. The gripping force calculation unit 303 supplies the calculated gripping force to the actuator control unit 304.

As described above, by feeding back the measured gripping force, the control device 101 can perform the gripping force control with higher accuracy.

<Procedure of Control Process>

Figure 30:
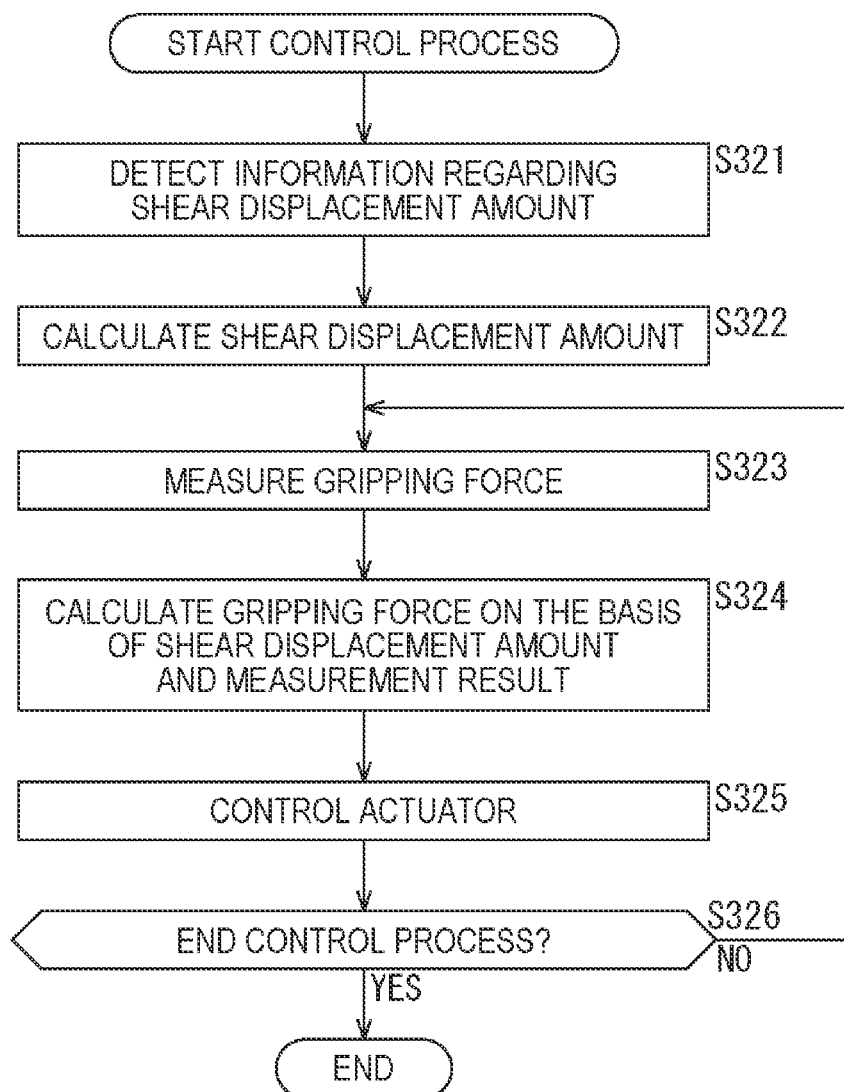
FIG. 30 is a flowchart illustrating an example of the procedure of the control process.

An example of the procedure of the control process in this case will be described with reference to a flowchart of FIG. 30. When the control process is started, respective processes of steps S321 and S322 are performed similarly to respective processes of steps S301 and S302 in FIG. 28.

In step S323 (FIG. 30), the gripping force measurement unit 311 measures the gripping force actually applied to the object.

In step S324, the gripping force calculation unit 303 calculates the gripping force to be output by the gripping device 102 on the basis of the shear displacement amount (that is, the information regarding the shear force of the contact portion (or the information regarding the shear displacement)) calculated in step S322 and the gripping force measured in step S323 (corrects the gripping force calculated on the basis of the shear displacement amount by use of the measured gripping force).

Figure 28:
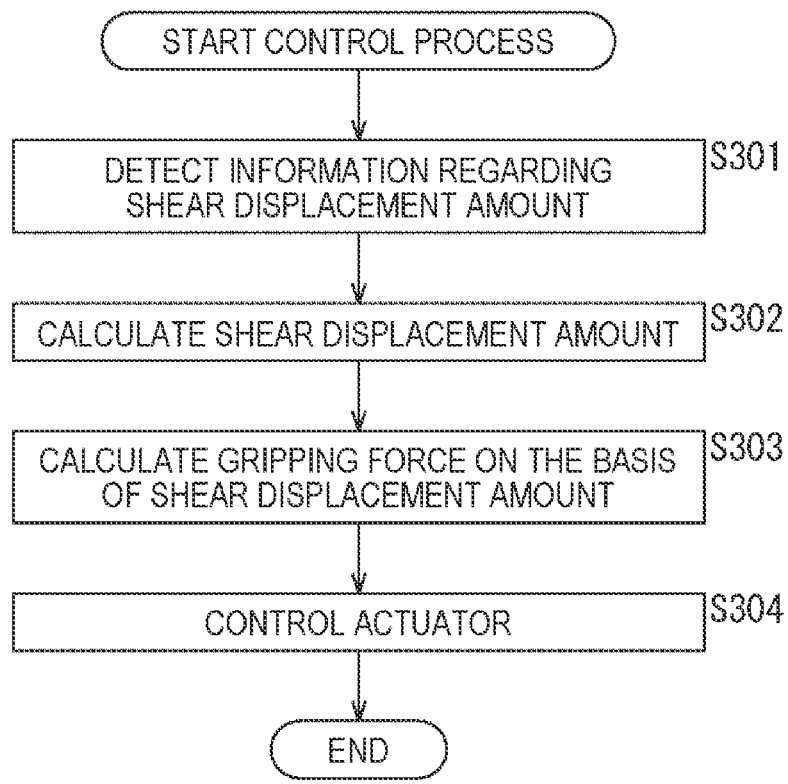
FIG. 28 is a flowchart illustrating an example of a procedure of a control process.

A process of step S325 is performed similarly to the process of step S304 (FIG. 28).

In step S326, the control device 101 determines whether or not to end the control process. In a case where it is determined not to end the process, the process returns to step S323. That is, each process of steps S323 to S326 is repeatedly executed.

Then, in a case where it is determined in step S326 that the control process is to be ended, the control process is ended.

By executing each process as described above, the control device 101 can control the gripping force (supporting force) of the gripping device 102 using the measured actual gripping force. Therefore, the control device 101 can perform more accurate gripping force control. Therefore, the control device 101 can cause the gripping device 102 to support the object with a more appropriate supporting force.

<Control Device>

Figure 31:
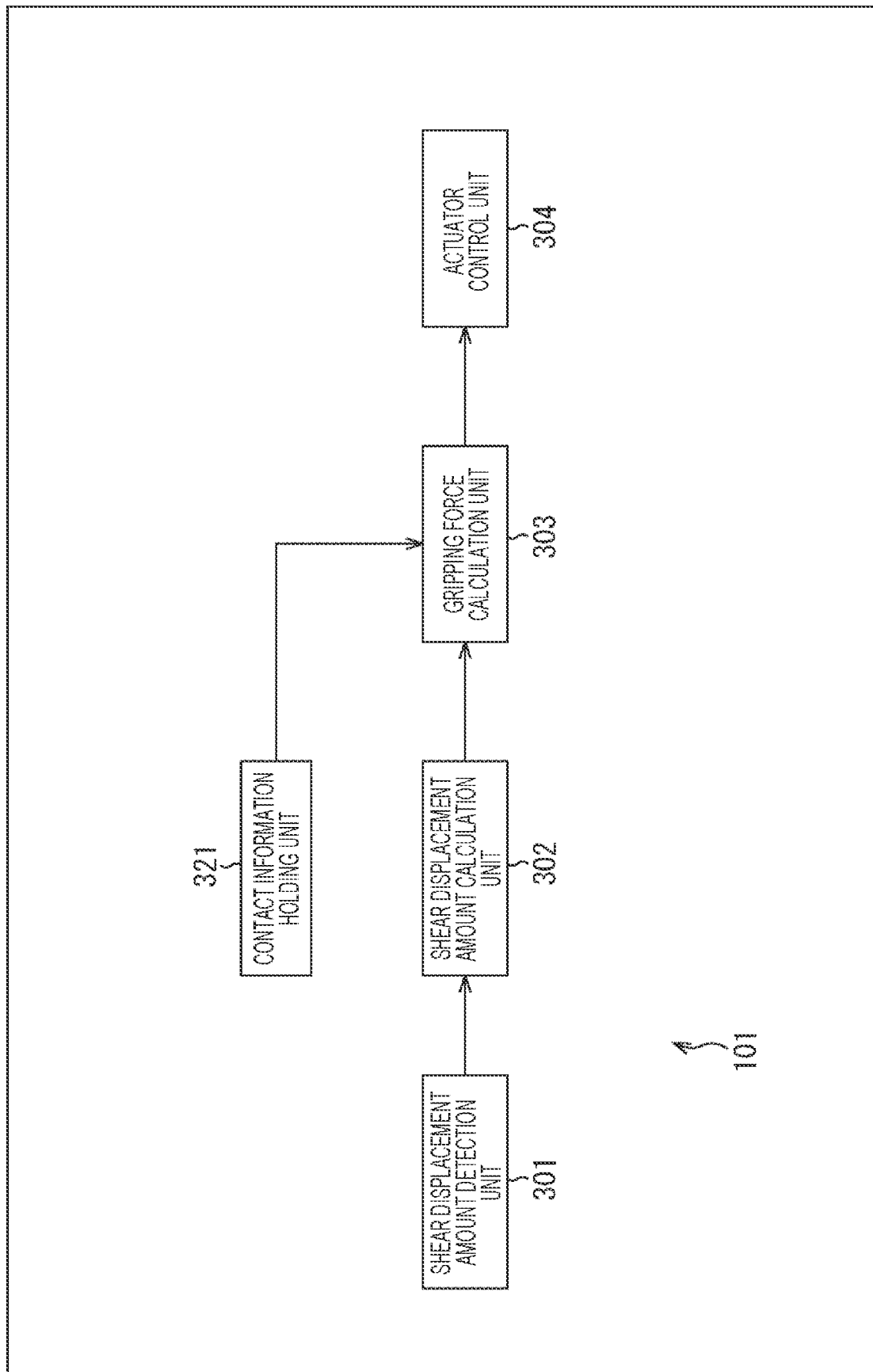
FIG. 31 is a block diagram illustrating a main configuration example of the control device.

In addition, the gripping force calculation unit 303 may calculate the gripping force on the basis of the shape or the like of the flexible deformation layer of the gripping device 102. FIG. 31 is a block diagram illustrating a main configuration example of the control device 101 in this case. As illustrated in FIG. 31, in this case, the control device 101 includes a contact information holding unit 321 in addition to the configuration of the example of FIG. 27.

The contact information holding unit 321 includes any storage medium such as a flash memory, for example, and stores, in the storage medium, contact information, which is information regarding contact between the gripping device 102 and the object gripped by the gripping device 102.

The contact information holding unit 321 supplies the held contact information to the gripping force calculation unit 303. The gripping force calculation unit 303 calculates the gripping force on the basis of the shear displacement amount (that is, the information regarding the shear force of the contact portion (or the information regarding the shear displacement)) supplied from the shear displacement amount calculation unit 302 and the contact information supplied from the contact information holding unit 321. The gripping force calculation unit 303 supplies the gripping force to the actuator control unit 304.

The contact information includes, for example, information regarding the shape of the surface of the flexible deformation layer 212 of the gripping device 102 (that is, the contact portion in contact with the object). That is, the gripping force calculation unit 303, which is the supporting force control unit, controls the gripping force (that is, the supporting force for supporting the object) on the basis of the information regarding the shape of the surface of the flexible deformation layer 212 and the shear displacement amount (that is, the information regarding the shear force of the contact portion (or the information regarding the shear displacement)).

For example, the contact information holding unit 321 may store, in the storage medium, the information regarding the shape of the surface of the flexible deformation layer 212 of the gripping device 102, and the gripping force calculation unit 303 may control the gripping force on the basis of the shear displacement amount (that is, the information regarding the shear force of the contact portion (or the information regarding the shear displacement)) and the information regarding the shape of the surface of the flexible deformation layer 212 of the gripping device 102 held by the contact information holding unit 321.

Note that the information regarding the shape may include, for example, information indicating the curvature of the surface of the flexible deformation layer 212 (information indicating the curvature of the surface of the contact portion). That is, the gripping force calculation unit 303 may control the gripping force on the basis of the information indicating the curvature of the surface of the flexible deformation layer 212 and the shear displacement amount (that is, the information regarding the shear force of the contact portion (or the information regarding the shear displacement)).

Furthermore, a position control unit (the gripping force calculation unit 303) that controls the position of the contact portion, which is in contact with the object, on the basis of the information indicating the curvature of the surface of the flexible deformation layer 212 may be further included. For example, the gripping force calculation unit 303 may further serve as the position control unit to select whether to bring the object into contact with a portion of the flexible deformation layer, which has a large curvature, and grip the object by the precision grip (fingertip grip), or bring the object into contact with a portion of the flexible deformation layer, which has a small curvature, and grip the object by the power grip, and control the gripping device 102 to grip the object by the selected method.

Furthermore, the information regarding the shape may include the information indicating the shape of the surface of the flexible deformation layer 212 (for example, whether the shape is a flat surface, a curved surface, or the like). That is, the gripping force calculation unit 303 may control the gripping force on the basis of the information indicating the shape of the surface of the flexible deformation layer 212 and the shear displacement amount (that is, the information regarding the shear force of the contact portion (or the information regarding the shear displacement)).

Furthermore, the contact information may include information regarding a curved surface of the object with which the gripping device 102 comes into contact. That is, the gripping force calculation unit 303 may control the gripping force on the basis of the information regarding the curved surface of the object with which the gripping device 102 comes into contact and the shear displacement amount (that is, the information regarding the shear force of the contact portion (or the information regarding the shear displacement)).

Needless to say, the contact information or the information regarding the shape may include information other than the above-described information.

As described above, by calculating the gripping force using the contact information in addition to the shear displacement amount (that is, the information regarding the shear force of the contact portion (or the information regarding the shear displacement)), the gripping force calculation unit 303 can calculate the minimum required gripping force with higher accuracy.

Note that the contact information may be recognized (detected) and held. In this case, the control device 101 is only required to further include a recognition unit that recognizes the contact information (or a detection unit that detects the contact information), and the contact information output from the recognition unit (or the detection unit) is only required to be held by the contact information holding unit 321.

<Procedure of Control Process>

Figure 32:
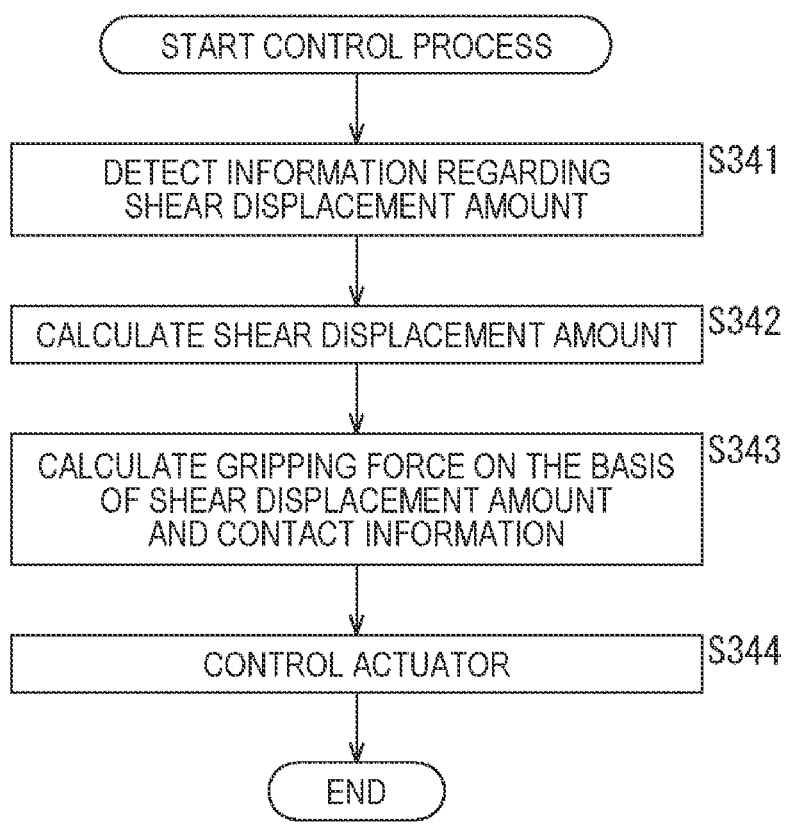
FIG. 32 is a flowchart illustrating an example of the procedure of the control process.

An example of the procedure of the control process in this case will be described with reference to a flowchart of FIG. 32. When the control process is started, respective processes of steps S341 and S342 are performed similarly to respective processes of steps S301 and S302 in FIG. 28.

In step S343 (FIG. 32), the gripping force calculation unit 303 calculates the gripping force on the basis of the shear displacement amount calculated in step S342 and the contact information (for example, the curvature of the flexible deformation layer) held by the contact information holding unit 321. That is, the gripping force calculation unit 303, which is the supporting force control unit, controls the supporting force (gripping force) for supporting the object on the basis of the information regarding the shape of the contact portion in contact with the object (contact information) and the information regarding the shear force of the contact portion (or the information regarding the shear displacement).

A process of step S344 is performed similarly to the process of step S304 (FIG. 28). Then, the control process ends when the process of step S344 ends.

By executing each process as described above, the control device 101 can control the gripping force (supporting force) of the gripping device 102 using the shear displacement amount and the contact information (for example, the curvature of the flexible deformation layer). Therefore, the control device 101 can cause the gripping device 102 to support the object with a more appropriate supporting force.

<Control Device>

Note that the slip direction can be determined from a direction of the shear displacement. By controlling the gripping force according to the slip direction, the control device 101 can perform control to allow a slip only in a certain direction or, on the contrary, to prevent a slip in a certain direction.

Figure 33:
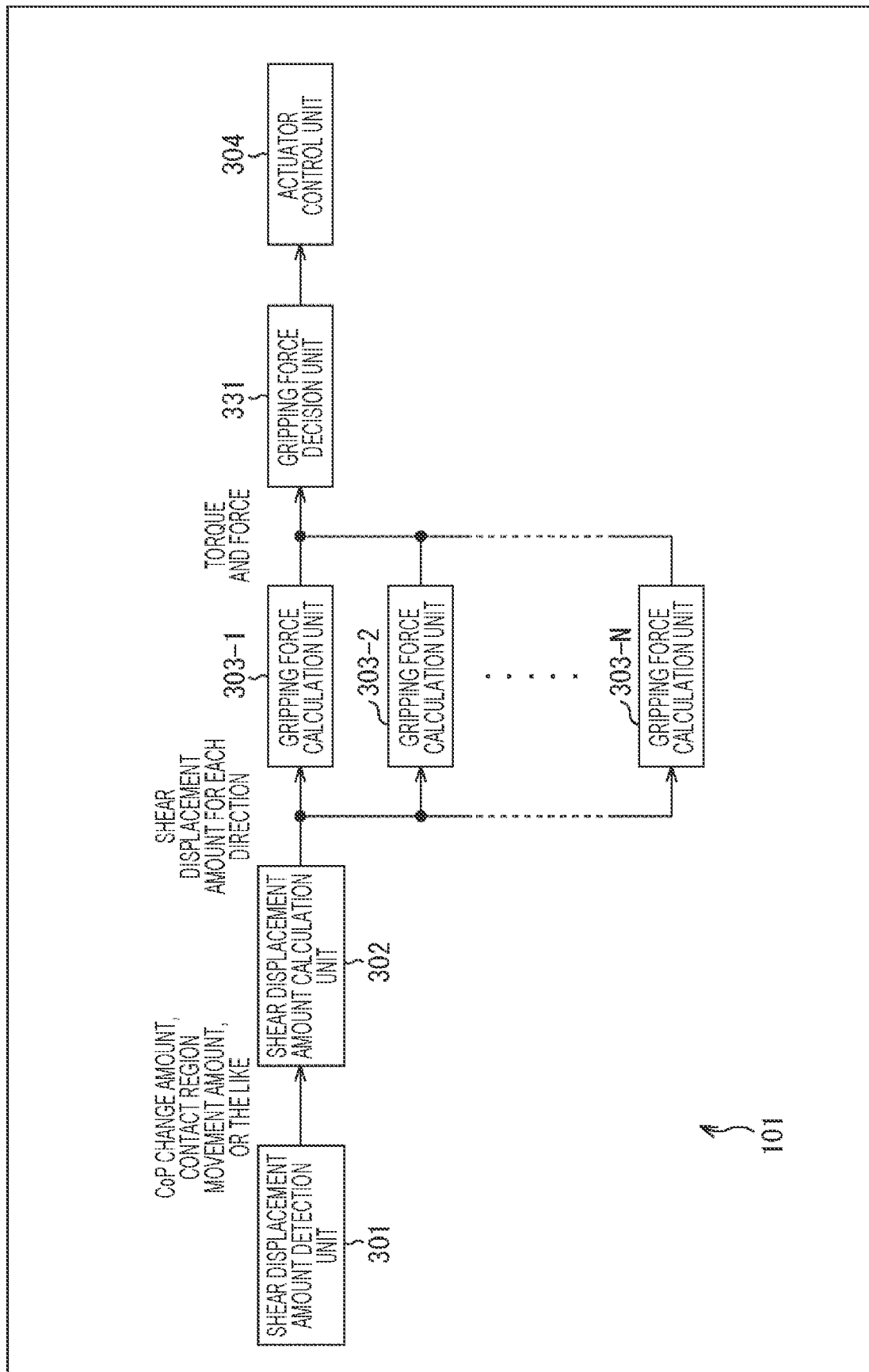
FIG. 33 is a block diagram illustrating a main configuration example of the control device.

FIG. 33 is a block diagram illustrating a main configuration example of the control device 101 in this case. As illustrated in FIG. 33, in this case, the control device 101 includes a gripping force decision unit 331 in addition to the configuration of the example of FIG. 27. Furthermore, in this case, gripping force calculation units 303 calculate a gripping force for each direction (for example, for each of x, y, θ, and the like). That is, the control device 101 includes, for each direction (for example, for each of x, y, θ, and the like), the gripping force calculation unit 303 (gripping force calculation units 303-1 to 303-N(N is any natural number)).

The shear displacement amount calculation unit 302 in this case calculates a shear displacement amount for each direction (for example, for each of x, y, θ, and the like), and supplies each of the calculated shear displacement amounts to one of the gripping force calculation units 303, which corresponds to the direction of the shear displacement amount (one of the gripping force calculation units 303-1 to 303-N).

Each of the gripping force calculation units 303-1 to 303-N is the gripping force calculation unit 303 provided for each direction (for example, for each of x, y, θ, and the like), and calculates the gripping force for the corresponding direction (for example, x, y, θ, or the like) on the basis of the shear displacement amount in the corresponding direction (that is, a slip amount in the corresponding direction). That is, in this case, the gripping force calculation units 303 (the gripping force calculation units 303-1 to 303-N) derive the gripping force for each direction on the basis of the shear displacement amount for each direction (that is, information regarding the shear force of the contact portion for each direction (or information regarding the shear displacement for each direction)).

For example, one of the gripping force calculation units 303, which corresponds to the rotation direction θ, controls the supporting force on the basis of a rotational slip, which is a slip of the object relative to the contact portion in the rotation direction. This rotational slip is derived on the basis of the pressure distribution applied to the gripped object by the contact portion. That is, each of the gripping force calculation units 303, which is the supporting force control unit, controls the supporting force on the basis of a detection result of the pressure distribution applied to the object by the contact portion.

The gripping force calculation units 303-1 to 303-N supply the calculated gripping force (torque and force) for each direction to the gripping force decision unit 331.

The gripping force decision unit 331 decides the gripping force to be output from the supplied gripping force for each direction (for example, for each of x, y, θ, and the like). The gripping force decision unit 331 supplies the decided gripping force to the actuator control unit 304. That is, in this case, the gripping force calculation units 303 (the gripping force calculation units 303-1 to 303-N) and the gripping force decision unit 331 derive the gripping force on the basis of the shear displacement amount for each direction (that is, the information regarding the shear force of the contact portion for each direction (or the information regarding the shear displacement for each direction)).

By controlling the gripping force according to the slip direction in this manner, the control device 101 can achieve more various support control such as allowing a slip only in a certain direction or, on the contrary, preventing a slip in a certain direction, for example.

<Procedure of Control Process>

An example of the procedure of the control process in this case will be described with reference to a flowchart of FIG. 34. When the control process is started, a process of step S361 is performed similarly to the process of step S301 in FIG. 28.

In step S362 (FIG. 32), the shear displacement amount calculation unit 302 calculates the shear displacement amount for each direction (for example, for each of x, y, θ, and the like) on the basis of the information detected in step S361.

In step S363, the gripping force calculation units 303 calculate the gripping force for each direction on the basis of the shear displacement amount for each direction calculated in step S362.

In step S364, the gripping force decision unit 331 decides the gripping force to be output from the gripping force for each direction calculated in step S363.

In step S365, the actuator control unit 304 controls driving of the actuator of the gripping device 102 so as to support the object with the gripping force (supporting force) decided in step S364. Then, the control process ends when the process of step S365 ends.

By executing each process as described above, the control device 101 can control the gripping force according to the slip direction, and can achieve more various support control.

<Control Device>

Figure 35:
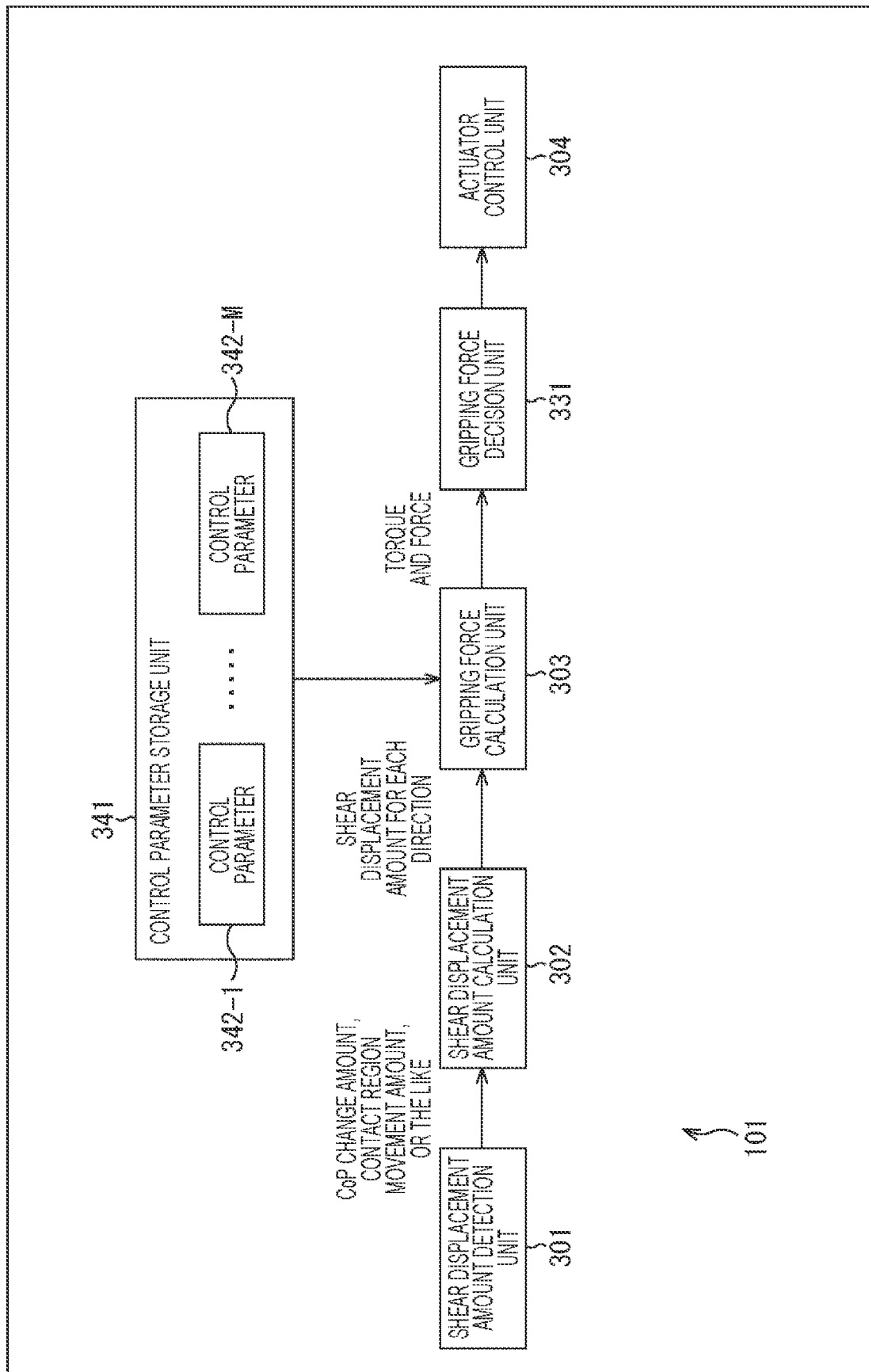
FIG. 35 is a block diagram illustrating a main configuration example of the control device.

In the calculation of the gripping force, a control parameter may be switched for each direction. FIG. 35 is a block diagram illustrating a main configuration example of the control device 101 in this case. As illustrated in FIG. 35, in this case, the control device 101 includes a control parameter storage unit 341 in addition to the configuration of the example of FIG. 33.

The control parameter storage unit 341 includes any storage medium (for example, a flash memory or the like), and stores, in the storage medium, a control parameter 342 for each direction (for example, for each of x, y, θ, and the like) (control parameters 342-1 to 342-M (M is any natural number)), which is used for the calculation of the gripping force. The control parameter storage unit 341 supplies the stored control parameter 342 to the gripping force calculation unit 303 as necessary.

Note that the control parameter may be any information. For example, the control parameter may be a control gain or a control target of a proportional-integral-differential controller (PID).

Also in this case, as in the case of FIG. 33, the shear displacement amount calculation unit 302 calculates the shear displacement amount for each direction (for example, for each of x, y, θ, and the like), and the gripping force calculation unit 303 calculates the gripping force for each direction (for example, for each of x, y, θ, and the like).

However, the gripping force calculation unit 303 calculates the gripping force for each direction (for example, for each of x, y, θ, and the like) on the basis of the shear displacement amount for each direction supplied from the shear displacement amount calculation unit 302, and the control parameter for each direction supplied from the control parameter storage unit 341.

The gripping force decision unit 331 decides the gripping force to be output from the gripping force for each direction (for example, for each of x, y, θ, and the like) calculated by the gripping force calculation unit 303.

In this manner, the gripping force calculation unit 303 can calculate the minimum required gripping force for each direction with higher accuracy.

<Procedure of Control Process>

Figure 36:
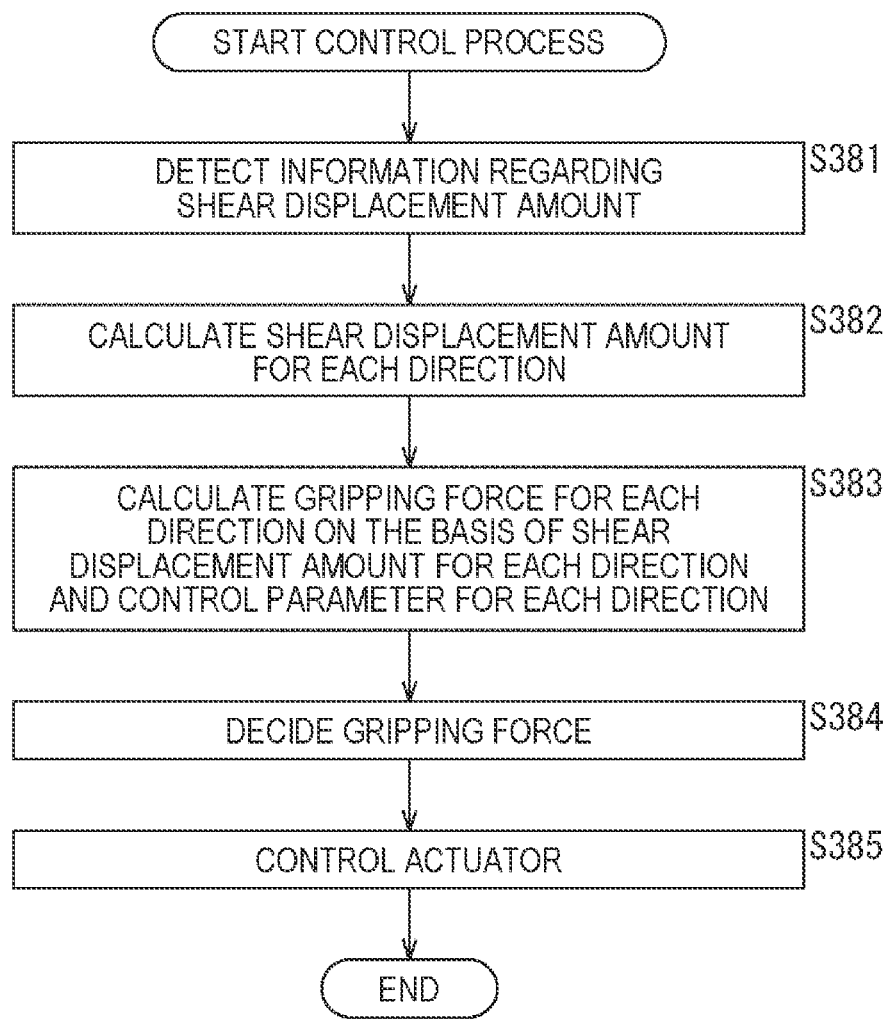
FIG. 36 is a flowchart illustrating an example of the procedure of the control process.

An example of the procedure of the control process in this case will be described with reference to a flowchart of FIG. 36. When the control process is started, respective processes of steps S381 and S382 are performed similarly to respective processes of steps S361 and S362 in FIG. 34.

In step S383 (FIG. 36), the gripping force calculation unit 303 calculates the gripping force for each direction on the basis of the shear displacement amount for each direction calculated in step S362 and the control parameter 342 for each direction stored in the control parameter storage unit 341.

Figure 34:
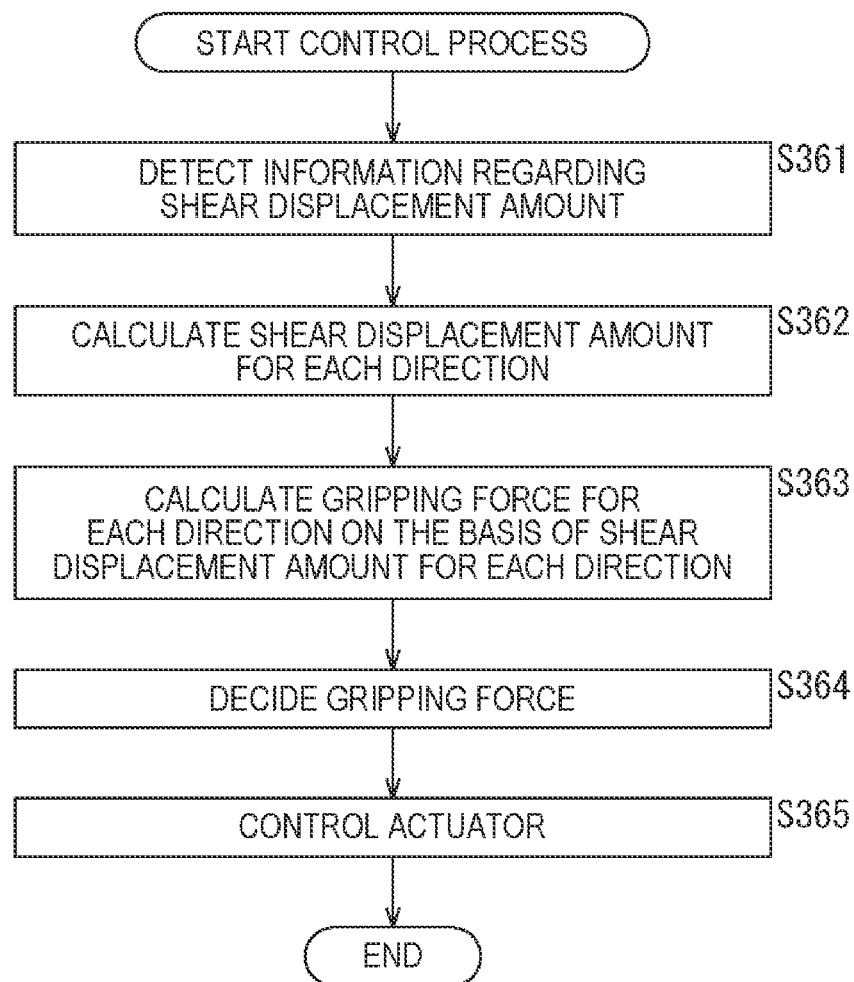
FIG. 34 is a flowchart illustrating an example of the procedure of the control process.

Respective processes of steps S384 and S385 are performed similarly to respective processes of steps S364 and S365 (FIG. 34). Then, the control process ends when the process of step S385 ends.

By executing each process as described above, the control device 101 can control the gripping force according to the slip direction with higher accuracy.

<Control Device>

Figure 37:
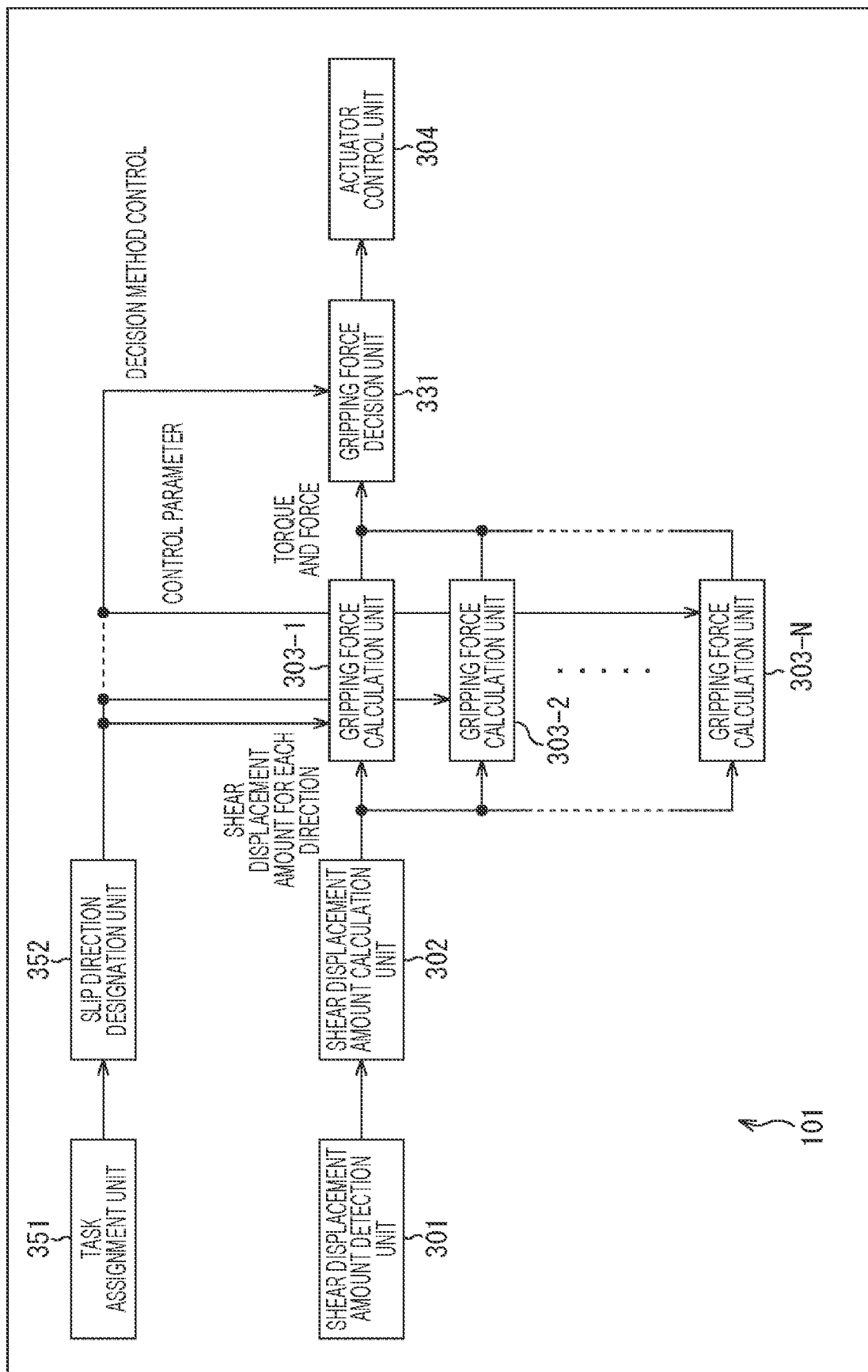
FIG. 37 is a block diagram illustrating a main configuration example of the control device.

The gripping force may be controlled according to an assignment of task input from the outside. FIG. 37 is a block diagram illustrating a main configuration example of the control device 101 in this case. As illustrated in FIG. 37, in this case, the control device 101 includes a task assignment unit 351 and a slip direction designation unit 352 in addition to the configuration of the example of FIG. 33.

The task assignment unit 351 is a processing unit that assigns a task to the gripping device 102. For example, the task assignment unit 351 may include an input device that receives the assignment from the outside. The task assignment unit 351 supplies the assignment to the slip direction designation unit 352.

The slip direction designation unit 352 decides a direction in which a slip is allowed (or a direction in which a slip is not allowed), a direction in which the gripping force is increased, and the like on the basis of the task assigned from the task assignment unit 351. When deciding the control parameter such as a gain for each direction, which is used for the calculation of the gripping force, the slip direction designation unit 352 supplies the control parameter to one of the gripping force calculation units 303 (the gripping force calculation units 303-1 to 303-N), which corresponds to the direction of the control parameter. In addition, when deciding the direction in which a slip is allowed (or the direction in which a slip is not allowed), the slip direction designation unit 352 supplies information indicating the direction (decision method control information) to the gripping force decision unit 331.

The gripping force calculation units 303 calculate the gripping force for each direction (for example, for each of x, y, θ, and the like) on the basis of the shear displacement amount for each direction supplied from the shear displacement amount calculation unit 302 and the control parameter for each direction supplied from the slip direction designation unit 352, and supply the gripping force to the gripping force decision unit 331.

The gripping force decision unit 331 decides the gripping force to be output on the basis of the gripping force for each direction supplied from the gripping force calculation units 303 and the decision method control information supplied from the slip direction designation unit 352. For example, the gripping force decision unit 331 decides the gripping force to be output according to an instruction such as "ignore a gripping force in the X direction" or "allow a slip in the Y direction", which is supplied from the slip direction designation unit 352.

In this manner, the gripping force calculation units 303 can calculate the gripping force according to the assignment of the task. As a result, the control device 101 can achieve more various support control.

<Procedure of Control Process>

An example of the procedure of the control process in this case will be described with reference to a flowchart of FIG. 38. When the control process is started, respective processes of steps S401 and S402 are performed similarly to respective processes of steps S361 and S362 in FIG. 34.

In step S403 (FIG. 38), the task assignment unit 351 receives the task assignment. In step S404, the slip direction designation unit 352 sets the slip direction designation such as the control parameter for each direction and the decision method control information described above on the basis of the task assignment.

In step S405, the gripping force calculation units 303 calculate the gripping force for each direction on the basis of the shear displacement amount for each direction calculated in step S362 and the slip direction designation (the control parameter for each direction) set in step S404.

In step S406, the gripping force decision unit 331 decides the gripping force on the basis of the gripping force for each direction calculated in step S405 and the slip direction designation (decision method control information) set in step S404.

A process of step S407 is performed similarly to the process of step S365 (FIG. 34). Then, the control process ends when the process of step S407 ends.

By executing each process as described above, the control device 101 can control the gripping force according to the task assignment.

<Control Device>

Even in a case where the gripping force control is performed according to the task assignment as described above, a result of the control is not necessarily as ideal. For example, a correct result of the control may not be obtained depending on an actual situation such as a control error or an obstacle. Therefore, the surroundings or a position, orientation, or the like (environment) of the gripped object may be further recognized, and the support control may be performed on the basis of a result of the recognition.

Figure 39:
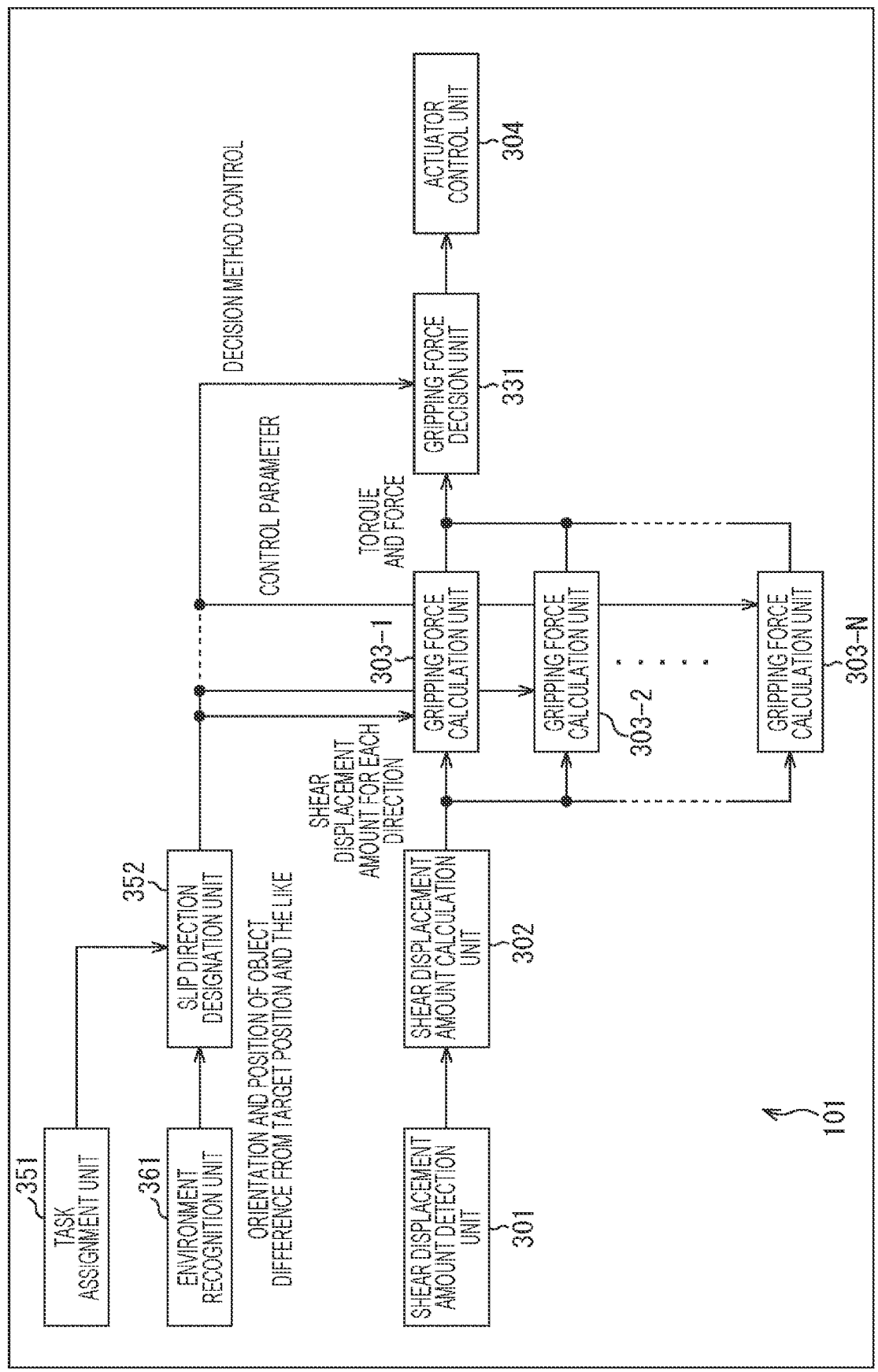
FIG. 39 is a block diagram illustrating a main configuration example of the control device.

FIG. 39 is a block diagram illustrating a main configuration example of the control device 101 in this case. As illustrated in FIG. 39, in this case, the control device 101 includes an environment recognition unit 361 in addition to the configuration of the example of FIG. 37.

The environment recognition unit 361 recognizes the surrounding or the orientation and position of the gripped object, and derives differences between results of the recognition and target values. The environment recognition unit 361 supplies information indicating the differences to the slip direction designation unit 352.

The slip direction designation unit 352 sets the slip direction designation (control parameter for each direction, decision method control information, and the like) on the basis of the information indicating the differences and information regarding the task assignment.

According to such control, for example, when the orientation of the object is changed, the control device 101 may change the position and orientation of the object by operating an arm, but can also change the position and orientation of the object by slipping the object. As described above, the gripping force calculation units 303 can achieve more various support control with higher accuracy according to the actual situation.

<Procedure of Control Process>

Figure 40:
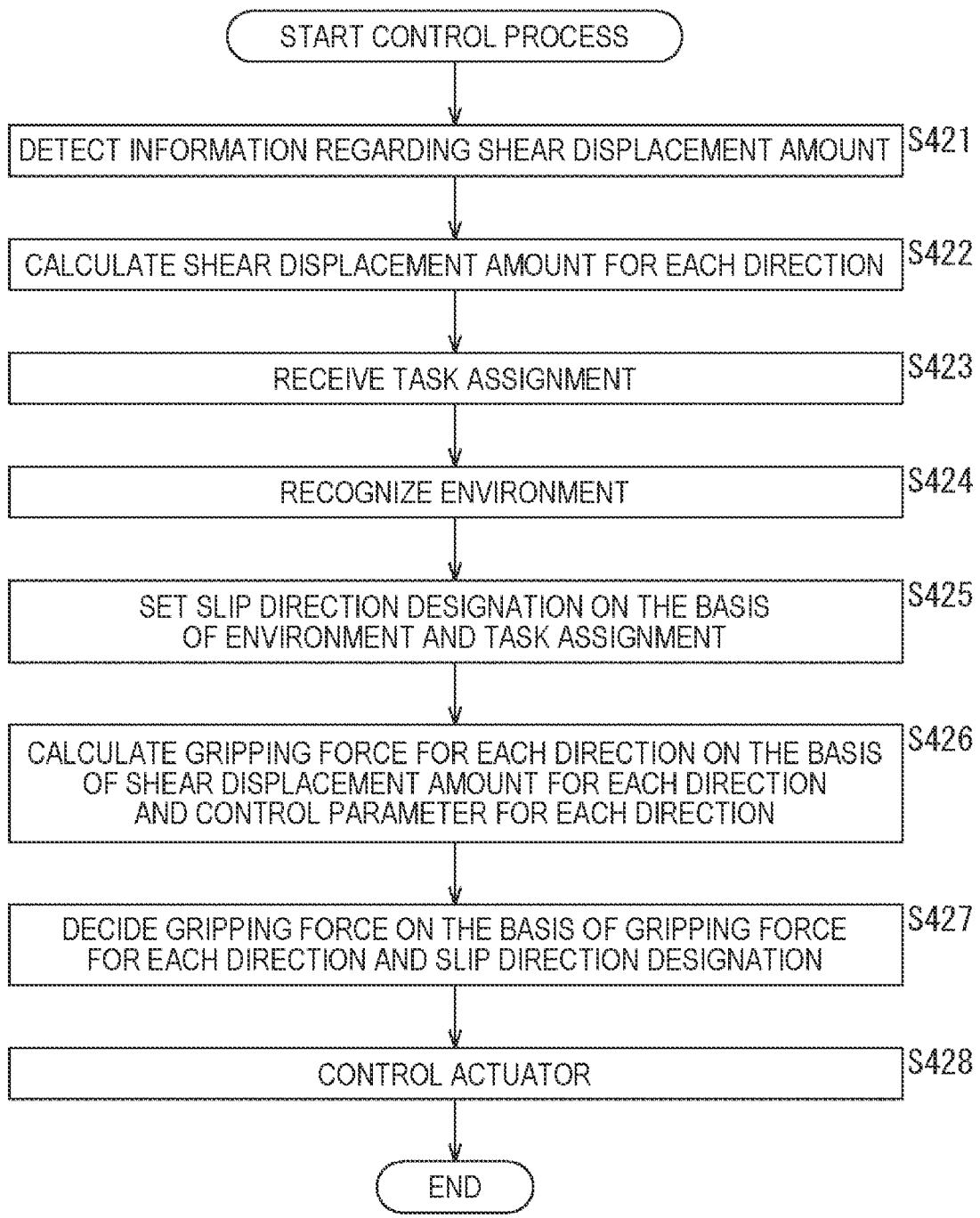
FIG. 40 is a flowchart illustrating an example of the procedure of the control process.

An example of the procedure of the control process in this case will be described with reference to a flowchart of FIG. 40. When the control process is started, respective processes of steps S421 to S423 are executed similarly to respective processes of steps S401 to S403 in FIG. 38.

In step S424 (FIG. 40), the environment recognition unit 361 recognizes the environment.

In step S425, the slip direction designation unit 352 sets the slip direction designation such as the control parameter for each direction and the decision method control information described above on the basis of the task assignment and the recognition results of the environment.

Figure 38:
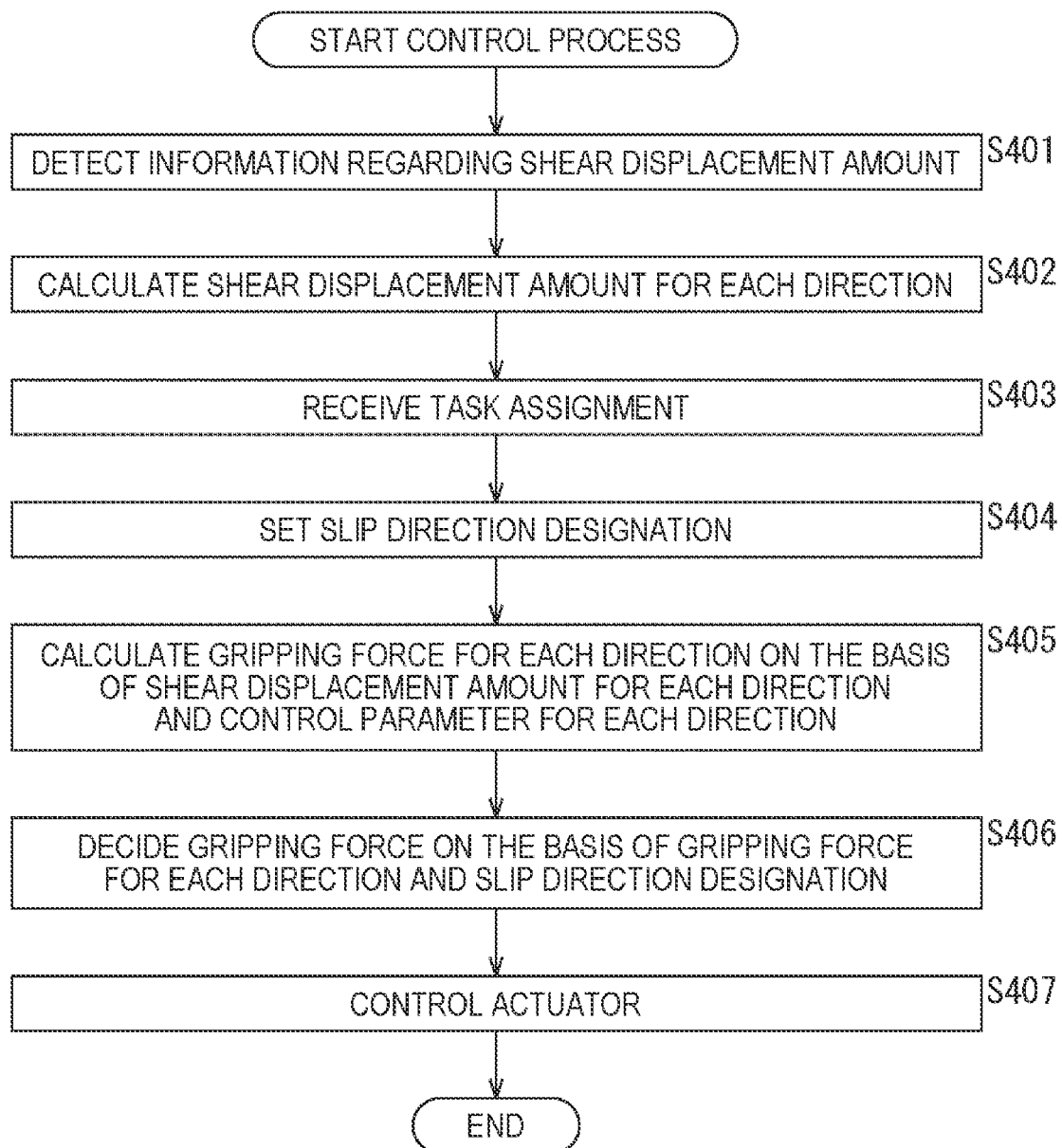
FIG. 38 is a flowchart illustrating an example of the procedure of the control process.

Respective processes of steps S426 to S428 are executed similarly to respective processes of steps S405 to S407 in FIG. 38. Then, the control process ends when the process of step S428 ends.

By executing each process as described above, the control device 101 can control the gripping force according to the task assignment and the environment.

<Control Device>

Figure 41:
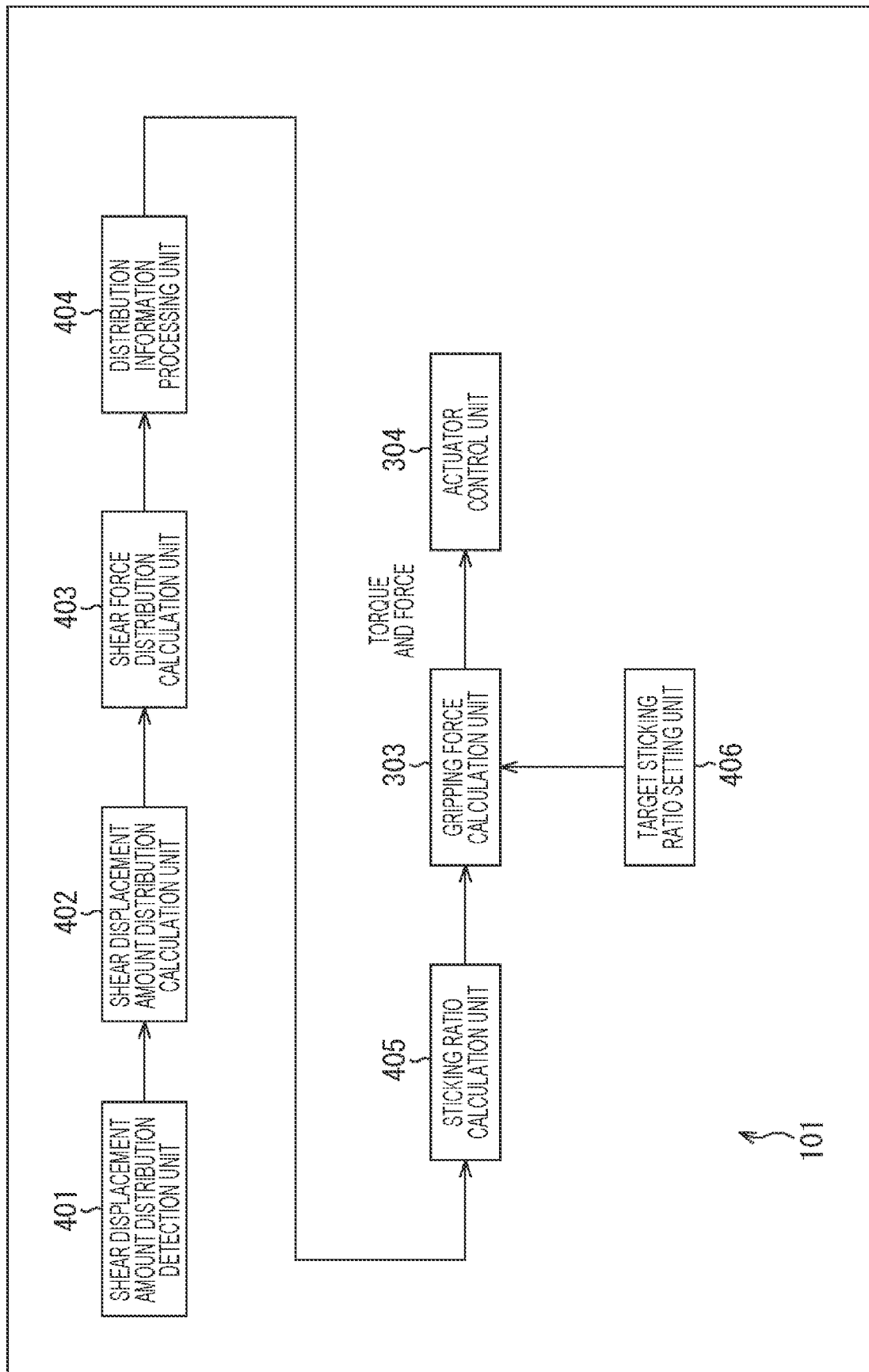
FIG. 41 is a block diagram illustrating a main configuration example of the control device.

Method 2 (sticking ratio estimation by detection of the discontinuous point of the shear force distribution and the shear displacement distribution) described in the first embodiment can also be applied. FIG. 41 is a block diagram illustrating a main configuration example of the control device 101 in this case. As illustrated in FIG. 41, in this case, the control device 101 includes a shear displacement amount distribution detection unit 401, a shear displacement amount distribution calculation unit 402, a shear force distribution calculation unit 403, a distribution information processing unit 404, a sticking ratio calculation unit 405, a target sticking ratio setting unit 406, the gripping force calculation unit 303, and the actuator control unit 304.

The shear displacement amount distribution detection unit 401 performs a process related to detection of a distribution of the information regarding the shear displacement as the information regarding the shear force. Similarly to the shear displacement amount detection unit 301, the shear displacement amount distribution detection unit 401 includes, for example, a sensor for detecting the information regarding the shear displacement, such as a pressure distribution sensor or an image sensor, and a signal processing block that performs signal processing on an output signal of the sensor. However, the shear displacement amount distribution detection unit 401 detects the information regarding the shear displacement (for example, the CoP change amount or the contact region movement amount) at all observation points and generates distribution information of the information regarding the shear displacement. The shear displacement amount distribution detection unit 401 supplies the distribution information of the information regarding the shear displacement to the shear displacement amount distribution calculation unit 402.

The shear displacement amount distribution calculation unit 402 converts the distribution information of the information regarding the shear displacement (for example, the CoP change amount, the contact region movement amount, or the like for all observation points) supplied from the shear displacement amount distribution detection unit 401, into distribution information of the shear displacement amount (for example, the shear displacement amount for all observation points), and supplies the distribution information to the shear force distribution calculation unit 403.

The shear force distribution calculation unit 403 calculates distribution information of the shear force on the basis of the distribution information of the shear displacement amount supplied from the shear displacement amount distribution calculation unit 402. For example, the shear force distribution calculation unit 403 converts the shear displacement amount into the shear force for all observation points.

The shear force distribution calculation unit 403 supplies the distribution information of the calculated shear force to the distribution information processing unit 404.

The distribution information processing unit 404 detects the discontinuous point from the distribution information of the shear force (for example, the graph of FIG. 9) supplied from the shear force distribution calculation unit 403. The distribution information processing unit 404 supplies information indicating the discontinuous point to the sticking ratio calculation unit 405.

The sticking ratio calculation unit 405 specifies the sticking region and the slip region on the basis of the information indicating the discontinuous point supplied from the distribution information processing unit 404, and calculates the sticking ratio from these specified regions. The sticking ratio calculation unit 405 supplies the calculated sticking ratio to the gripping force calculation unit 303.

The target sticking ratio setting unit 406 sets a target value of the sticking ratio (also referred to as a target sticking ratio) and supplies the target value to the gripping force calculation unit 303.

The gripping force calculation unit 303 calculates the gripping force on the basis of the sticking ratio calculated by the sticking ratio calculation unit 405 and the target sticking ratio set by the target sticking ratio setting unit 406, and supplies the gripping force to the actuator control unit 304. That is, the gripping force calculation unit 303, which is the supporting force control unit, controls the supporting force on the basis of the distribution of the shear force derived by use of the distribution of the shear displacement amount calculated from the distribution of the detected information regarding the shear displacement.

The actuator control unit 304 controls the gripping device 102 to drive the gripping device 102 so as to generate the gripping force supplied from the gripping force calculation unit 303 (for example, the object is supported by the gripping force).

In this manner, the control device 101 can perform the support control by applying Method 2.

Note that the distribution information processing unit 404 may detect the discontinuous point using the distribution information of the shear displacement amount. In this case, the shear force distribution calculation unit 403 may be omitted.

<Procedure of Control Process>

An example of the procedure of the control process in this case will be described with reference to a flowchart of FIG. 42. When the control process is started, in step S441, the shear displacement amount distribution detection unit 401 detects the information regarding the distribution of the shear displacement amount (for example, distribution information of the CoP change amount, the contact region movement amount, or the like) as the information regarding the shear force.

In step S442, the shear displacement amount distribution calculation unit 402 calculates the distribution information of the shear displacement amount on the basis of the information detected in step S401.

In step S443, the shear force distribution calculation unit 403 calculates the distribution information of the shear force using the distribution information of the shear displacement amount calculated in step S402.

In step S444, the distribution information processing unit 404 detects the discontinuous point on the basis of the distribution information of the shear force calculated in step S443.

In step S445, the sticking ratio calculation unit 405 specifies the sticking region and the slip region on the basis of the discontinuous point detected in step S444, and calculates the sticking ratio on the basis of each of the specified regions.

In step S446, the target sticking ratio setting unit 406 sets the target sticking ratio, which is the target value of the sticking ratio.

In step S447, the gripping force calculation unit 303 calculates the gripping force (supporting force) on the basis of the sticking ratio calculated in step S445 and the target sticking ratio set in step S446.

In step S448, the actuator control unit 304 controls driving of the actuator of the gripping device 102 so as to support the object with the gripping force (supporting force) calculated in step S447.

When the process of step S447 ends, the control process ends.

By executing each process as described above, the control device 101 can control the gripping force (supporting force) of the gripping device 102 by applying Method 2. Therefore, the control device 101 can cause the gripping device 102 to support the object with a more appropriate supporting force.

<Control Device>

Figure 43:
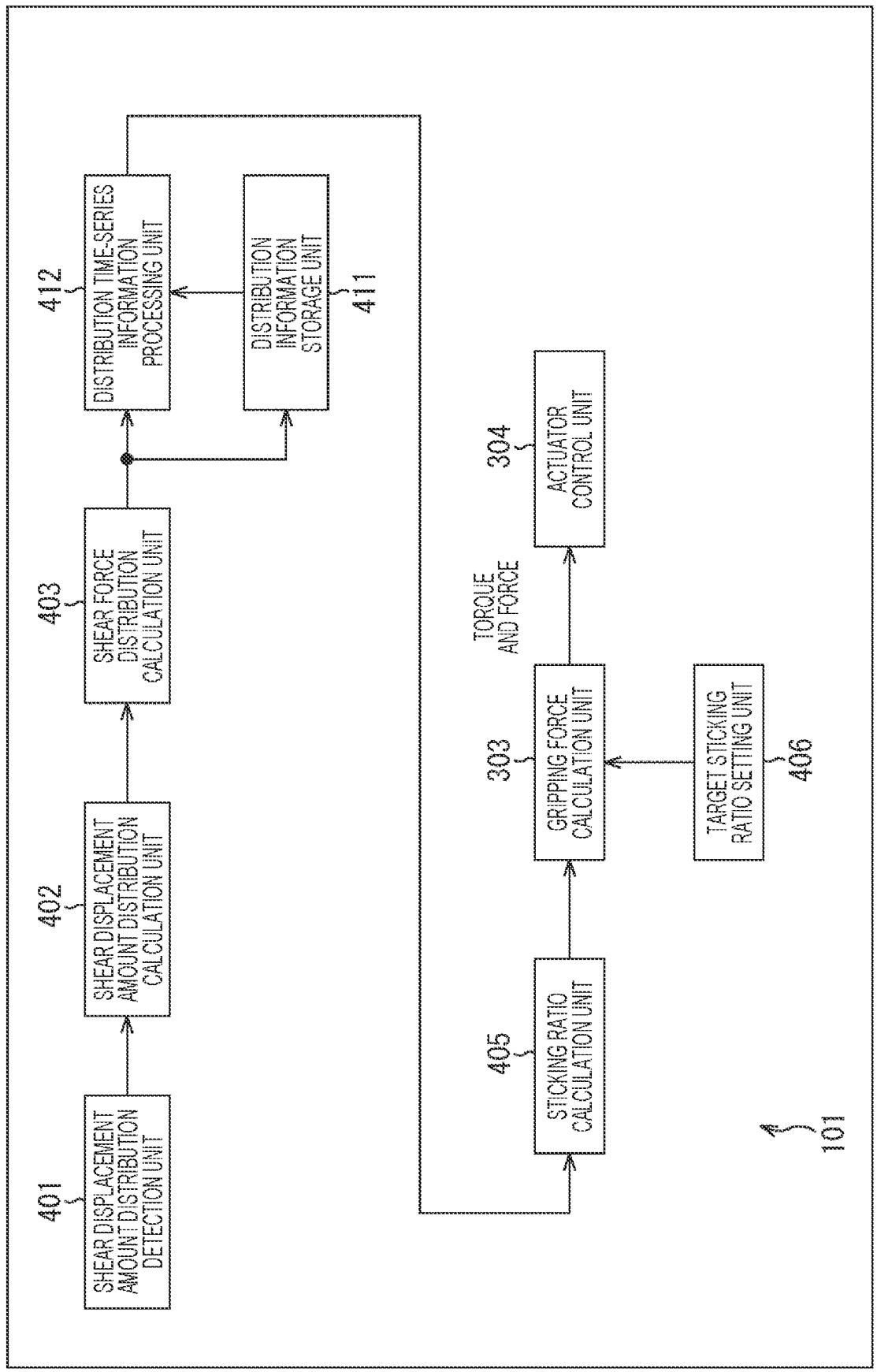
FIG. 43 is a block diagram illustrating a main configuration example of the control device.

Method 3 (sticking ratio estimation using time-series information of the shear force distribution and the shear displacement distribution) described in the first embodiment can also be applied. FIG. 43 is a block diagram illustrating a main configuration example of the control device 101 in this case. As illustrated in FIG. 43, in this case, the control device 101 includes a distribution information storage unit 411 and a distribution time-series information processing unit 412 instead of the distribution information processing unit 404 in the example of FIG. 41.

The distribution information storage unit 411 includes a storage medium such as a flash memory, for example, and stores the distribution information of the shear force calculated by the shear force distribution calculation unit 403. The distribution information storage unit 411 generates distribution time-series information, which is information indicating a time-series change in the distribution information of the shear force, on the basis of the stored distribution information of the shear force at each time, and supplies the distribution time-series information to the distribution time-series information processing unit 412.

The distribution time-series information processing unit 412 acquires the latest distribution information of the shear force from the shear force distribution calculation unit 403. In addition, the distribution time-series information processing unit 412 acquires past distribution time-series information supplied from the distribution information storage unit 411. The distribution time-series information processing unit 412 specifies the slip region and the sticking region on the basis of these pieces of distribution time-series information of the shear force.

The sticking ratio calculation unit 405 calculates the sticking ratio on the basis of the slip region and the sticking region specified by the distribution time-series information processing unit 412.

That is, in this case, the gripping force calculation unit 303, which is the supporting force control unit, controls the supporting force on the basis of the time-series change in the distribution of the shear force, which is generated by use of the distribution information storage unit 411.

As described above, if the slip region and the like are specified on the basis of the time-series information of the distribution information of the shear force so that the sticking ratio is derived, the support control can be performed by application of Method 3.

Note that the distribution time-series information processing unit 412 may detect the discontinuous point using the distribution information of the shear displacement amount. In this case, the shear force distribution calculation unit 403 may be omitted.

<Procedure of Control Process>

Figure 44:
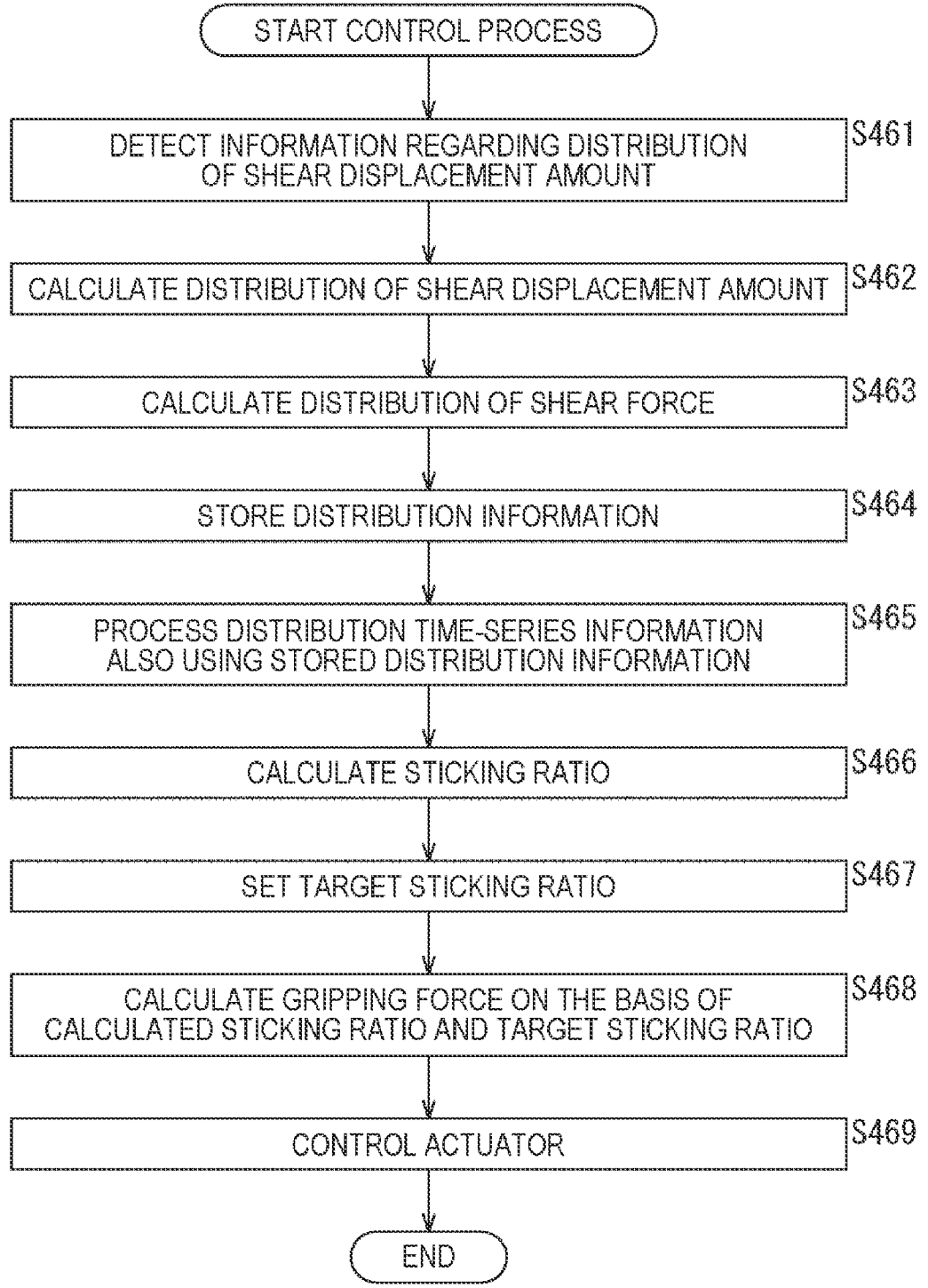
FIG. 44 is a flowchart illustrating an example of the procedure of the control process.

An example of the procedure of the control process in this case will be described with reference to a flowchart of FIG. 44. When the control process is started, respective processes of steps S461 to S463 are executed similarly to respective processes of steps S441 to S443.

In step S464, the distribution information storage unit 411 stores the distribution information of the shear force calculated by the process in step S463.

In step S465, the distribution time-series information processing unit 412 processes the distribution time-series information using the distribution information of the shear force calculated in step S463 and the distribution information stored in the distribution information storage unit 411. That is, the slip region and the sticking region are specified.

Respective processes of steps S466 to S469 are executed similarly to respective processes of steps S445 to S448. Then, the control process ends when the process of step S469 ends.

By executing each process as described above, the control device 101 can control the gripping force (supporting force) of the gripping device 102 by applying Method 3. Therefore, the control device 101 can cause the gripping device 102 to support the object with a more appropriate supporting force.

<Control Device>

Figure 45:
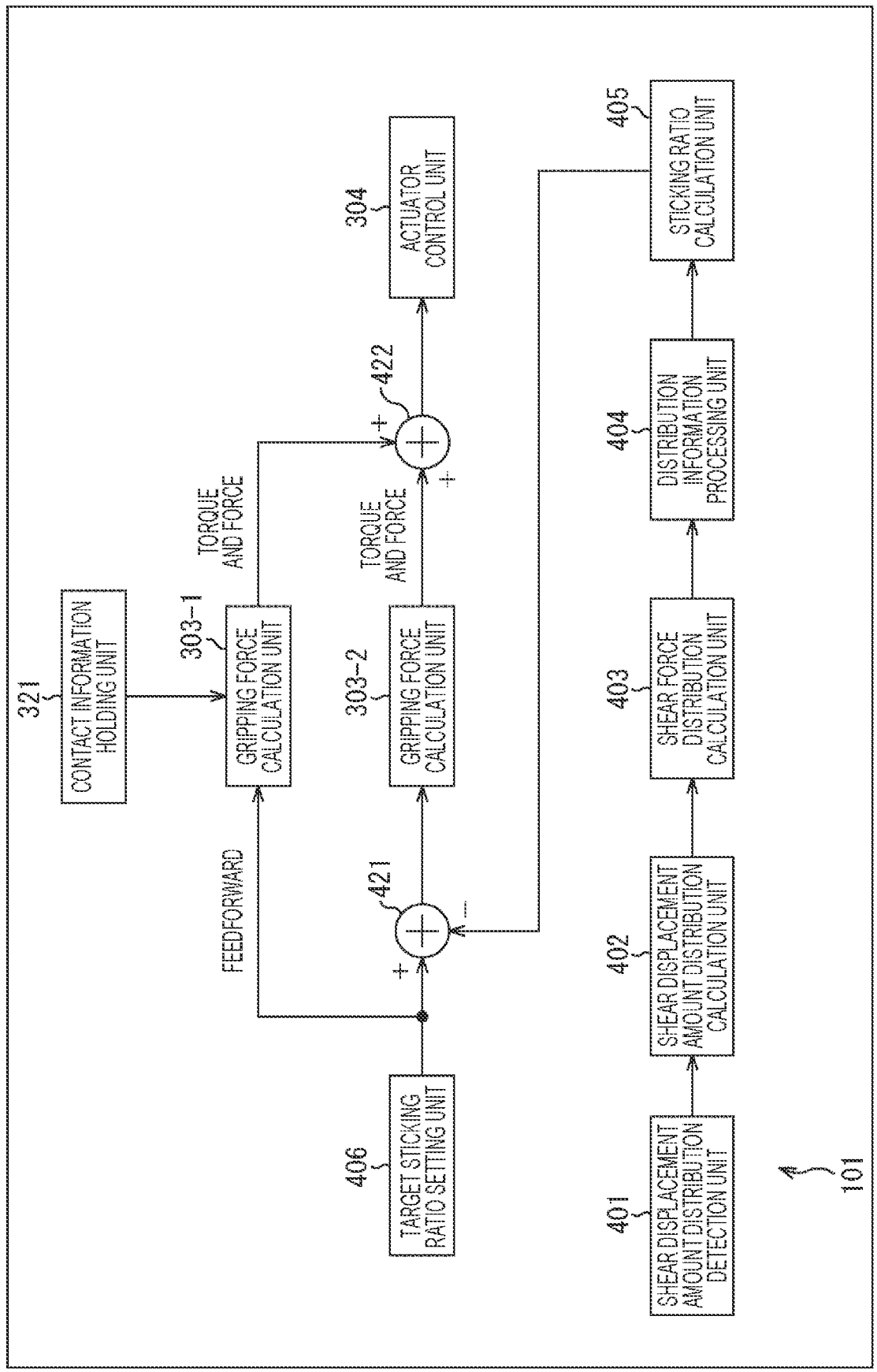
FIG. 45 is a block diagram illustrating a main configuration example of the control device.

Method 1 and Method 3 described in the first embodiment can also be applied in combination. FIG. 45 is a block diagram illustrating a main configuration example of the control device 101 in this case. As illustrated in FIG. 45, in this case, the control device 101 includes the shear displacement amount distribution detection unit 401 to the target sticking ratio setting unit 406, gripping force calculation units 303-1 and 303-2, the actuator control unit 304, the contact information holding unit 321, and calculation units 421 and 422.

When setting the target sticking ratio, the target sticking ratio setting unit 406 feeds forward the target sticking ratio to the gripping force calculation unit 303-1. The gripping force calculation unit 303-1 calculates the gripping force on the basis of the fed-forward target sticking ratio and the contact information held by the contact information holding unit 321. The gripping force calculation unit 303-1 supplies the calculated gripping force to the actuator control unit 304 via the calculation unit 422. If the feedforward is performed by use of the target sticking ratio in this manner, the support control can be performed at a higher response speed.

The shear displacement amount distribution detection unit 401 to the sticking ratio calculation unit 405 perform processes as in the case of FIG. 41. The sticking ratio calculation unit 405 feeds back the calculated sticking ratio to the calculation unit 421. In addition, the target sticking ratio setting unit 406 supplies the set target sticking ratio to the calculation unit 421.

The calculation unit 421 subtracts the sticking ratio calculated by the sticking ratio calculation unit 405 from the target sticking ratio. The calculation unit 421 supplies a result of the calculation to the gripping force calculation unit 303-2.

The gripping force calculation unit 303-2 supplies the sticking ratio difference supplied from the calculation unit 421 to the gripping force calculation unit 303-2. The gripping force calculation unit 303-2 calculates the gripping force on the basis of the difference and supplies the gripping force to the calculation unit 422.

The calculation unit 422 adds the gripping force supplied from the gripping force calculation unit 303-2 to the gripping force supplied from the gripping force calculation unit 303-1, and supplies a result of the addition to the actuator control unit 304. That is, the gripping force calculated by the gripping force calculation unit 303-1 is corrected by the gripping force calculated by the gripping force calculation unit 303-2. The actuator control unit 304 controls the actuator using a result of the correction. As described above, by deriving and feeding back the sticking ratio on the basis of the detected information, the control device 101 can correct the gripping force calculated by the feedforward. Therefore, the control device 101 can perform more robust control. That is, the control device 101 can perform more robust and highly responsive control.

<Procedure of Control Process>

Figure 46:
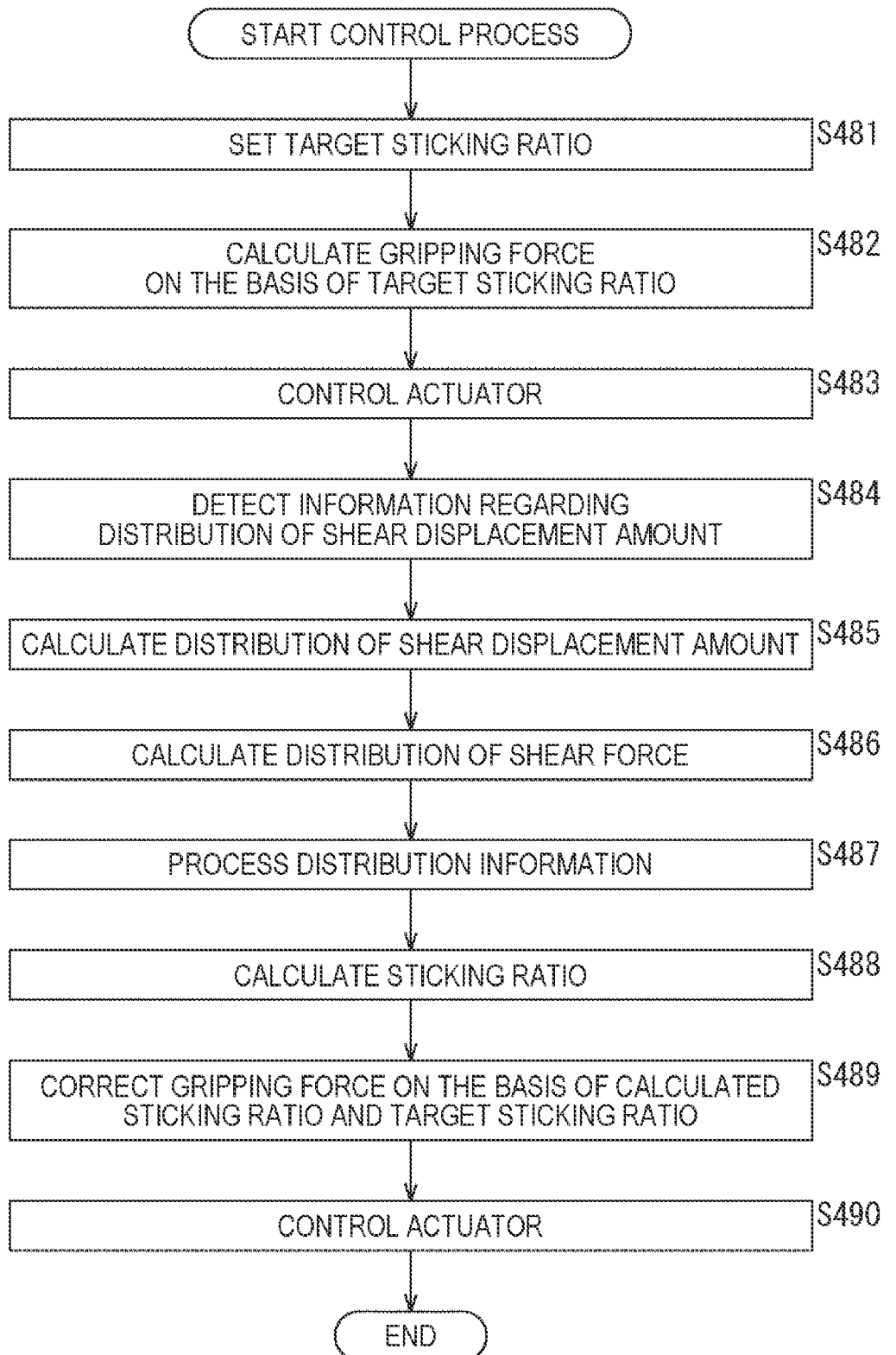
FIG. 46 is a flowchart illustrating an example of the procedure of the control process.

An example of the procedure of the control process in this case will be described with reference to a flowchart of FIG. 46. When the control process is started, in step S441, the shear displacement amount distribution detection unit 401 detects the information regarding the distribution of the shear displacement amount (for example, the distribution information of the CoP change amount, the contact region movement amount, or the like).

When the control process is started, in step S481, the target sticking ratio setting unit 406 sets the target sticking ratio.

In step S482, the gripping force calculation unit 303-1 calculates the gripping force on the basis of the target sticking ratio set in step S481 and the contact information.

In step S483, the actuator control unit 304 controls the actuator using the gripping force calculated in step S482.

Figure 42:
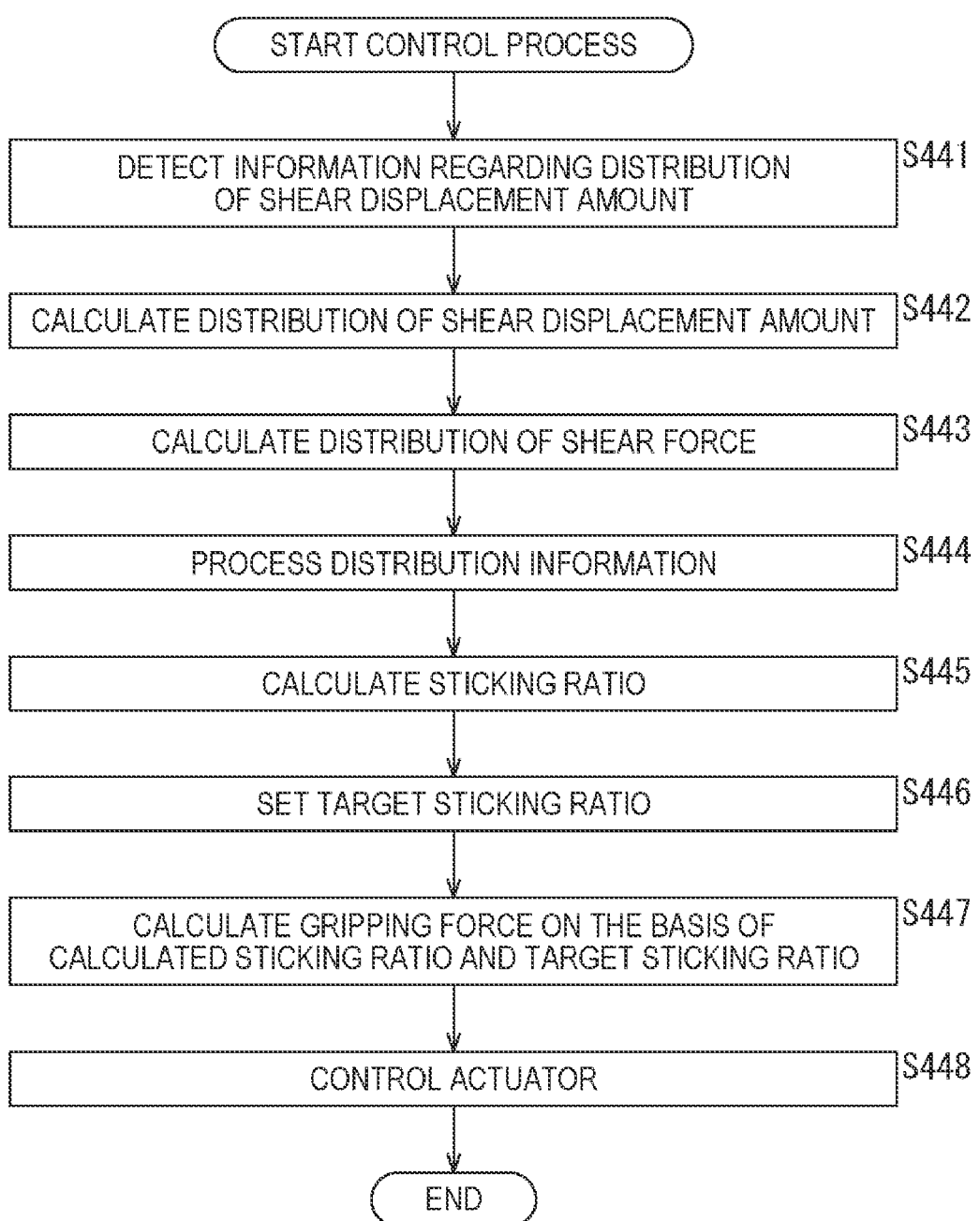
FIG. 42 is a flowchart illustrating an example of the procedure of the control process.

Respective processes of steps S484 to S488 are executed similarly to respective processes of steps S441 to S445 in FIG. 42.

In step S489, the calculation unit 421, the gripping force calculation unit 303-2, and the calculation unit 422 correct the gripping force on the basis of the sticking ratio calculated in step S488 and the target sticking ratio generated in step S481. More specifically, the gripping force calculation unit 303-2 calculates the gripping force corresponding to the difference between the target sticking ratio and the calculated sticking ratio, and the calculation unit 422 adds the calculated gripping force to the gripping force calculated by the gripping force calculation unit 303-1 to correct the gripping force.

When the process of step S490 ends, the control process ends.

By performing the control process in this manner, the control device 101 can control the gripping force (supporting force) of the gripping device 102 by applying Method 1 and Method 2. Therefore, the control device 101 can perform more robust and highly responsive control.

<Case where Friction Coefficient can be Measured by Operation in Advance>

<Control Device>

Figure 47:
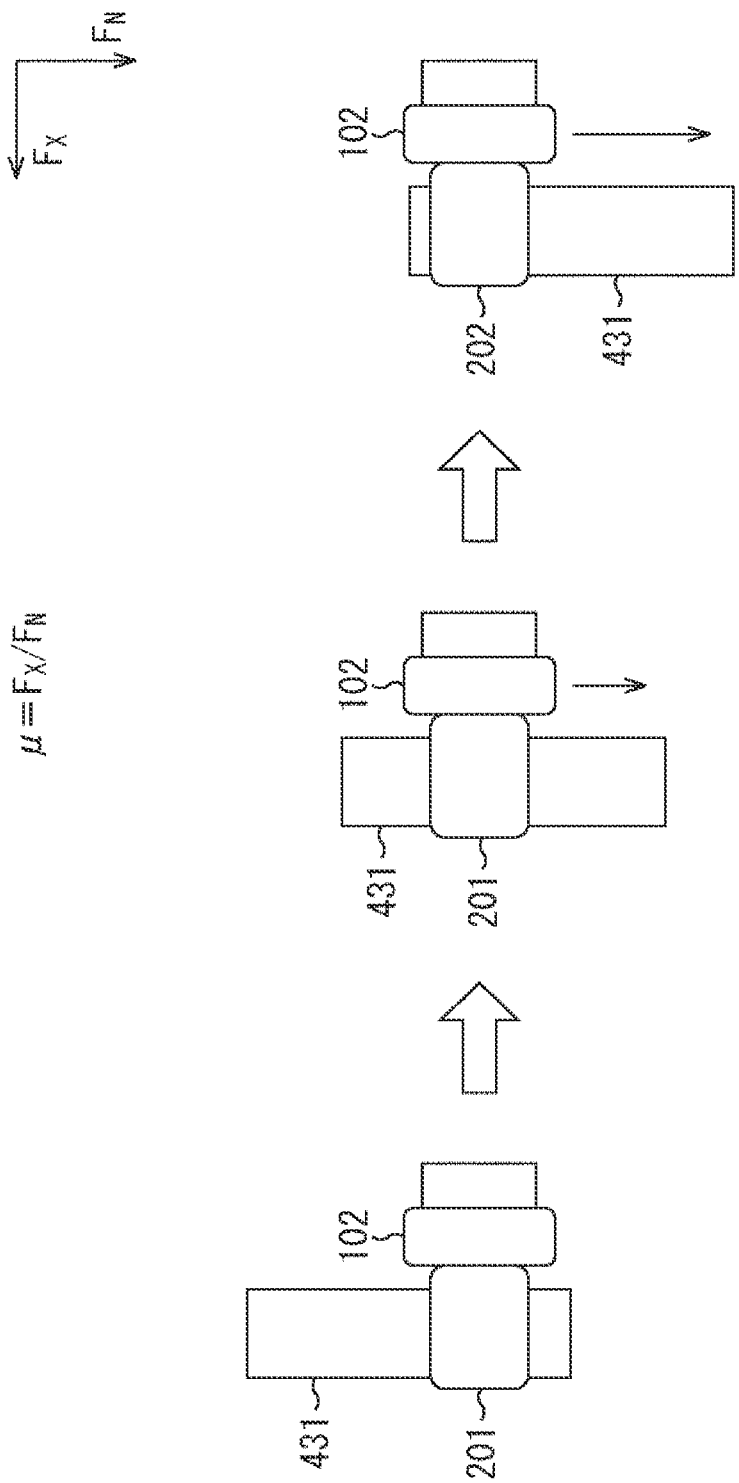
FIG. 47 is a diagram for describing an example of how the friction coefficient is measured.

For example, in order to measure the friction coefficient of the object before the object is gripped, an operation of slipping an object 431 as illustrated in FIG. 47 is performed, so that the friction coefficient can be estimated from the relationship between the shear force $F_X$ and the gripping force $F_N$. The shear force may be estimated from the shear displacement obtained from a tactile sensor, or estimated by use of a three-axis sensor or the like separately attached to the fingertip. As for the gripping force, there are a method of estimating the gripping force from information obtained by the tactile sensor, a method of estimating the gripping force by use of a force sensor such as the three-axis sensor, a method of estimating the gripping force from a current of a motor, and the like.

Figure 48:
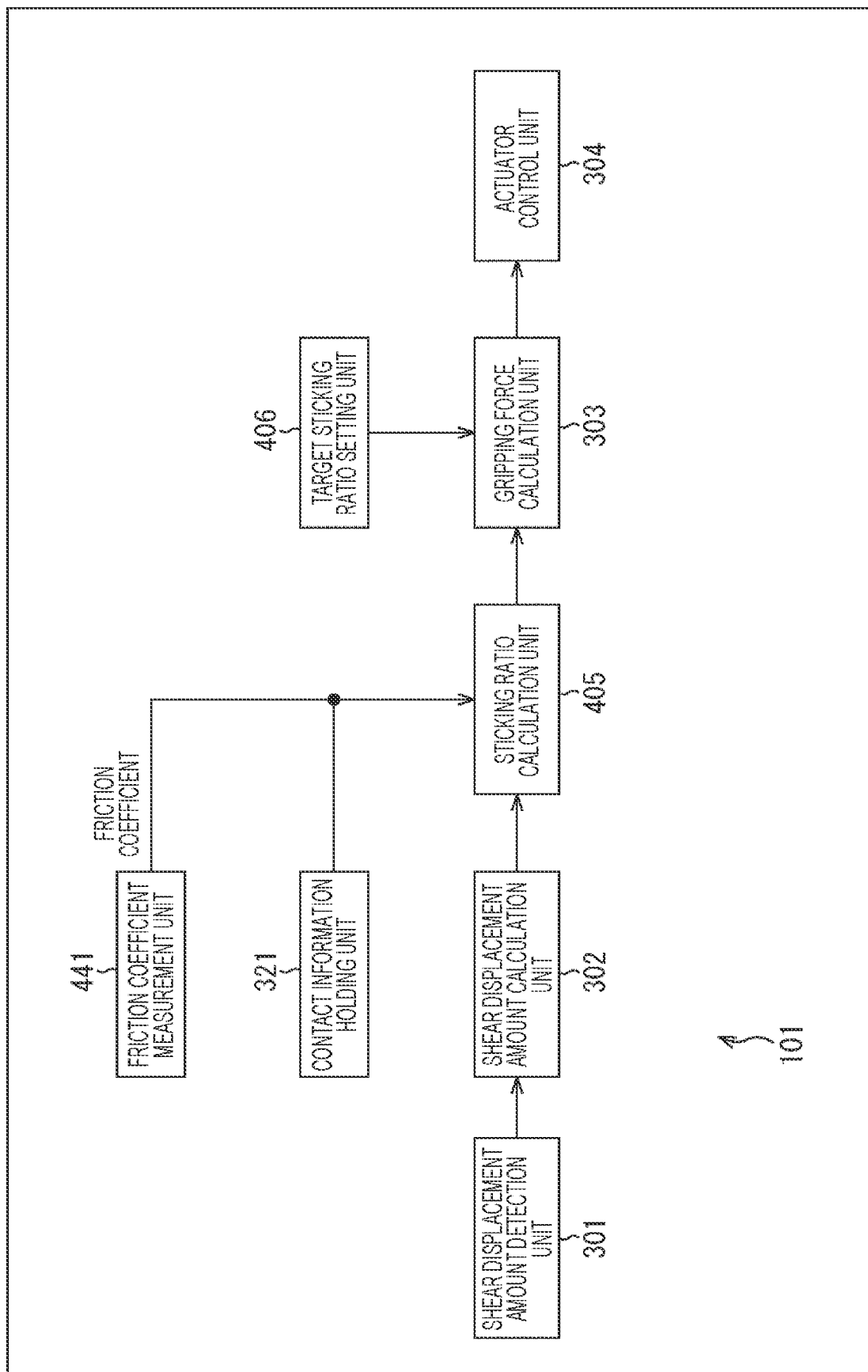
FIG. 48 is a block diagram illustrating a main configuration example of the control device.

FIG. 48 is a block diagram illustrating a main configuration example of the control device 101 in this case. As illustrated in FIG. 48, in this case, the control device 101 includes the shear displacement amount detection unit 301, the shear displacement amount calculation unit 302, a friction coefficient measurement unit 441, the contact information holding unit 321, the sticking ratio calculation unit 405, the target sticking ratio setting unit 406, the gripping force calculation unit 303, and the actuator control unit 304.

The friction coefficient measurement unit 441 measures the friction coefficient. In addition, the friction coefficient measurement unit 441 may measure the gripping force $F_N$ and calculate the friction coefficient using the gripping force $F_N$. In this case, for example, the friction coefficient measurement unit 441 measures the gripping force $F_N$ and derives the friction coefficient using the gripping force $F_N$ and the force $F_X$ in the shear direction. The friction coefficient measurement unit 441 supplies the friction coefficient to the sticking ratio calculation unit 405.

The sticking ratio calculation unit 405 calculates the sticking ratio on the basis of the shear displacement amount supplied from the shear displacement amount calculation unit 302, the friction coefficient supplied from the friction coefficient measurement unit 441, and the contact information acquired from the contact information holding unit 321. The sticking ratio calculation unit 405 supplies the calculated sticking ratio to the gripping force calculation unit 303.

The gripping force calculation unit 303 calculates the gripping force using the target sticking ratio set by the target sticking ratio setting unit 406 and the sticking ratio supplied from the sticking ratio calculation unit 405. That is, the gripping force calculation unit 303, which is the supporting force control unit, controls the supporting force on the basis of the friction coefficient between the object and the contact portion.

As described above, by performing the support control using the measured friction coefficient, the control device 101 can perform more accurate gripping force control. Therefore, the control device 101 can cause the gripping device 102 to support the object with a more appropriate supporting force.

<Procedure of Control Process>

An example of the procedure of the control process in this case will be described with reference to a flowchart of FIG. 49. When the control process is started, in step S501, the shear displacement amount detection unit 301 detects information regarding the shear displacement amount.

In step S502, the shear displacement amount calculation unit 302 calculates the shear displacement amount using the information regarding the shear displacement amount detected in step S501.

In step S503, the friction coefficient measurement unit 441 measures the friction coefficient. In step S504, the sticking ratio calculation unit 405 calculates the sticking ratio on the basis of the shear displacement amount, the contact information, and the friction coefficient.

In step S505, the gripping force calculation unit 303 calculates the gripping force on the basis of the calculated sticking ratio and the target sticking ratio. In step S506, the actuator control unit 304 controls the actuator using the gripping force calculated in step S505.

When the process of step S506 ends, the control process ends.

By executing each process in this manner, the control device 101 can perform the support control using the friction coefficient.

Note that, also in this case, various variations described in <Case where Friction Coefficient Is Not Known in Advance> can be applied.

<Case where Friction Coefficient is Known in Advance (Predictable)>

<Control Device>

Figure 50:
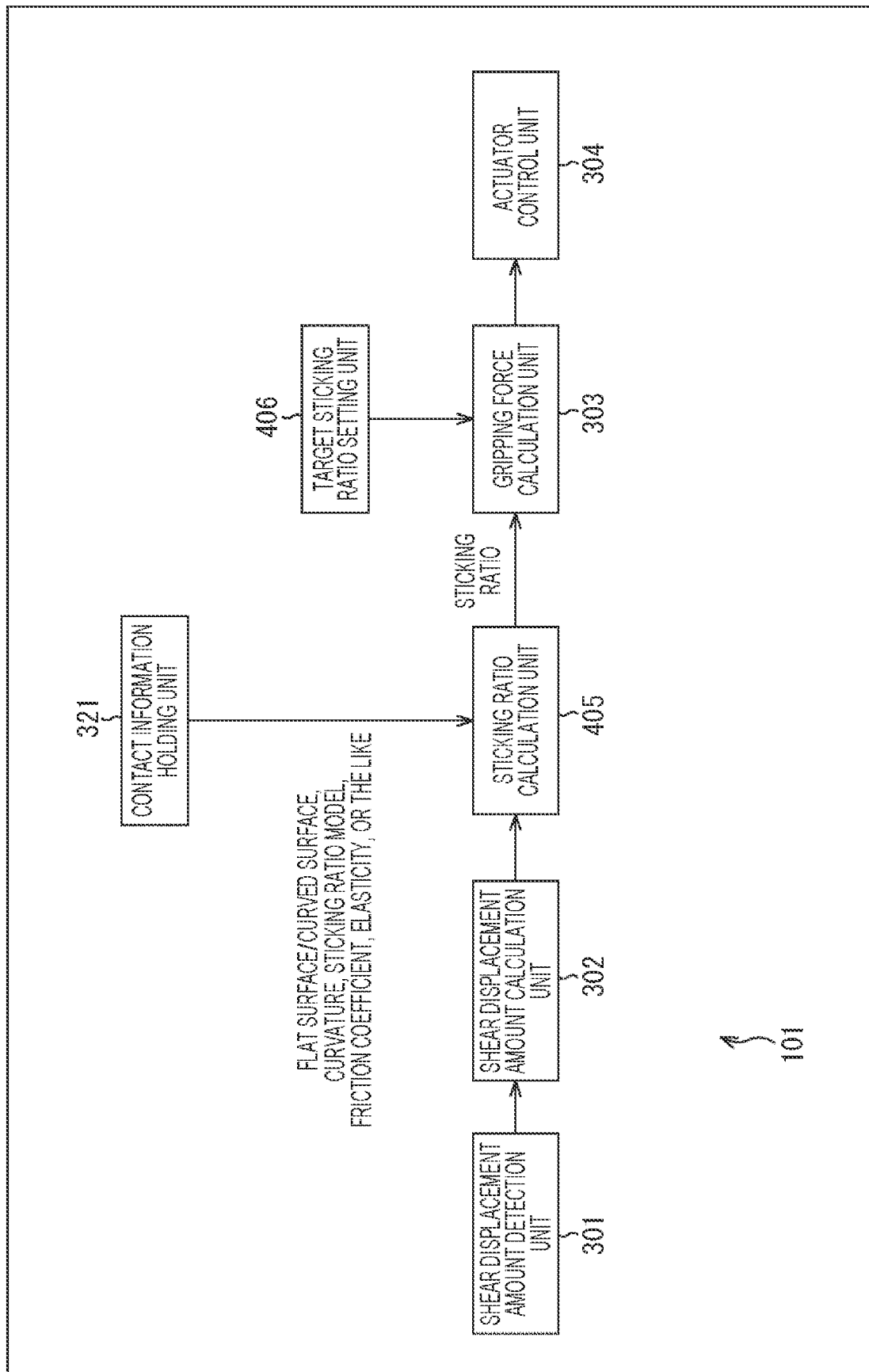
FIG. 50 is a block diagram illustrating a main configuration example of the control device.

In a case where the friction coefficient is known in advance or predictable, the sticking ratio can be calculated directly from the shear displacement. FIG. 50 is a block diagram illustrating a main configuration example of the control device 101 in this case. As illustrated in FIG. 50, in this case, in the control device 101, the friction coefficient measurement unit 441 is omitted from the configuration of the example of FIG. 48.

In this case, the friction coefficient can be included in the contact information held by the contact information holding unit 321. Furthermore, the contact information may further include, for example, the information indicating the shape of the flexible deformation layer, the information indicating the curvature of the surface of the flexible deformation layer 212, a sticking ratio model, elasticity, the information regarding the curved surface of the object with which the gripping device 102 comes into contact, or the like.

Furthermore, also in this case, the information regarding the contact curved surface may be held in advance as the contact information by the contact information holding unit 321, or a result of recognition on the spot may be used. In the case of recognition, the recognition unit is required. The target sticking ratio may be obtained from task contents or a recognition result of the surrounding environment. These settings can also be changed depending on the slip direction.

Note that, also in this case, various variations described in <Case where Friction Coefficient Is Not Known in Advance> and <Case where Friction Coefficient Can Be Measured by Operation in Advance> can be applied.

<Procedure of Control Process>

Figure 51:
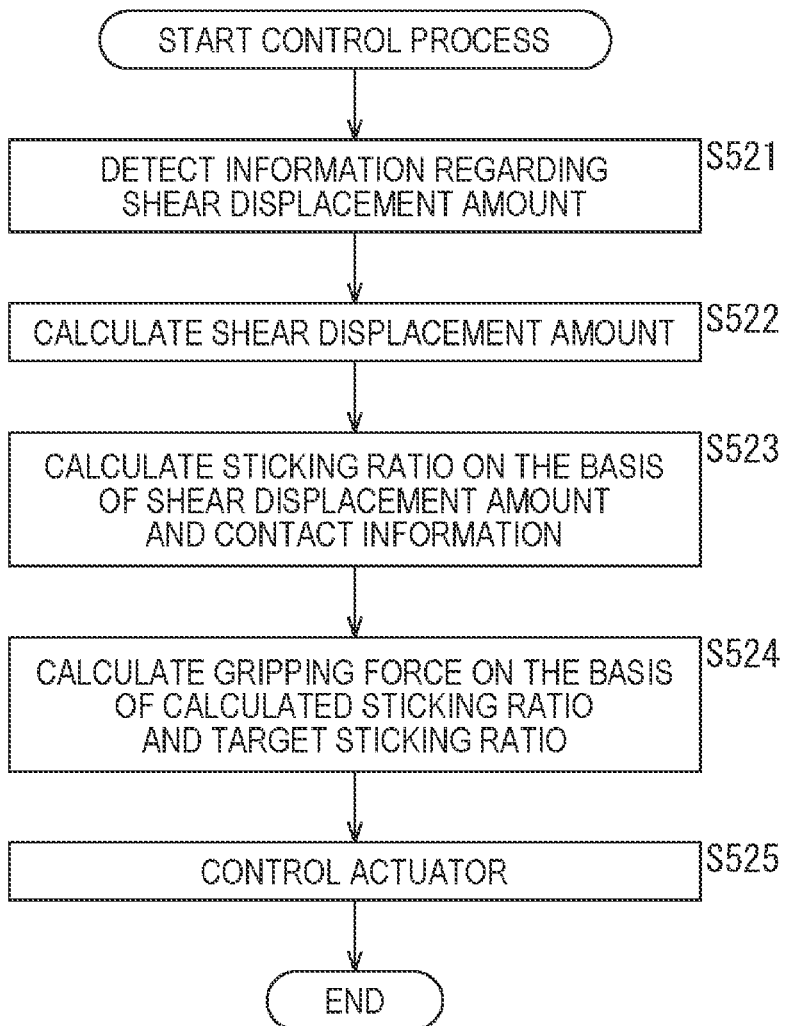
FIG. 51 is a flowchart illustrating an example of the procedure of the control process.

An example of the procedure of the control process in this case will be described with reference to a flowchart of FIG. 51. When the control process is started, respective processes of steps S521 and S522 are performed similarly to respective processes of steps 3501 and 3502 in FIG. 49.

In step S523, the sticking ratio calculation unit 405 calculates the sticking ratio on the basis of the shear displacement amount calculated in step 3522 and the contact information stored in the contact information holding unit 321.

Figure 49:
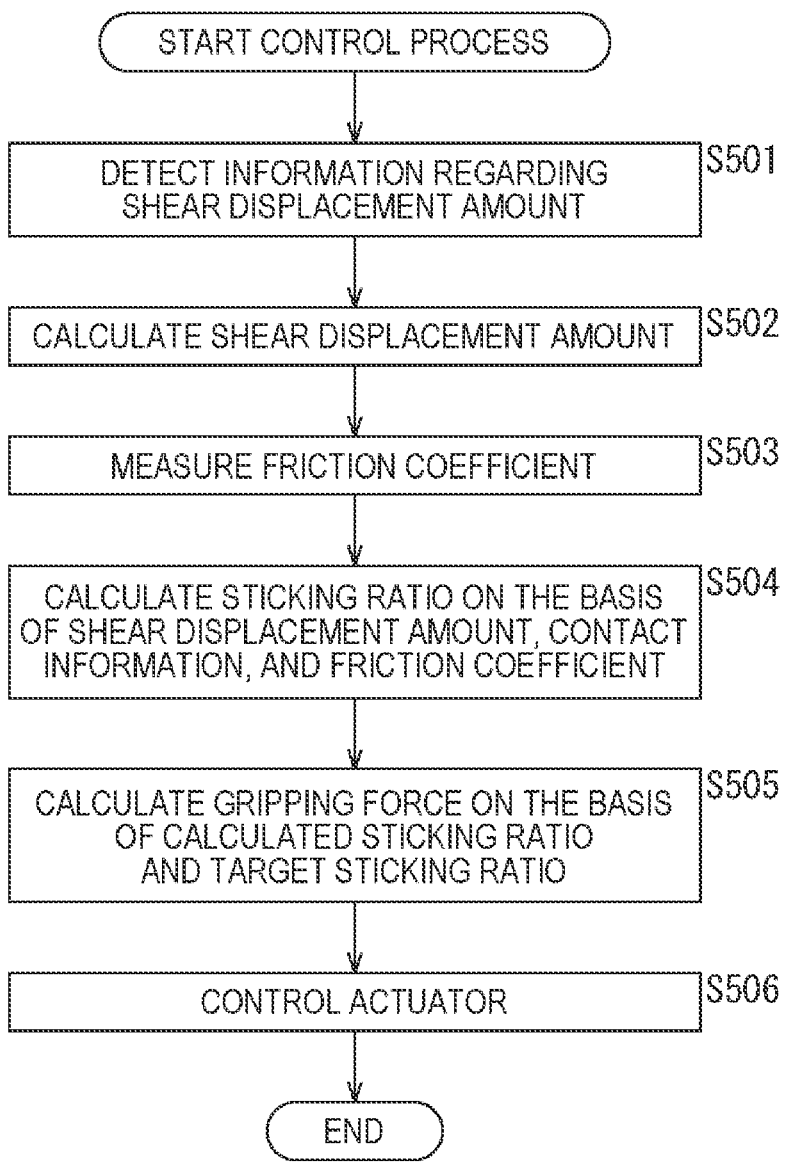
FIG. 49 is a flowchart illustrating an example of the procedure of the control process.

Respective processes of steps S524 and 3525 are performed similarly to respective processes of steps 3505 and S506 in FIG. 49. When the process of step S525 ends, the control process ends.

By executing each process in this manner, the control device 101 can perform the support control also in the case where the friction coefficient is known in advance.

<Control Device>

Figure 52:
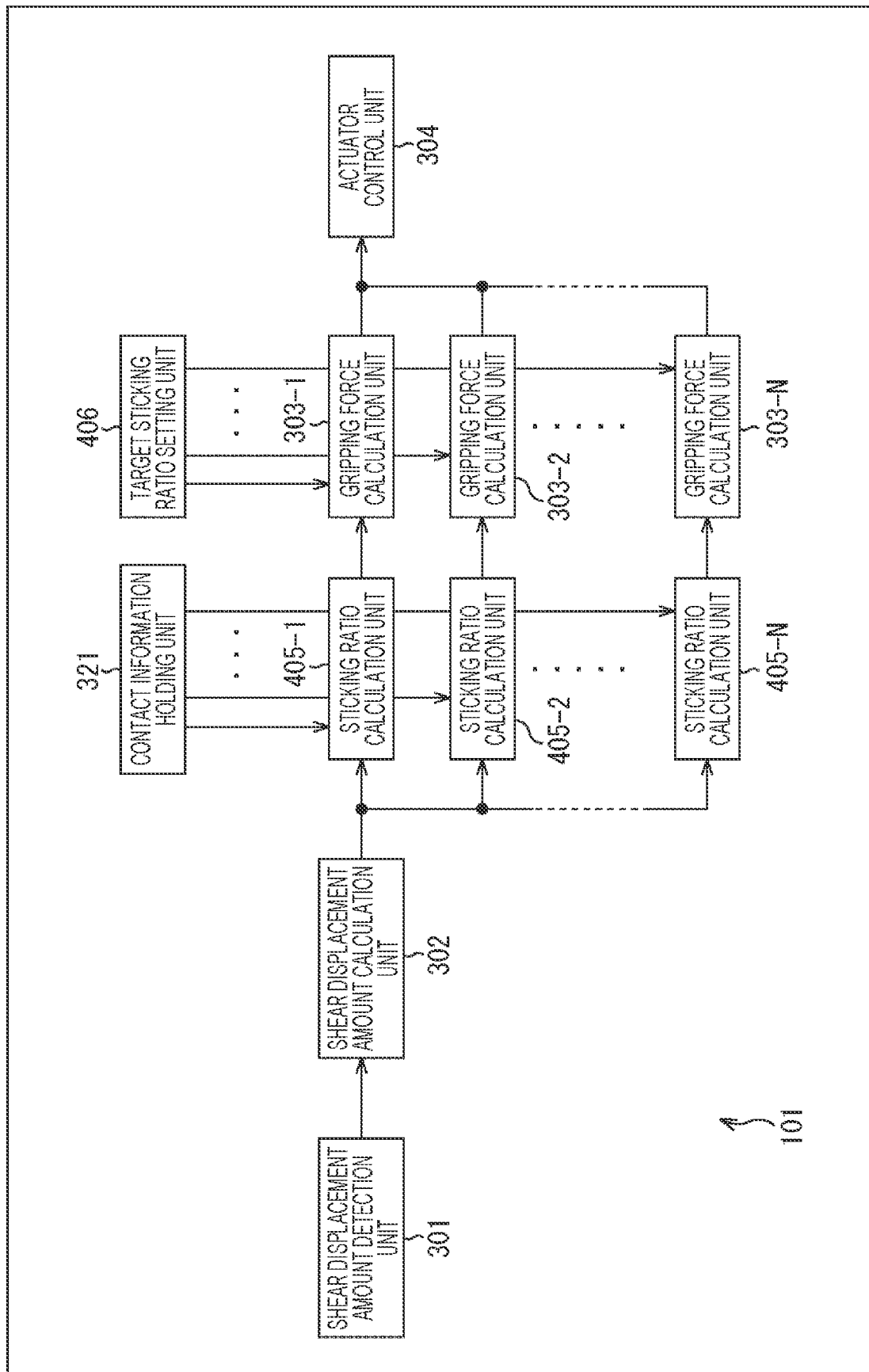
FIG. 52 is a block diagram illustrating a main configuration example of the control device.

In addition, the sticking ratio can be derived for each direction of the shear displacement. FIG. 52 is a block diagram illustrating a main configuration example of the control device 101 in this case. As illustrated in FIG. 52, in this case, the control device 101 basically has a configuration similar to that of the example of FIG. 50. However, in this case, the control device 101 includes sticking ratio calculation units 405-1 to 405-N, each of which corresponds to a direction (for example, x, y, θ, or the like), and the gripping force calculation units 303-1 to 303-N, each of which corresponds to a direction (for example, x, y, θ, or the like).

The sticking ratio calculation units 405-1 to 405-N calculate the sticking ratio for each direction (for example, for each of x, y, θ, and the like). The gripping force calculation units 303-1 to 303-N calculate the gripping force for each direction (for example, each of x, y, θ, and the like).

In addition, the shear displacement amount calculation unit 302 calculates the shear displacement amount for each direction (for example, each of x, y, θ, and the like) and supplies the shear displacement amount for each direction to one of the sticking ratio calculation units 405, which corresponds to the direction of the shear displacement amount. Furthermore, the contact information holding unit 321 holds the contact information for each direction (for example, each of x, y, θ, and the like), and appropriately supplies the contact information for each direction to one of the sticking ratio calculation units 405, which corresponds to the same direction as the direction of the contact information. Moreover, the target sticking ratio setting unit 406 sets the target sticking ratio for each direction (for example, each of x, y, θ, and the like), and supplies the target sticking ratio for each direction to one of the gripping force calculation units 303, which corresponds to the direction of the target sticking ratio.

In this manner, the control device 101 can control the gripping force according to the slip direction. Therefore, the control device 101 can achieve more various support control.

<Procedure of Control Process>

Figure 53:
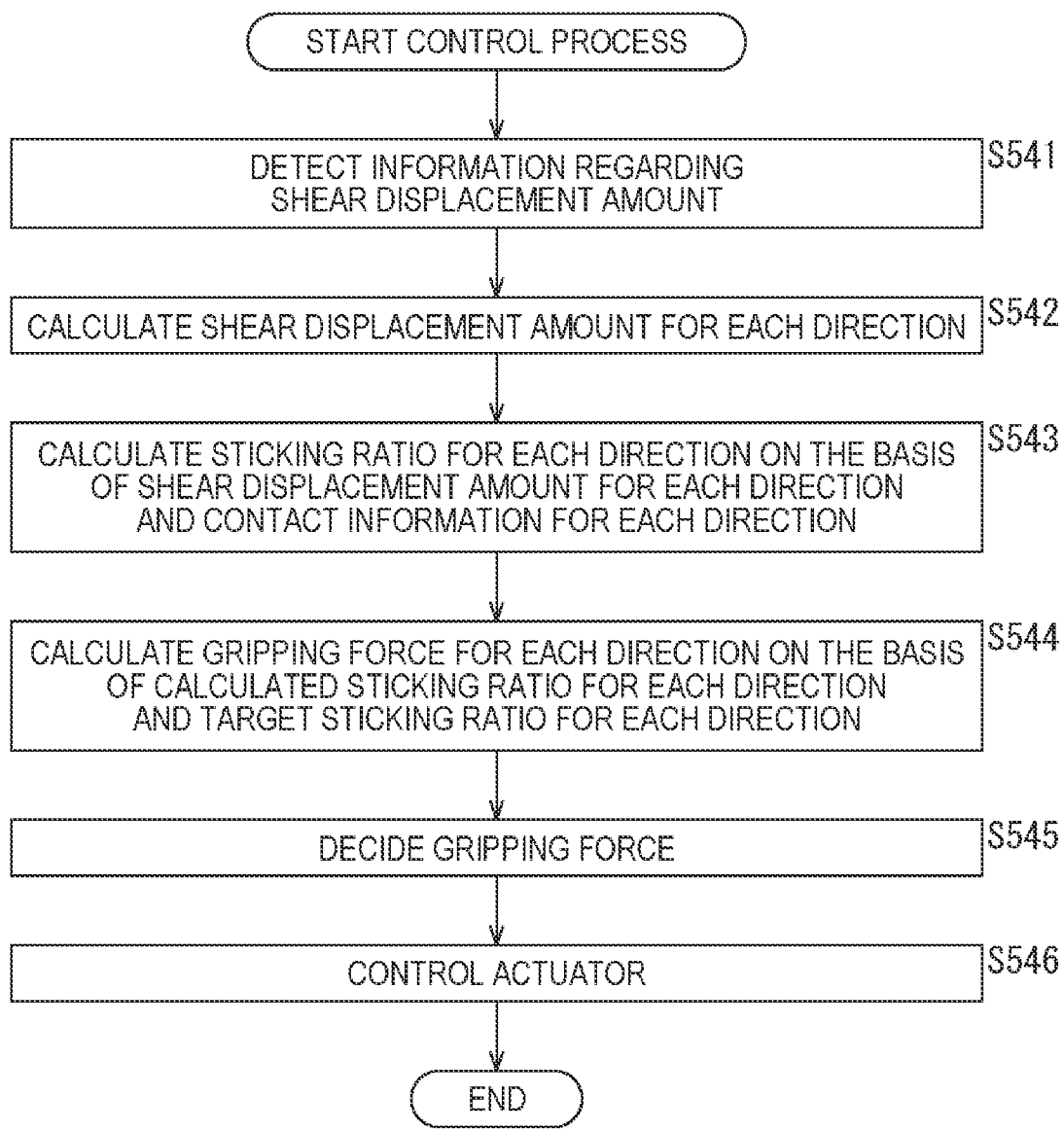
FIG. 53 is a flowchart illustrating an example of the procedure of the control process.

An example of the procedure of the control process in this case will be described with reference to a flowchart of FIG. 53. When the control process is started, a process of step S541 is performed similarly to the process of step 3521 in FIG. 51.

In step S542 (FIG. 53), the shear displacement amount calculation unit 302 calculates the shear displacement amount for each direction (for example, for each of x, y, θ, and the like) on the basis of the information detected in step 3541.

In step S543, the sticking ratio calculation units 405-1 to 405-N calculate the gripping force for each direction on the basis of the shear displacement amount for each direction calculated in step S542 and the contact information for each direction held by the contact information holding unit 321.

In step S544, the gripping force calculation units 303-1 to 303-N calculate the gripping force for each direction on the basis of the shear displacement amount for each direction calculated in step S542 and the contact information for each direction held by the contact information holding unit 321.

In step S544, the actuator control unit 304 calculates the gripping force for each direction from the gripping force for each direction calculated in step S543.

In step S545, the actuator control unit 304 controls driving of the actuator of the gripping device 102 so as to support the object with the gripping force (supporting force) decided in step S544. Then, the control process ends when the process of step S545 ends.

By executing each process as described above, the control device 101 can control the gripping force according to the slip direction, and can achieve more various support control.

<Case of Combining Gripping Force Control with Position Control>

Figure 54:
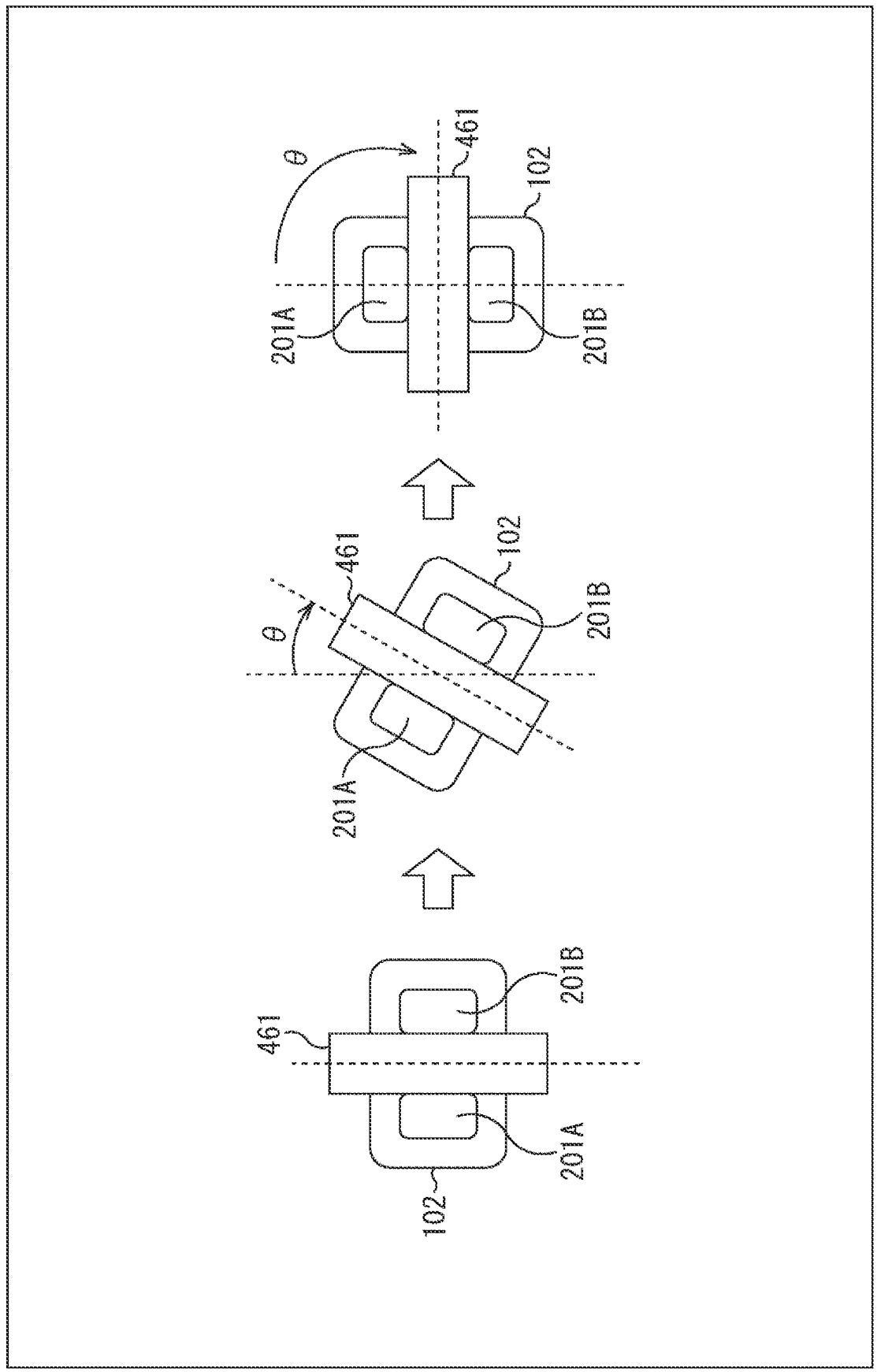
FIG. 54 is a diagram for describing an example of how a position and an orientation are detected.

There is a case where an appropriate gripping force cannot be decided only by detection of the initial slip. For example, in a case illustrated in FIG. 54, the finger portion 201B needs to not only suppress the slip but also compensate gravity of an object 461, but the mass and the center of gravity position of the object 461 are often unknown. Therefore, a method of compensating the gravity by controlling the position of the finger portion 201 is conceivable. Furthermore, in a case where a tool or the like is used, the positional rigidity cannot be increased only by the force control, and thus it is also conceivable to achieve both the force control and the position control.

Figure 55:
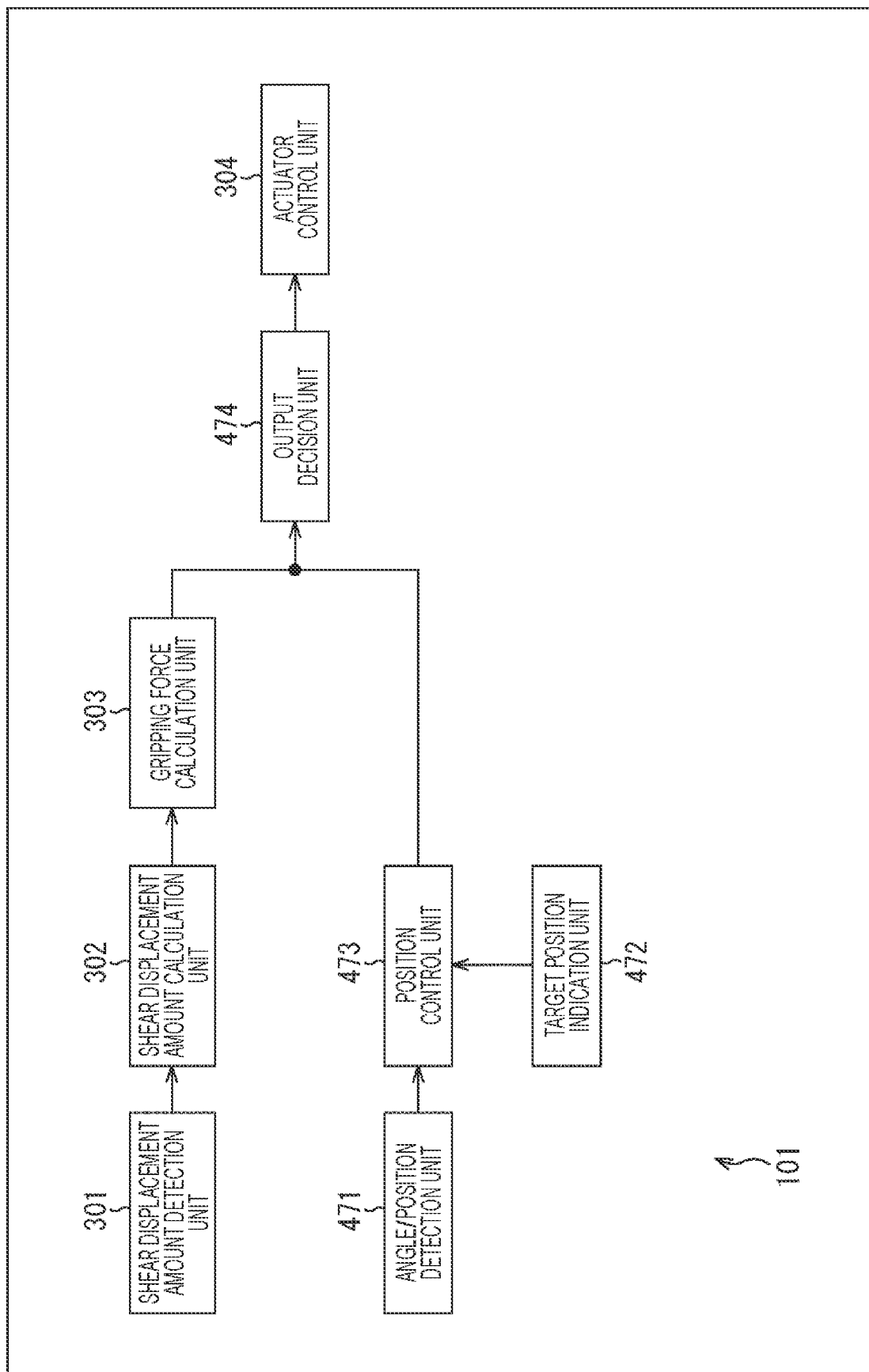
FIG. 55 is a block diagram illustrating a main configuration example of the control device.

FIG. 55 is a block diagram illustrating a main configuration example of the control device 101 in this case. As illustrated in FIG. 55, in this case, the control device 101 includes an angle/position detection unit 471, a target position indication unit 472, a position control unit 473, and an output decision unit 474 in addition to the configuration of the example of FIG. 27.

The angle/position detection unit 471 includes any sensor, and detects the position, the angle, or both the position and the angle of a part of the gripping device 102, such as the finger portion 201, for example, or the whole of the gripping device 102. The angle/position detection unit 471 supplies the detected information to the position control unit 473.

The target position indication unit 472 indicates a target position of a control target (for example, the finger portion 201 or the like) to the position control unit 473.

The position control unit 473 generates a torque and force so as to bring the position and angle of the control target close to target values on the basis of the target position supplied from the target position indication unit 472 and the detected information regarding the position, the angle, or both the position and the angle of a part or the whole of the gripping device 102 supplied from the angle/position detection unit 471, and supplies the torque and force to the output decision unit 474.

In addition, the gripping force calculation unit 303 supplies the gripping force (torque and force) calculated from the shear displacement amount to the output decision unit 474.

The output decision unit 474 adds the torque and force supplied from the position control unit 473 and the gripping force (torque and force) supplied from the gripping force calculation unit 303 together, and supplies a result of the addition to the actuator control unit 304.

In this manner, both the gripping force control and the position control can be achieved.

<Procedure of Control Process>

Figure 56:
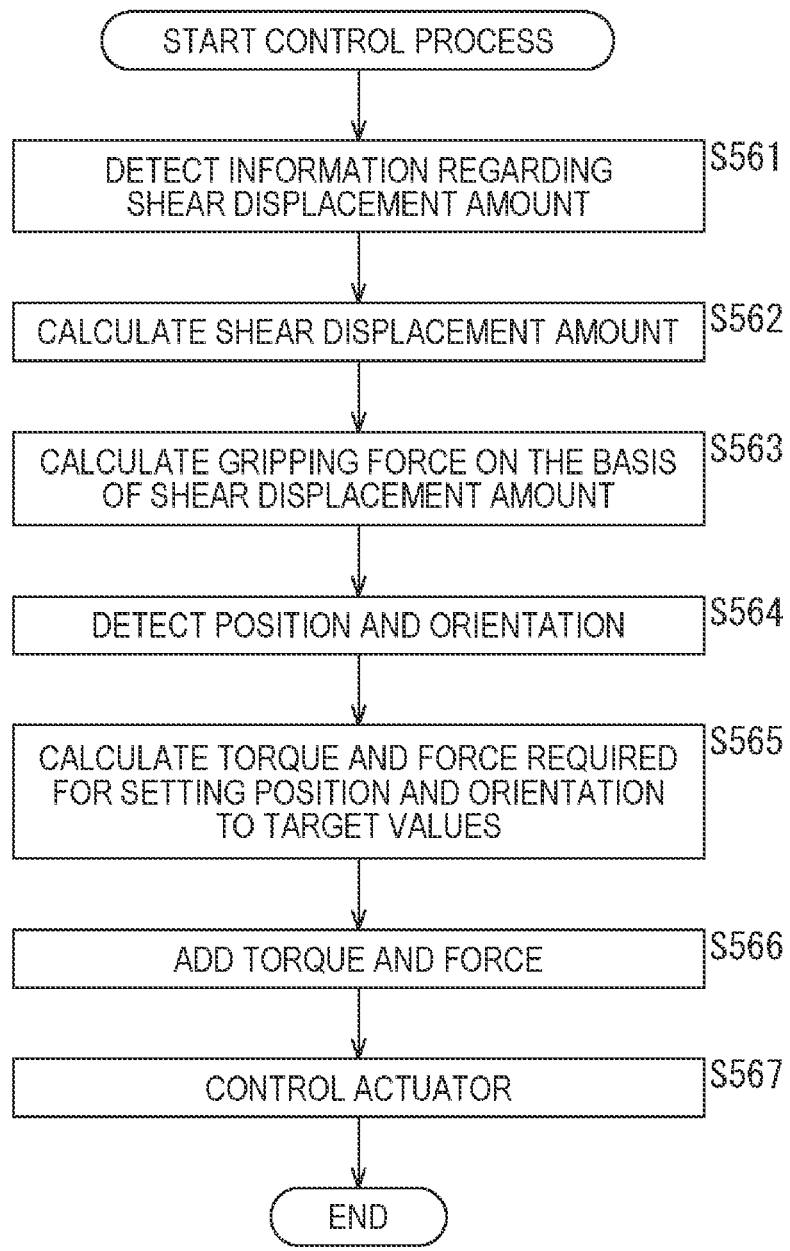
FIG. 56 is a flowchart illustrating an example of the procedure of the control process.

An example of the procedure of the control process in this case will be described with reference to a flowchart of FIG. 56. When the control process is started, in step S561, the shear displacement amount detection unit 301 detects the information regarding the shear displacement amount (for example, the CoP change amount, the contact region movement amount, or the like).

In step S562, the shear displacement amount calculation unit 302 calculates the shear displacement amount on the basis of the information detected in step S561.

In step S563, the gripping force calculation unit 303 calculates the gripping force (supporting force) on the basis of the shear displacement amount calculated in step S562.

In step S564, the angle/position detection unit 471 detects the position and orientation (angle) of (a part or the whole of) the gripping device 102.

In step S565, the position control unit 473 calculates the torque and force required for setting the position and orientation detected in step S564 to the position and orientation indicated by the target position indication unit 472.

In step S566, the output decision unit 474 adds the gripping force calculated in step S563 and the torque and force derived in step S565. In step S567, the actuator control unit 304 controls the actuator on the basis of the torque and force added together in step S566.

When the process of step S567 ends, the control process ends.

By performing the control as described above, the control device 101 can achieve both the gripping force control and the position control.

<Case of Including Plurality of Fingers>
<Control Device>

In a case where the gripping device 102 includes a plurality of finger portions 201 and orientations and positions thereof can be freely changed, the slip direction and the like are only required to be estimated by use of orientation information of the fingers.

Figure 57:
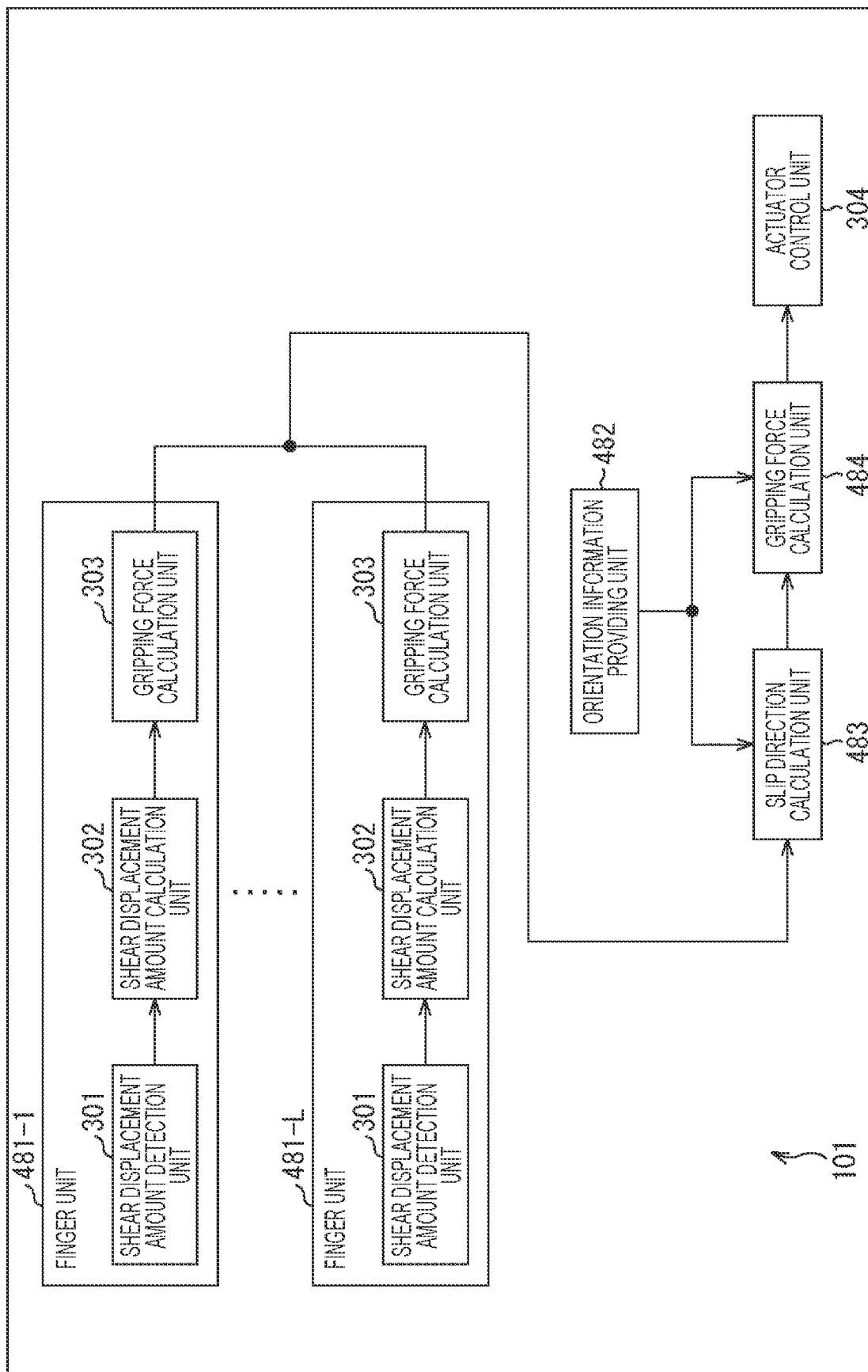
FIG. 57 is a block diagram illustrating a main configuration example of the control device.

FIG. 57 is a block diagram illustrating a main configuration example of the control device 101 in this case. As illustrated in FIG. 57, in this case, the control device 101 includes finger units 481-1 to 481-L (L is any natural number), an orientation information providing unit 482, a slip direction calculation unit 483, and a gripping force calculation unit 484.

The finger units 481-1 to 481-L illustrate configurations provided in the finger portions 201. Hereinafter, the finger units 481-1 to 481-L will be referred to as a finger unit 481 in a case where it is not necessary to distinguish the finger units 481-1 to 481-L from each other for description.

Each of the finger units 481 includes the shear displacement amount detection unit 301, the shear displacement amount calculation unit 302, and the gripping force calculation unit 303. That is, each of the finger units 481 outputs a value calculated by the gripping force calculation unit 303 and supplies the value to the slip direction calculation unit 483.

The orientation information providing unit 482 detects information regarding the position and orientation of the gripping device 102 (or the finger portion 201 or the like thereof), and supplies the information to the slip direction calculation unit 483 and the gripping force calculation unit 484.

The slip direction calculation unit 483 obtains the slip direction on the basis of the torque and force supplied from each of the finger units 481 and the information regarding the position and orientation of the gripping device 102 supplied from the orientation information providing unit 482. The slip direction calculation unit 483 supplies information indicating the obtained slip direction to the gripping force calculation unit 484.

The gripping force calculation unit 484 calculates the gripping force on the basis of the information indicating the slip direction supplied from the slip direction calculation unit 483 and the information regarding the position and orientation of the gripping device 102 supplied from the orientation information providing unit 482, and supplies the gripping force to the actuator control unit 304.

In this manner, each of the finger portions 201 of the gripping device 102 can support the object with a more appropriate supporting force.

<Control Process>

Figure 58:
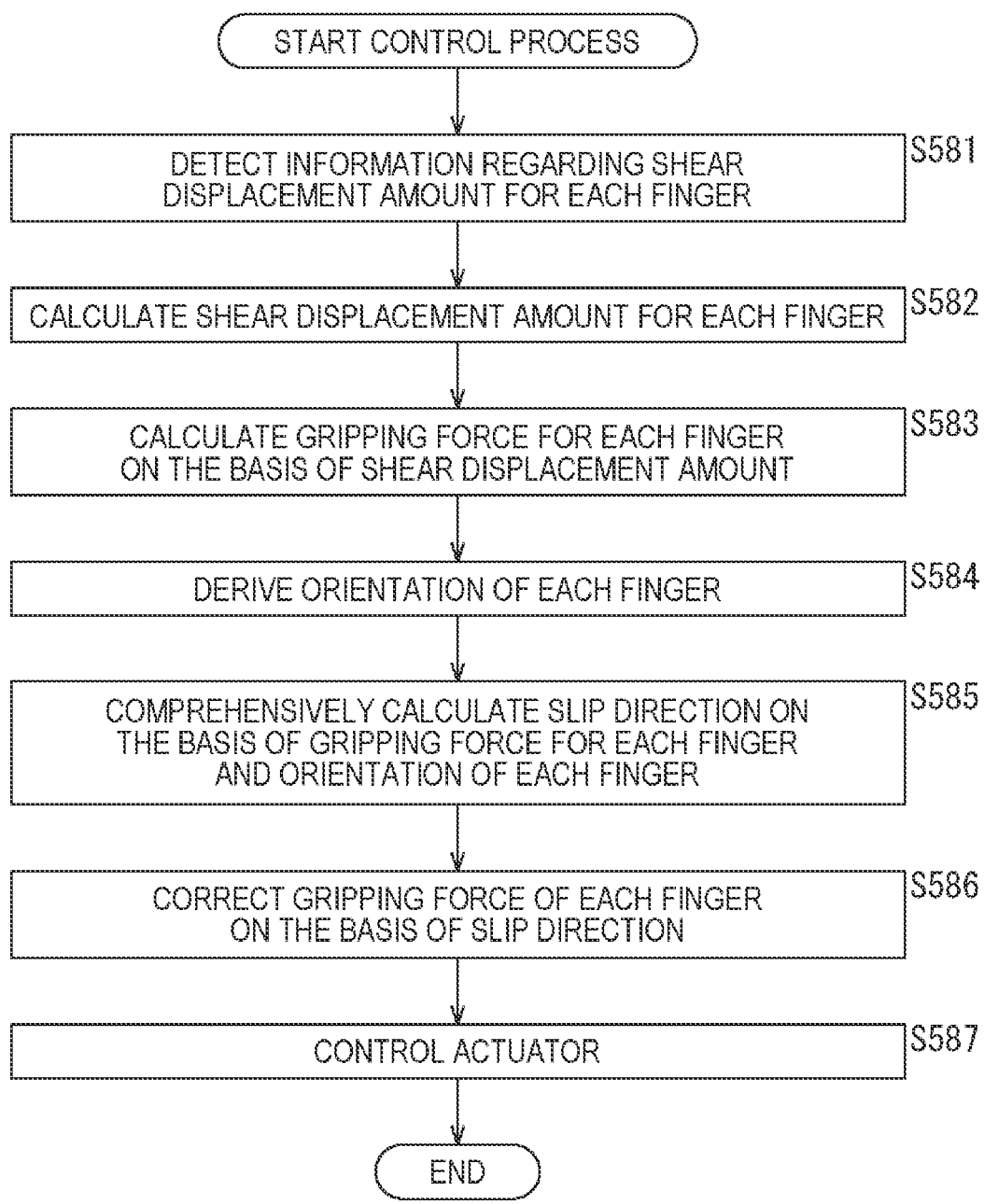
FIG. 58 is a flowchart illustrating an example of the procedure of the control process.

An example of the procedure of the control process in this case will be described with reference to a flowchart of FIG. 58. When the control process is started, in step S581, the shear displacement amount detection unit 301 detects the information regarding the shear displacement amount for each finger.

In step S582, the shear displacement amount calculation unit 302 calculates the shear displacement amount for each finger on the basis of the information regarding the shear displacement amount detected in step S581.

In step S583, the gripping force calculation unit 303 calculates the gripping force for each finger on the basis of the shear displacement amount calculated in step S582.

In step S584, the orientation information providing unit 482 derives the orientation of each finger.

In step S585, the slip direction calculation unit 483 comprehensively calculates the slip direction on the basis of the gripping force for each finger and the orientation of each finger.

In step S586, the gripping force calculation unit 484 corrects the gripping force of each finger on the basis of the slip direction.

In step S587, the actuator control unit 304 controls the actuator of the gripping device 102.

When the process of step S587 ends, the control process ends.

By executing each process in this manner, the control device 101 can control the orientation of each finger according to the surrounding situation. Therefore, the control device 101 can perform more accurate gripping force control. Therefore, the control device 101 can cause the gripping device 102 to support the object with a more appropriate supporting force.

SUMMARY

If the control is performed as described above, even an unknown object (the mass, the friction coefficient, the center of gravity position, and the like are unknown) can be gripped with the minimum required force, so that the unknown object can be gripped without being slipped off and crushed.

The initial slip can be detected in any direction such as the translation direction or the rotation direction, and the control can be performed in various orientations and directions.

In addition, if the contact surface is formed in a curved surface, the initial slip detection accuracy can be improved, and as a result, the gripping accuracy can be improved.

Furthermore, the contact surface is formed in a curved surface, so that the initial slip detection accuracy can be improved. Therefore, a change due to an external force can also be detected with high accuracy, and a stable operation can be performed even in various unknown environments.

With the configuration in which the flexible deformation layer is laminated on the sensor, the flexible deformation layer and the sensor can be separated. When only the flexible deformation layer is damaged, it is possible to replace the flexible deformation layer without changing the sensor.

Using a plurality of curvatures makes it possible to selectively use the contact portion according to the accuracy required for each application, and to achieve appropriate control according to the situation or the task.

4. Appendix

<Support>

In the above description, control in a case where a hand-shaped device holds the object, which is an example of support, has been described. However, the present technology is not limited to this example, and can also be applied to other control. That is, in the present specification, "support" indicates that the device comes into contact with the object and acts on the object. "Gripping" the object by the gripping device 102 of the gripping system 100 described above is an example of "support" by such a device. Therefore, for example, actions of a foot-type device such as standing on the ground, walking, kicking an object, and going up or down stairs or the like are also included in "support". Therefore, the present technology can also be applied to control of such operations. Needless to say, the shape of the device is not limited to a "hand" or a "foot", and may be any shape.

<Computer>

The above-described series of processes can be executed by hardware or software. In a case where the series of processes are executed by software, a program constituting the software is installed in a computer. Here, the computer includes a computer incorporated in dedicated hardware, a general-purpose personal computer, for example, capable of executing various functions by installing various programs, and the like.

Figure 59:
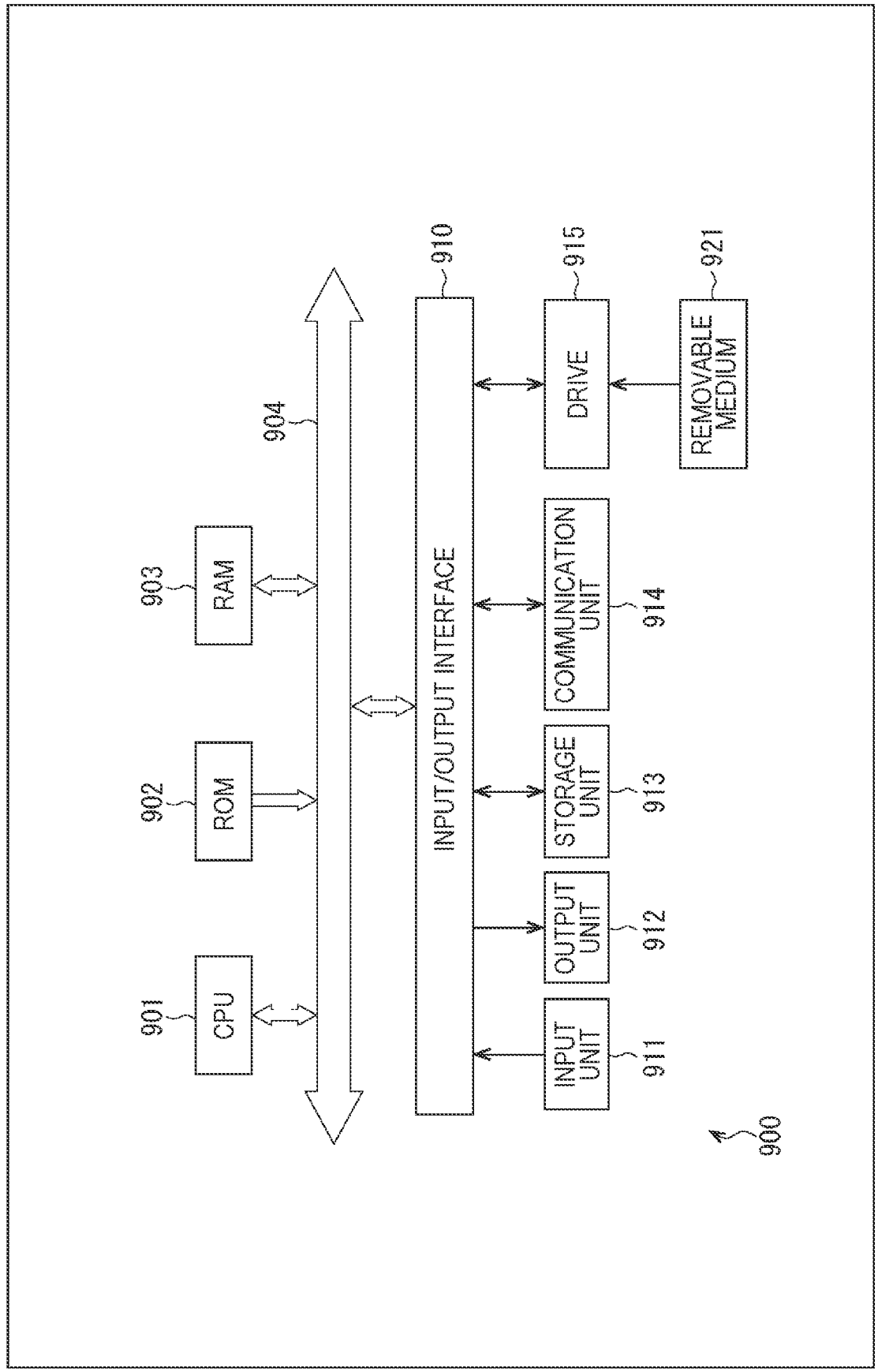
FIG. 59 is a block diagram illustrating a main configuration example of a computer.

FIG. 59 is a block diagram illustrating a configuration example of hardware of the computer that executes the above-described series of processes by the program.

In a computer 900 illustrated in FIG. 59, a central processing unit (CPU) 901, a read only memory (ROM) 902, and a random access memory (RAM) 903 are connected to each other via a bus 904.

An input/output interface 910 is also connected to the bus 904. An input unit 911, an output unit 912, a storage unit 913, a communication unit 914, and a drive 915 are connected to the input/output interface 910.

The input unit 911 includes, for example, a keyboard, a mouse, a microphone, a touch panel, an input terminal, and the like. The output unit 912 includes, for example, a display, a speaker, an output terminal, and the like. The storage unit 913 includes, for example, a hard disk, a RAM disk, a nonvolatile memory, and the like. The communication unit 914 includes, for example, a network interface and the like. The drive 915 drives a removable medium 921 such as a magnetic disk, an optical disk, a magneto-optical disk, or a semiconductor memory.

In the computer configured as described above, for example, the CPU 901 loads a program stored in the storage unit 913 into the RAM 903 via the input/output interface 910 and the bus 904, and executes the program, thereby performing the above-described series of processes. The RAM 903 also appropriately stores data and the like necessary for the CPU 901 to execute various processes.

The program executed by the computer can be applied by being recorded in the removable medium 921 as a package medium or the like, for example. In this case, the program can be installed in the storage unit 913 via the input/output interface 910 by the removable medium 921 being attached to the drive 915.

Furthermore, the program can also be provided via a wired or wireless transmission medium such as a local area network, the Internet, or digital satellite broadcasting. In this case, the program can be received by the communication unit 914 and installed in the storage unit 913.

In addition, the program can be installed in the ROM 902 or the storage unit 913 in advance.

<Configuration to which Present Technology is Applied>

The present technology can be applied to any configuration. For example, the present technology can be implemented as a partial configuration of a device, such as a processor as a system large scale integration (LSI) or the like, a module using a plurality of processors or the like, a unit using a plurality of modules or the like, or a set in which other functions are further added to the unit.

Furthermore, for example, the present technology can also be applied to a network system configured by a plurality of devices. For example, the present technology may be implemented as cloud computing in which a function is shared and processed in cooperation by a plurality of devices via a network. For example, the present technology may be implemented in a cloud service that provides a service to any terminal such as a computer, a portable information processing terminal, or an Internet of Things (IoT) device.

Note that, in the present specification, a system means a set of a plurality of components (devices, modules (parts), and the like), and it does not matter whether or not all the components are in the same housing. Therefore, a plurality of devices housed in separate housings and connected via a network, and one device in which a plurality of modules is housed in one housing are both systems.

<Field and Use to which Present Technology is Applicable>

A system, a device, a processing unit, and the like to which the present technology is applied can be used in any fields such as traffic, medical care, crime prevention, agriculture, livestock industry, mining, beauty, factory, home appliance, weather, and natural monitoring, for example. In addition, a use thereof is also freely set.

<Others>

Embodiments of the present technology are not limited to the above-described embodiments, and various modifications can be made without departing from the gist of the present technology.

For example, a configuration described as one device (or processing unit) may be divided and configured as a plurality of devices (or processing units). On the contrary, configurations described above as a plurality of devices (or processing units) may be collectively configured as one device (or processing unit). Furthermore, needless to say, a configuration other than the above-described configuration may be added to the configuration of each device (or each processing unit). Moreover, a part of the configuration of a certain device (or processing unit) may be included in the configuration of another device (or another processing unit) as long as the configuration and operation of the entire system are substantially the same.

Furthermore, for example, the above-described program may be executed in any device. In this case, the device is only required to have necessary functions (functional blocks or the like) so that necessary information can be obtained.

Furthermore, for example, each step of one flowchart may be executed by one device, or may be shared and executed by a plurality of devices. Furthermore, in a case where a plurality of processes is included in one step, the plurality of processes may be executed by one device, or may be shared and executed by a plurality of devices. In other words, the plurality of processes included in one step can also be executed as a plurality of steps of processes. On the contrary, processes described as a plurality of steps can also be collectively executed as one step.

Furthermore, for example, in the program executed by the computer, processes of steps describing the program may be executed in time series in the order described in the present specification, executed in parallel, or executed individually at a required timing such as when a call is made. That is, as long as there is no contradiction, the process of each step may be executed in an order different from the above-described order. Moreover, the processes of the steps describing the program may be executed in parallel with a process of another program, or may be executed in combination with a process of another program.

Furthermore, for example, a plurality of techniques related to the present technology can be implemented independently as a single body as long as there is no contradiction. Needless to say, any plurality of techniques related to the present technology can be implemented in combination. For example, a part or the whole of the present technology described in any of the embodiments may be implemented in combination with a part or the whole of the present technology described in another embodiment. Furthermore, any part or the whole of the above-described present technology can also be implemented in combination with another technology not described above.

Note that the present technology may have the following configurations.

(1) A control device including
a supporting force control unit that controls a supporting force for supporting an object on the basis of information regarding a shape of a contact portion in contact with the object and information regarding a shear force of the contact portion.

(2) The control device according to (1), in which
the information regarding the shape includes information indicating a curvature of a surface of the contact portion, and
the supporting force control unit controls the supporting force on the basis of the information indicating the curvature.

(3) The control device according to (1) or (2), in which
the supporting force control unit controls the supporting force on the basis of information regarding a shape of the object.

(4) The control device according to any of (1) to (3), further including
a holding unit that holds the information regarding the shape, in which
the supporting force control unit controls the supporting force on the basis of the information regarding the shape held by the holding unit.

(5) The control device according to any of (1) to (4), in which
the information regarding the shear force includes information indicating a shear displacement amount of the contact portion, and
the supporting force control unit controls the supporting force on the basis of the information indicating the shear displacement amount.

(6) The control device according to (5), in which
the supporting force control unit controls the supporting force on the basis of the information indicating the shear displacement amount for each direction.

(7) The control device according to (5) or (6), in which
the supporting force control unit controls the supporting force on the basis of the information indicating the shear displacement amount calculated by use of detected information regarding the shear force.

(8) The control device according to any of (1) to (7), further including
a drive control unit that controls driving of a support unit that supports the object, and causes the object to be supported with the supporting force controlled by the supporting force control unit.

(9) The control device according to any of (1) to (8), in which
the supporting force control unit controls a supporting force on the basis of a detection result of the supporting force applied to the object.

(10) The control device according to any of (1) to (9), in which
the supporting force control unit controls the supporting force on the basis of a detection result of a position or an orientation of a support unit that supports the object or detection results of both of the position and the orientation.

(11) The control device according to any of (1) to (10), in which
the information regarding the shear force includes information regarding a shear displacement of the contact portion, and
the supporting force control unit controls the supporting force on the basis of a distribution of a shear force derived by use of a distribution of a shear displacement amount calculated from a distribution of the detected information regarding the shear displacement.

(12) The control device according to (11), in which
the supporting force control unit controls the supporting force on the basis of a time-series change in the distribution of the shear force.

(13) The control device according to (11) or (12), in which
the supporting force control unit controls the supporting force on the basis of a sticking ratio calculated by use of the distribution of the shear force.

(14) The control device according to (13), in which
the supporting force control unit controls the supporting force on the basis of a target sticking ratio, which is a target value of the sticking ratio.

(15) The control device according to any of (1) to (14), in which
the supporting force control unit controls the supporting force on the basis of rotational slip, which is a slip of the object relative to the contact portion in a rotation direction.

(16) The control device according to (15), in which
the supporting force control unit controls the supporting force on the basis of a detection result of a distribution of a pressure applied to the object by the contact portion.

(17) The control device according to any of (1) to (16), in which
the supporting force control unit controls the supporting force on the basis of a friction coefficient between the object and the contact portion.

(18) The control device according to any of (1) to (17), further including
a position control unit that controls a position at which the contact portion having a surface with a plurality of curvatures comes into contact with the object.

(19) A control method including
controlling a supporting force for supporting an object on the basis of information regarding a shape of a contact portion in contact with the object and information regarding a shear force of the contact portion.

(20) A program that causes a computer to function as
a supporting force control unit that controls a supporting force for supporting an object on the basis of information regarding a shape of a contact portion in contact with the object and information regarding a shear force of the contact portion.

REFERENCE SIGNS LIST

100 Gripping system
101 Control device

102 Gripping device
201 Finger portion
211 Sensor
212 Flexible deformation layer
231 Object
301 Shear displacement amount detection unit
302 Shear displacement amount calculation unit
303 Gripping force calculation unit
304 Actuator control unit
311 Gripping force measurement unit
321 Contact information holding unit
331 Gripping force decision unit
341 Control parameter storage unit
342 Control parameter
351 Task assignment unit
352 Slip direction designation unit
361 Environment recognition unit
401 Shear displacement amount distribution detection unit
402 Shear displacement amount distribution calculation unit
403 Shear force distribution calculation unit
404 Distribution information processing unit
405 Sticking ratio calculation unit
406 Target sticking ratio setting unit
411 Distribution information storage unit
412 Distribution time-series information processing unit
431 Object
441 Friction coefficient measurement unit
461 Object
471 Angle/position detection unit
472 Target position indication unit
473 Position control unit
474 Output decision unit
481 Finger unit
482 Orientation information providing unit
483 Slip direction calculation unit
484 Gripping force calculation unit

The invention claimed is:

1. A control device comprising:
a supporting force control unit configured to control a supporting force by driving one or more actuators of a gripping device to provide the supporting force for supporting an object via a plurality of contact portions of a contact surface of the gripping device, the supporting force being controlled based on
information regarding a respective shape of each respective contact portion of the contact surface where the supporting force is transmitted from the one or more actuators to the object through contact with the object, and
information regarding a respective shear force detected between each respective contact portion and the object at a plurality of positions of the respective contact portion,
wherein the information regarding the respective shear force is detected in relation to a center of a pressure detected for each respective contact portion,
wherein the supporting force control unit controls the supporting force based on a sticking ratio between a partial region where static friction is generated on the contact surface and a partial region where dynamic friction is generated on the contact surface, and
wherein the supporting force control unit is implemented via at least one processor.

2. The control device according to claim 1, wherein
the information regarding the respective shape includes information indicating a curvature of a surface of each respective contact portion, and
the supporting force control unit controls the supporting force based on the information indicating the curvature.

3. The control device according to claim 1, wherein
the supporting force control unit controls the supporting force based on information regarding a shape of the object.

4. The control device according to claim 1, further comprising:
a holding unit configured to hold the information regarding the respective shape of each respective contact portion, wherein
the supporting force control unit controls the supporting force based on the information held by the holding unit, and
the holding unit is implemented via at least one non-transitory computer-readable storage medium.

5. The control device according to claim 1, wherein
the information regarding the shear force includes information indicating a shear displacement amount of each contact portion, and
the supporting force control unit controls the supporting force based on the information indicating the shear displacement amount.

6. The control device according to claim 5, wherein
the supporting force control unit controls the supporting force based on the information indicating the shear displacement amount for each direction.

7. The control device according to claim 5, wherein
the supporting force control unit controls the supporting force based on the information indicating the shear displacement amount calculated by use of detected information regarding the shear force.

8. The control device according to claim 1, further comprising:
a drive control unit configured to
control driving of a support unit that supports the object, and
cause the object to be supported with the supporting force controlled by the supporting force control unit.

9. The control device according to claim 1, wherein
the supporting force control unit controls a supporting force based on a detection result of the supporting force applied to the object.

10. The control device according to claim 1, wherein
the supporting force control unit controls the supporting force based on a detection result of a position or an orientation of a support unit that supports the object or detection results of both of the position and the orientation.

11. The control device according to claim 1, wherein
the information regarding the shear force includes information regarding a shear displacement of each contact portion, and
the supporting force control unit controls the supporting force based on a distribution of a shear force derived by use of a distribution of a shear displacement amount calculated from a distribution of the detected information regarding the shear displacement.

12. The control device according to claim 11, wherein
the supporting force control unit controls the supporting force based on a time-series change in the distribution of the shear force.

13. The control device according to claim 11, wherein the sticking ratio is calculated by use of the distribution of the shear force.

14. The control device according to claim 13, wherein the supporting force control unit controls the supporting force based on a target sticking ratio, which is a target value of the sticking ratio.

15. The control device according to claim 1, wherein the supporting force control unit controls the supporting force based on rotational slip, which is a slip of the object relative to each contact portion in a rotation direction.

16. The control device according to claim 15, wherein the supporting force control unit controls the supporting force based on a detection result of a distribution of the detected pressure applied to the object by each contact portion.

17. The control device according to claim 1, wherein the supporting force control unit controls the supporting force based on a friction coefficient between the object and each contact portion.

18. The control device according to claim 1, further comprising:
- a position control unit configured to control a position at which each contact portion of the contact surface with having one or more curvatures comes into contact with the object,
- wherein the position control unit is implemented via at least one processor.

19. The control device according to claim 1, wherein the information regarding the respective shape of each respective contact portion relates to a contact shape at a tip of each respective contact portion.

20. The control device according to claim 1, wherein the sticking ratio is calculated by use of the distribution of the shear force for each respective contact portion of the contact surface.

21. A control method comprising
controlling a supporting force by driving one or more actuators of a gripping device to provide the supporting force for supporting an object via a plurality of contact portions of a contact surface of the gripping device, the supporting force being controlled based on
- information regarding a respective shape of each respective contact portion of the contact surface where the supporting force is transmitted from the one or more actuators to the object through contact with the object, and
- information regarding a respective shear force detected between each respective contact portion and the object at a plurality of positions of the respective contact portion,
wherein the information regarding the respective shear force is detected in relation to a center of a pressure detected for each respective contact portion, and
wherein the supporting force is controlled based on a sticking ratio between a partial region where static friction is generated on the contact surface and a partial region where dynamic friction is generated on the contact surface.

22. A non-transitory computer-readable storage medium having embodied thereon a program, which when executed by a computer causes the computer to execute a method, the method comprising:
controlling a supporting force by driving one or more actuators of a gripping device to provide the supporting force for supporting an object via a plurality of contact portions of a contact surface of the gripping device, the supporting force being controlled based on
- information regarding a respective shape of each respective contact portion of the contact surface where the supporting force is transmitted from the one or more actuators to the object through contact with the object, and
- information regarding a respective shear force detected between each respective contact portion and the object at a plurality of positions of the respective contact portion,
wherein the information regarding the respective shear force is detected in relation to a center of a pressure detected for each respective contact portion, and
wherein the supporting force is controlled based on a sticking ratio between a partial region where static friction is generated on the contact surface and a partial region where dynamic friction is generated on the contact surface.

* * * * *